(12) United States Patent
Hannig

(10) Patent No.: US 8,091,238 B2
(45) Date of Patent: Jan. 10, 2012

(54) APPARATUS FOR PREMOUNTING OF LOCKING ELEMENTS TO A PANEL

(75) Inventor: Hans-Juergen Hannig, Bergisch Gladbach (DE)

(73) Assignee: Akzenta Paneele + Profile GmbH, Kaisersesch (DE)

( * ) Notice: Subject to any disclaimer, the term of this patent is extended or adjusted under 35 U.S.C. 154(b) by 540 days.

(21) Appl. No.: 12/064,945

(22) PCT Filed: Dec. 6, 2006

(86) PCT No.: PCT/EP2006/011684
§ 371 (c)(1),
(2), (4) Date: Mar. 10, 2008

(87) PCT Pub. No.: WO2007/079845
PCT Pub. Date: Jul. 19, 2007

(65) Prior Publication Data
US 2008/0236088 A1  Oct. 2, 2008

(30) Foreign Application Priority Data

Jan. 13, 2006 (DE) .......... 10 2006 002 027
Jan. 13, 2006 (DE) .......... 10 2006 002 028
Mar. 15, 2006 (DE) .......... 10 2006 011 887

(51) Int. Cl.
*B21K 23/00* (2006.01)
(52) U.S. Cl. ..... 29/897.32; 29/897; 29/897.3; 52/309.8; 52/586.2; 52/592.1
(58) Field of Classification Search ............... 29/897.32, 29/897.3, 897; 52/309.8, 403.1, 586.2, 592.1, 52/747.1
See application file for complete search history.

(56) References Cited

U.S. PATENT DOCUMENTS

| | | | | | |
|---|---|---|---|---|---|
| 6,156,402 | A | * | 12/2000 | Smith | 428/40.1 |
| 7,047,705 | B2 | * | 5/2006 | Foster | 52/747.1 |
| 7,802,411 | B2 | * | 9/2010 | Pervan et al. | 52/586.2 |

FOREIGN PATENT DOCUMENTS

| | | |
|---|---|---|
| DE | 299 24 454 A | 5/2003 |
| DE | 10 2005 002297 | 8/2005 |
| EP | 1 582 653 | 10/2005 |
| EP | 1 674 223 | 6/2006 |
| WO | WO 00/47841 A | 8/2000 |
| WO | WO 01/02671 A | 1/2001 |
| WO | WO 01/51732 A | 7/2001 |
| WO | WO 03/016654 | 2/2003 |
| WO | WO 03/083234 A | 10/2003 |
| WO | WO 2004/020764 | 3/2004 |
| WO | WO 2004/072406 Y | 8/2004 |
| WO | WO 2004/079130 | 9/2004 |
| WO | WO 2004/085765 | 10/2004 |
| WO | WO 2005/054599 | 6/2005 |
| WO | WO2006/043893 | 4/2006 |
| WO | WO2006/104436 | 10/2006 |
| WO | WO2007/008139 E | 1/2007 |

* cited by examiner

*Primary Examiner* — Richard Chang
(74) *Attorney, Agent, or Firm* — Lucas & Mercanti, LLP

(57) ABSTRACT

The apparatus mounts a locking element into a groove in an edge of a panel. An advance device feeds a stream of locking elements to a pressing device which mounts the locking elements into the groove on the edge of the panel. The locking elements are fed from a line of locking elements stored on a reel. A separating device cuts the line of locking elements into individual locking elements. The separating device is positioned either upstream of the advancing device or immediately upstream of the pressing device. When the separating device is immediately upstream of the pressing device, a spring is used to flex the stream during the short stoppage when the separating device separates individual locking elements from the line of locking elements.

11 Claims, 27 Drawing Sheets

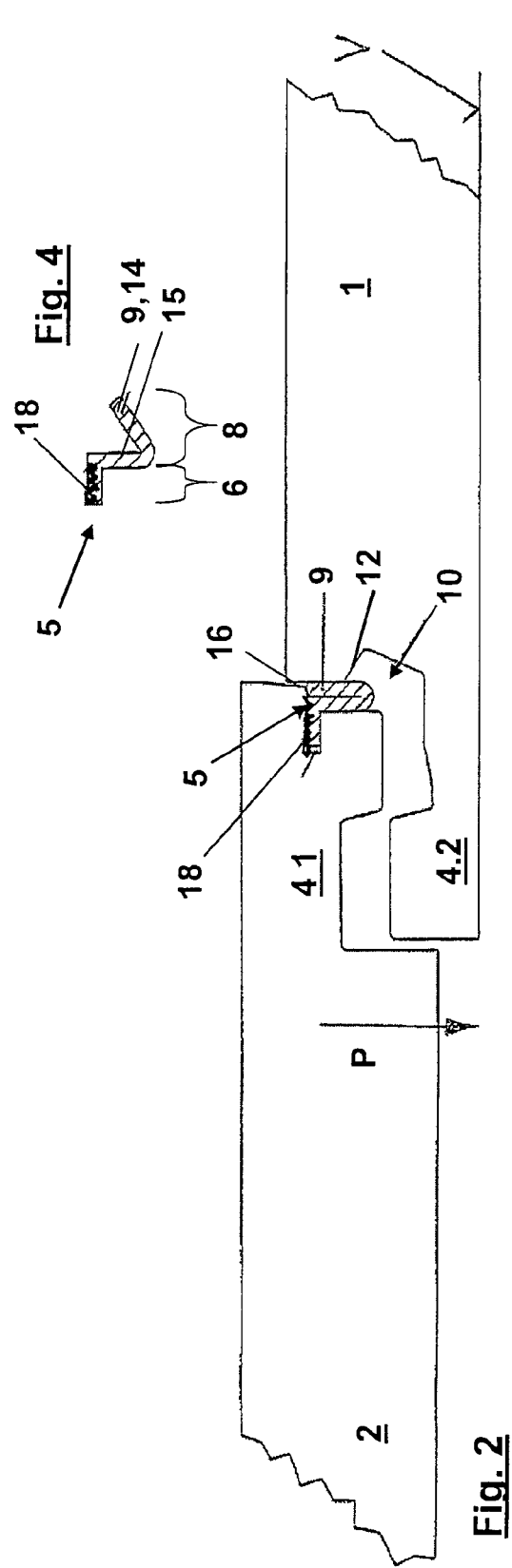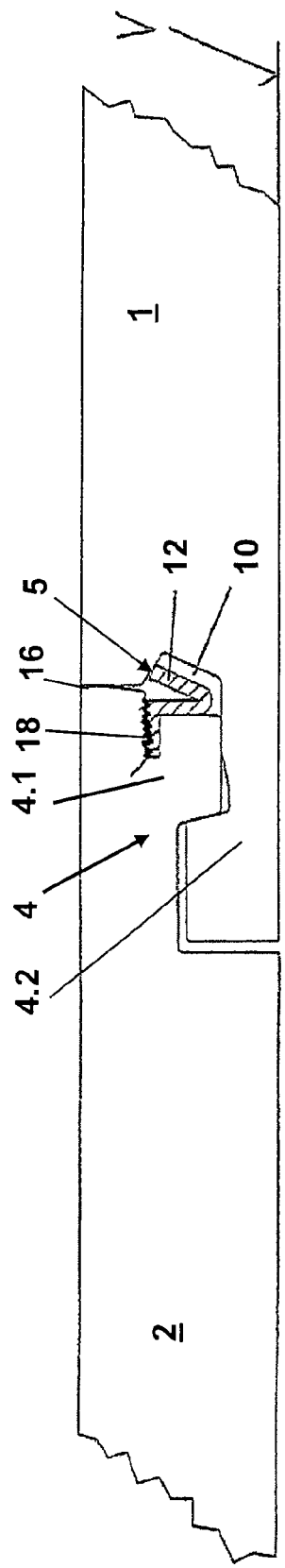

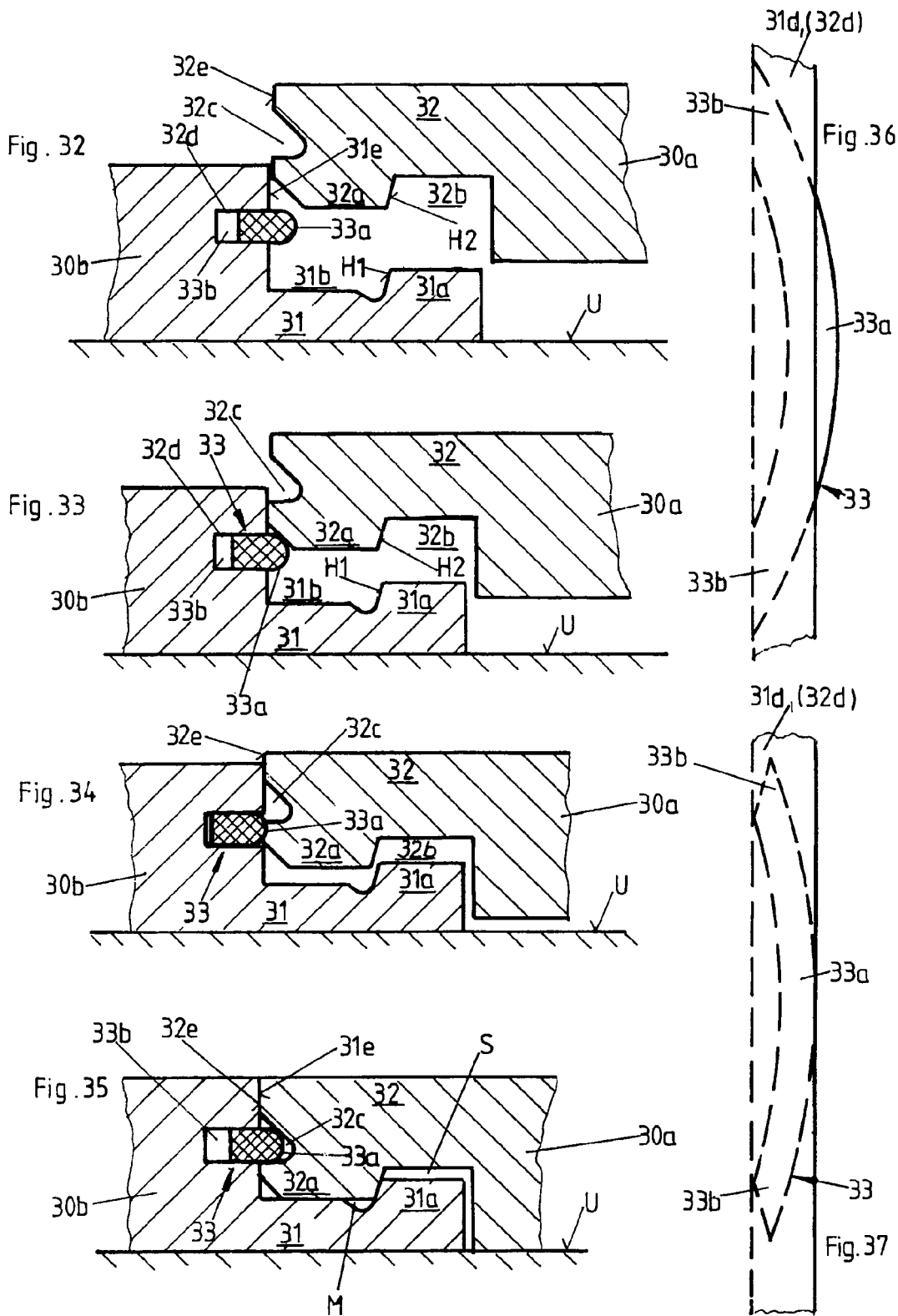

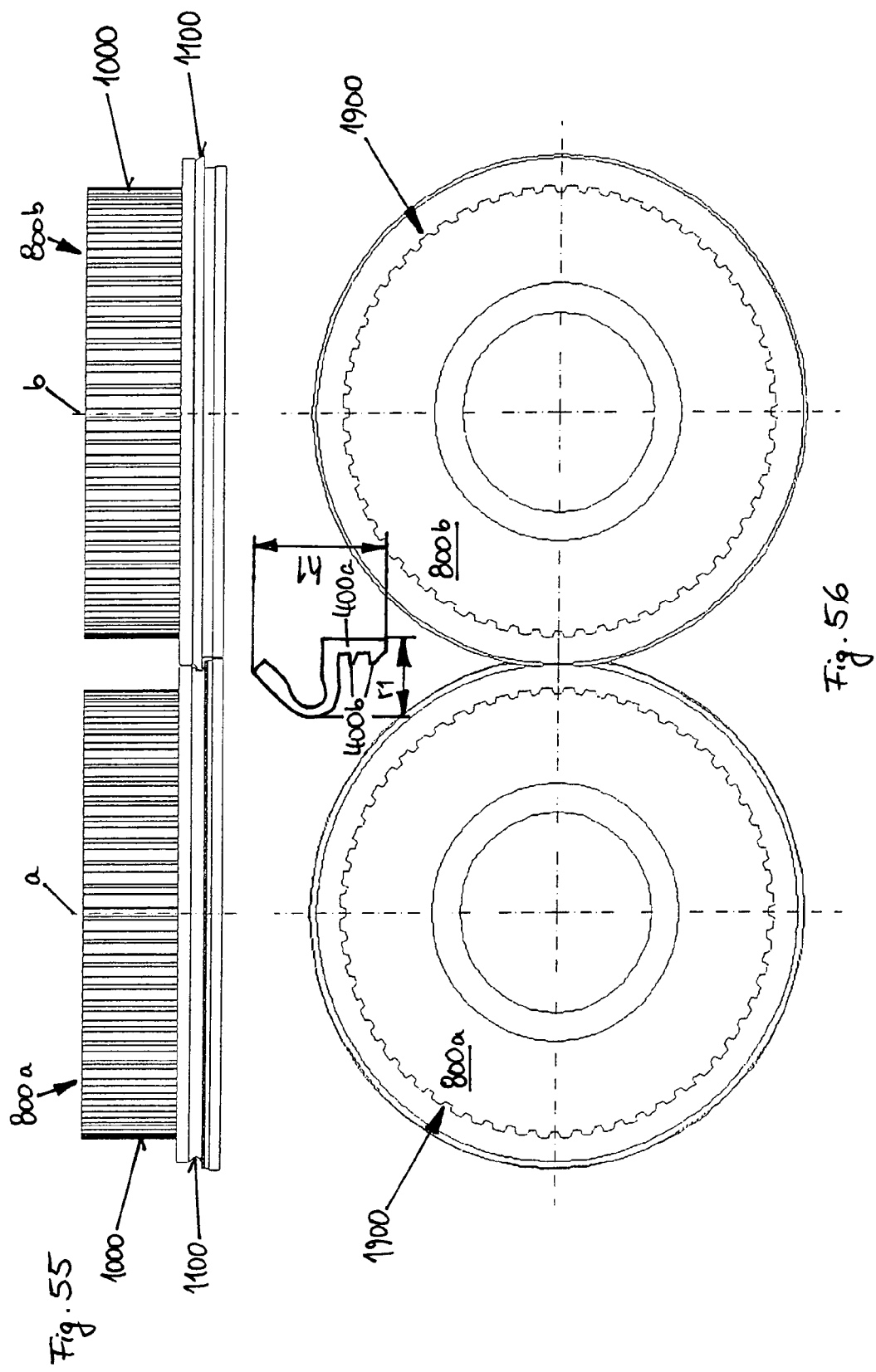

APPARATUS FOR PREMOUNTING OF LOCKING ELEMENTS TO A PANEL

Figure 1:
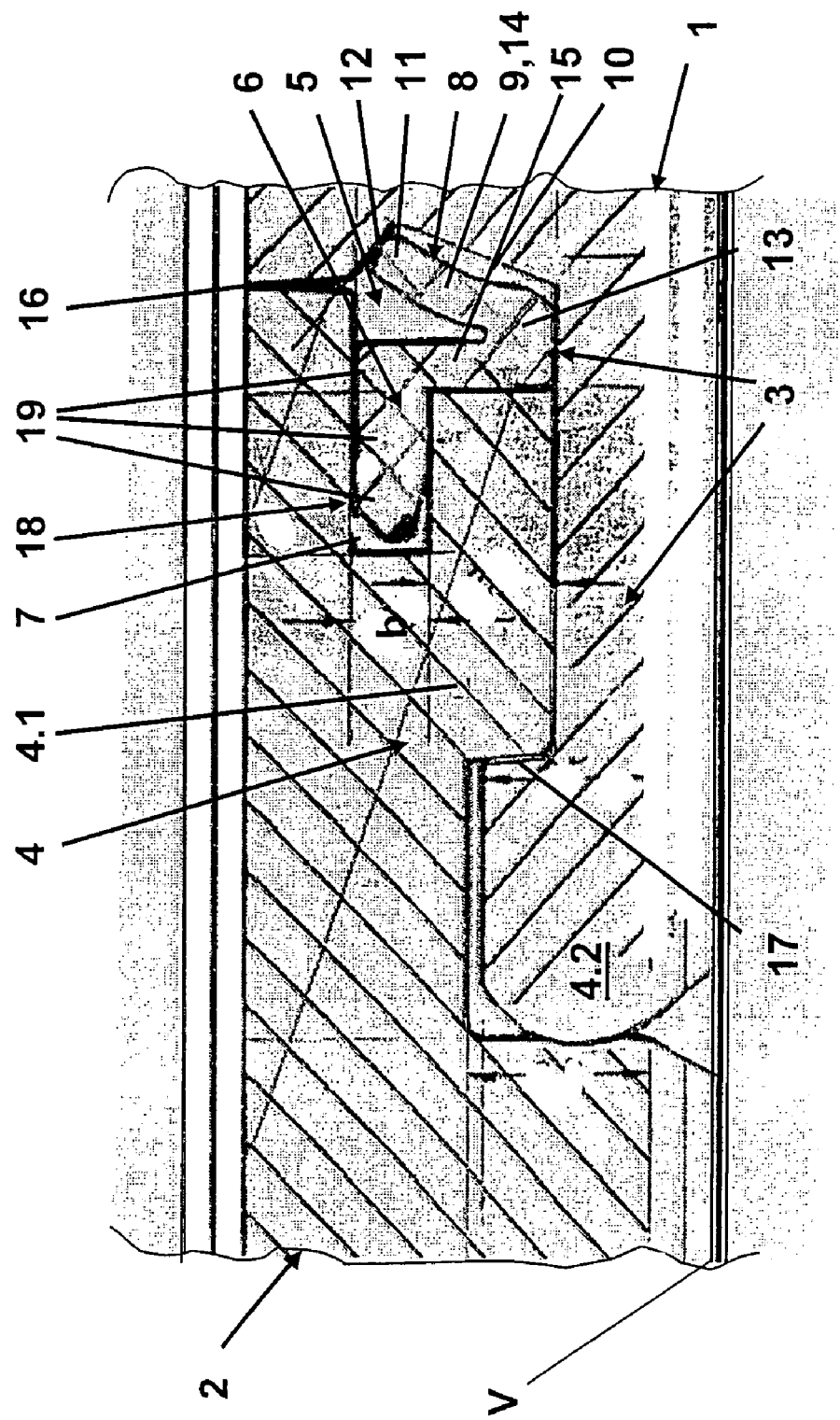

The invention concerns a locking element, panel with separate locking element for locking panels, method of installing a panel covering comprising panels with locking elements and a method and apparatus for pre-mounting one or more locking elements to a panel.

The invention concerns a locking element for a fixing system for quadrangular plate-shaped panels wherein the locking element is provided with an insertion portion for insertion of the locking element into a locking groove, provided in the longitudinal direction of an edge of the panels, of a first panel in an insertion position, and a locking portion for engagement into a latching recess of an undercut configuration, which is provided in a laid configuration of the panels in an opposite edge of a second panel and extending in the longitudinal direction of said edge and in opposite relationship to the locking groove, wherein the locking portion includes a resilient latching tongue which during assembly of the two panels is automatically latchable into the latching recess.

The locking groove of the edge of the panel is also referred to hereinafter as the holding gap.

It primarily concerns a panel which can be connected to a similar panel by a substantially vertical movement of a fresh panel, namely, perpendicularly to its plane, with similar panels, wherein the above-mentioned resilient locking element is used.

It further concerns a method of automatically mounting a resilient locking element to an edge of a panel, wherein the panels are for example those such as wall, floor and ceiling panels which are used for the fitment to rooms.

A general state of the art of a locking element is known from WO 00/47481. A locking element of the general kind set forth is known from WO 03/016654.

The locking element of WO 03/016654 prior to the panels being laid, is inserted with its insertion portion into the locking groove in a panel. During the mounting operation the latching tongue of the locking element latches automatically in a latching recess in an adjoining panel. For that purpose, to produce a spring energy, the latching tongue will be applied against the spring force of the latching tongue as far as possible in a direction towards the insertion portion, which detrimentally requires a correspondingly high level of application force. In addition, the locking element can disadvantageously slip due to the handling procedure involved when laying the panels, whereby proper laying of the panels with the latching engagement into the latching recess is at least rendered more difficult.

The object of the invention is to provide a latching element, also referred to as a locking element, of the kind set forth in the opening part of this specification, which effectively counteracts the above-indicated disadvantages, and aims to afford a panel which can be easily installed, with an additional locking element, which can be inexpensively produced by machine, more specifically by means of a method and an apparatus for automatically pre-mounting the locking element to an edge of the panel, in which respect industrial mounting is to be possible.

In accordance with the invention the specified object is attained in that the locking element has anchoring means and the locking element can be captively anchored by the anchoring means with its insertion portion in the locking groove.

That arrangement provides that the locking element is held in its insertion position and cannot slip due to the handling procedure involved when laying the panels.

Preferably the locking element is made in one piece. Further preferably the locking element comprises plastic material. Preferably the locking element is produced by extrusion.

In an embodiment the anchoring means can provide that the locking element can be inserted in the locking groove, producing a mechanical prestressing effect. For that purpose the locking element can be inserted remaining loose with its insertion portion in the locking groove. The mechanical prestressing action causes the insertion portion to be braced in the locking groove, insofar as it is supported in the insertion position against inner side surfaces of the locking groove so that it is only with the application of an elevated level of force that it can be moved against the prestressing force in the locking groove out of its insertion position.

For that purpose the insertion portion, at least at a location of its cross-section, can have an oversize in relation to the width of the locking groove provided for insertion of the locking element. In that way the insertion portion in the insertion position can be deformed at that location of its cross-section, with elastic or plastic-elastic deformation of the locking element, and can press against the inner side surfaces of the groove, whereby material delimiting the locking groove can be elastically and/or plastically-elastically deformed. As a consequence, a corresponding anchoring force can be achieved for anchoring the locking element in the insertion position and thus for affording a force-locking connection between the insertion position and the locking groove. In addition at the location of its oversize the insertion portion can dig fast, hook or bore into the inside walls of the locking groove, whereby a positively locking connection can be afforded between the insertion portion and the locking groove. As a further advantage, compensation in respect of dimensional inaccuracies between the insertion portion and the locking groove can be implemented by way of the oversize portion. It will be appreciated that a plurality of locations or one or more portions or points on the insertion portion can also be provided with an oversize and, with insertion of the insertion portion into the locking groove, can result in a force-locking and/or positively locking connection between the insertion portion and the locking groove.

To provide the oversize, at least one projection can be provided at least at a larger side surface of the insertion portion, which side surface is towards the inner side surfaces of the locking groove in the insertion position. In that case the projection can project beyond the larger side surface to provide the location having the oversize portion. In that way the projection, in the insertion position of the locking element, can bear at the end against the inner side surface of the locking groove, which is towards the larger side surface, and, by virtue of its oversize, can produce a corresponding bracing effect for the insertion portion in the locking groove. In regard to a uniform bracing effect and in regard to production of the locking element which should preferably be extruded from plastic material, it is proposed that the projection is to extend at least over a lengthwise portion of the locking element, preferably over the entire lengthwise extent of the locking element. To provide for mechanically more stable support for the locking element in the locking groove, the arrangement preferably has a plurality of projections which are in parallel mutually spaced relationship on at least one of the two larger side surfaces, which can be applied at the end against the inner side surface, that is towards the larger side surface, of the locking groove with the oversize, and thus can produce corresponding bracing for the insertion portion in the locking groove. Projections or the like can also be provided on both larger side surfaces to afford a locally limited oversize.

The projection can be of a configuration which decreases towards its end face. By virtue of that configuration its cross-section can be trapezoidal. In that case, only one longitudinal side surface of the projection can be inclined towards the centre line of the projection while the other longitudinal side surface is perpendicular to the insertion portion. The trapezium of the cross-section can also be of an equilateral configuration. The longitudinal side surfaces of the projection can also be of a curve configuration perpendicularly to the longitudinal extent thereof. Preferably the cross-section is of a part-spherical shape.

In a preferred development of the projection the two longitudinal side surfaces of the projection converge in a wedge shape. In that case the cross-section can be of a triangular configuration, preferably an isosceles or right-angled triangle, the longitudinal side surfaces being flat while the free tip of the respective triangle preferably includes an acute angle.

Preferably the longitudinal side surface remote from the free end of the insertion portion can extend perpendicularly to the longitudinal extent of the insertion portion or in a directional component away from the free end from the larger side surface. Accordingly, with the two longitudinal side surfaces converging to afford a wedge configuration, in cross-section this can form a right-angled triangle or a sawtooth-like triangle or, with curved longitudinal side surfaces, a shark's fin-like triangle each with a respective longer side. That permits the insertion portion to be easily pressed into the locking groove in an insertion direction over the longer side in the direction towards the free end of the insertion portion or towards the base of the locking groove and permits the projection to dig fast or hook into the inside walls of the locking groove upon release of the insertion portion in opposite relationship to the insertion direction.

The longitudinal side surfaces can also converge in a curved configuration and in cross-section can define a tip with a preferably over-acute angle, whereby plastic-elastic deformation of the tip is facilitated with insertion of the locking element into the locking groove to compensate for inaccuracies in respect of shape and for simultaneously clamping the locking element fast in the locking groove.

The insertion portion can be of a curved configuration towards its free end. In other words, in its larger side surfaces the insertion portion can be of a curved configuration. That curvature causes the insertion portion to be preferably elastically braced in the locking groove. Preferably, in cross-section the sides formed by larger side surfaces are simply curved and curvature of the larger side surfaces is in approximately the same direction, wherein the radius of curvature preferably extends approximately in the direction of the section straight lines formed by the cross-sectional plane and the longitudinal sectional plane or perpendicularly to the larger side surfaces of the insertion portion.

In an alternative configuration the free end of the insertion portion can additionally or alone be of a hook-shaped configuration. In that case the free end can be braced in the insertion position in the locking groove.

Furthermore the free end can additionally or alone have a slot which is provided from the end of the insertion portion and approximately parallel to the lengthwise extent of the insertion portion or towards the locking portion. Furthermore at least one of the sides which delimit the slot at the free end of the slot can extend in a curved configuration away from the slot. Preferably the slot is V-shaped, wherein, at the location at which the sides of the slot converge, there can preferably be provided an enlargement which for easier insertion of the insertion portion into the locking groove makes it easier for the sides of the slot to be pressed or brought together. For insertion purposes the sides of the slot can preferably be compressed by way of a guide which is provided, and in the insertion position they can be supported against and braced against the inner side surfaces of the locking groove.

The locking element can be at least in part over its lengthwise extent of a curved shape, the radius of curvature of which extends approximately in the direction of the section straight lines formed by the cross-sectional plane and the longitudinal sectional plane. With insertion into the locking groove which is of a linear configuration, the locking element is straightened in opposite relationship to its curvature and thus in the insertion position bears in a stressed condition against the inner side surfaces of the locking groove.

For easier insertion of the locking element into the locking groove, the locking element can have an introduction aid, particularly when it has an oversize portion as described hereinbefore. For that purpose the cross-section of the free end of the insertion portion can be of a decreasing configuration, preferably of a taperingly decreasing configuration, at least from one of its larger side surfaces which in the insertion position faces towards the inner side surfaces of the locking groove. For the purposes of more secure fixing in the locking groove, the bottom of the locking groove can have an opening which is adapted to the free end for receiving the free end with the introduction aid.

In a preferred development the locking portion can be of an approximately V-shaped cross-section with a first and a second limb, wherein the latching tongue is formed by the first limb and the second limb is laterally connected to the insertion portion. In that respect attention is directed to the V-shaped locking element also described in WO 03/016654 and the disclosure of WO 03/016654 in respect of the V-shaped locking element is hereby incorporated into the present disclosure.

In the latching position the first limb can bear at its end against a contact surface provided in the latching recess. With insertion of the locking element into the insertion position and latching of the locking tongue in the latching recess, the end contact against the contact surface provides that, as is described in greater detail hereinafter, the second panel can be lifted off the first panel in opposite relationship to its assembly direction so that locking of the two panels can be achieved by the end contact of that arrangement. That procedure is also described in WO 03/016654 and clearly illustrated therein for example in FIGS. 18 and 19, the disclosure of WO 03/016654 in regard to laying the panel also being incorporated herein.

In a development of possible embodiments, the locking portion can have two or more latching tongues which extend in mutually spaced relationship from the second limb and which in the latching position can be supported against a provided contact surface or against a respective contact surface. In that way the two latching tongues, with the second limb, can form a double V-profile with two first limbs.

Preferably, an application aid can be provided on the locking element for elastically applying the two limbs, the first and the second limb, against each other upon assembly of the panels. The latching tongue is prestressed by way of the elastic application procedure and stores a specific spring energy. In the assembly procedure described hereinafter, which involves locking to a panel disposed in a first row a new panel in a second row, elastic application is effected by the new panel firstly being attached to the lying panel in an inclined position relative to the lying panel and then pivoted downwardly into the plane of the lying panel. For that purpose the new panel has the locking element which in the insertion position is positioned in the locking groove arranged in the edge which is towards the lying panel but which has not yet been completely lowered, in which case the V-shaped profile of the locking portion faces with its tip towards the lying panel. When the mutually facing edges of the two panels move past each other, the first limb is pressed with the latching tongue against the second limb, producing a spring stressing force, and is preferably caused to bear against the second limb. When the new panel is moved downwardly, the locking tongue at least partly relaxes into the latching recess in the lying panel. For that purpose the end of the latching tongue, for locking purposes, can bear against its contact surface associated therewith.

In that respect it can be provided that the latching tongue engages directly on the insertion portion and in the relaxed condition includes an angle of greater than 90° with the insertion portion. In that case, in the same manner as described hereinbefore in relation to the V-shaped profile, the latching tongue with its attachment to the insertion portion, can first be moved past the lying panel and braced at an angle relative to the insertion portion, which is preferably somewhat greater than 90°, equal to 90° or somewhat less than 90°.

The fact of the two limbs bearing against each other at the location at which the mutually facing inner side surfaces of the two limbs are fed onto each other can lead to deformation which causes difficulty in applying the two limbs against each other. It can therefore be provided that at that location the locking element has an application aid in the form of an enlargement in the intermediate space between the limbs. The enlargement can be in the form of a round bore.

In addition or alone, for the application aid, the second limb can be of a configuration in respect of its cross-section such as to enlarge conically towards its end connected to the first limb. That means that it is possible to enlarge the intermediate space between the limbs, which facilitates application of the limbs for laying the panels in the usual fashion. Preferably the latching tongue should be pivotable towards the second limb to such an extent that it is perpendicular to the surface on which the panels are to be laid.

Preferably the latching tongue in the relaxed position can be at an angle relative to the second limb which is greater than that in the latching position of the latching limb. In that way the latching tongue in its latching position can bear in a prestressed condition laterally against a side surface of the latching recess. That can provide that the first limb or the latching tongue can still be supported at the end against a contact surface provided in the latching recess, even upon slight movement away from each other of two panels connected by way of the locking element, insofar as, in that slight movement away from each other of the panels, the resilient latching tongue, by virtue of further relaxation, remains laterally against the side surface of the latching recess and thus at the end against the contact surface.

To increase its potential spring force and to afford a greater degree of safeguard against kinking, the latching tongue or the first limb can be of a curved shape with a curvature which faces away from the second limb.

To strengthen and increase the stability of the V-shaped profile, the portion of the V-shaped profile, which is formed by both limbs jointly, is large in comparison with the height of the limbs. In that respect that portion can be up to a half of the total height of the V-shaped profile. That is also a way of adjusting the potential spring force of the latching tongue.

It will be appreciated that the above-described features of the locking element when combined together can also lead to advantageous configurations of the locking element.

To attain the object of the invention, there can be provided a fixing system for quadrangular plate-shaped panels with holding profiles which are arranged at the edges of the panels and of which holding profiles arranged in mutually opposite relationship fit to each other in such a way that similar panels can be connected together, in particular for floor panels, with mutually oppositely disposed first holding profiles which are of such a configuration that it is possible to lock to a panel disposed in a first row in a second row a new panel by a procedure whereby the new panel is firstly attached to the lying panel in an inclined position relative to the lying panel and is then pivoted downwardly into the plane of the lying panel, and mutually oppositely disposed second holding profiles which have corresponding hooks, wherein a hook connection can be made with one of the hooks of the new panel and a hook of a panel which is already lying in the second row, by the downward pivotal movement of the new panel, and associated with each hook connection is an additional locking element which, prior to the hooking of two panels, can be inserted into a locking groove of one of the hooks of a first panel into an insertion position such that in the hooked condition of two panels it prevents release of the hook connection in a direction perpendicularly to the plane of the laid panels, wherein the locking element and the locking groove are provided at a surface of the hook which in the laid condition of the panels is oriented approximately perpendicularly to the plane of the panels, which plane is in the form of the laying plane, and wherein the locking element can be of one of the above-described configurations. In other respects in regard to the configuration of the fixing system and here in particular regarding the configuration and function of the hook connections attention is directed to the disclosure of WO 03/16654 which is also incorporated into the disclosure of the present invention.

As already described hereinbefore the latching tongue can bear under a spring prestressing against an inner side surface of the latching recess.

It is further provided that the inner side surfaces of the locking groove are arranged in mutually parallel relationship, for conformity with the above-described embodiments of the insertion portion, so that the insertion portion can engage into the locking groove without any problem.

For anchoring thereof or in addition to the above-described anchoring options, the locking element can also be glued in the locking groove.

Furthermore there are provided panels in particular floor panels, of a quadrangular, plate-shaped configuration, wherein a panel lying in a first row is lockable to a new panel for a second row, by a procedure whereby the new panel is firstly attached to the lying panel in an inclined position relative to the lying panel and subsequently pivoted downwardly into the plane of the lying panel, wherein the two panels can be connected together by a fixing system according to one of the above-described embodiments with a locking element according to one of the above-described embodiments.

A further embodiment by way of example for a locking element stands out from the known locking element by virtue of its substantially simpler structure. The locking element is made from material which is in strip form or in the form of an elongate line, and is of a for example flat straight cross-section. In order to mount it to a panel, a part of the cross-section of the locking element is inserted into a holding gap provided for same in an edge of a panel while the other part of the cross-section projects freely from the edge of the panel. The projecting part acts as a resilient latching tongue. The latching tongue is bent over, in the assembled condition of two panels. The latching tongue then extends into a latching recess which must be provided on a coupled adjacent panel.

That blocks the return movement, that is to say the panels are prevented from moving away from each other in a direction perpendicularly to the plane of the panels.

In order to simplify insertion and automatic latching engagement, the locking element, instead of a straight flat cross-section, can alternatively involve a cross-section with a bend or kink. In that case the latching tongue already faces, in the neutral position, in that direction in which it is further bent during the joining movement, before it springs back by a short distance into the latching recess and comes into latching engagement.

Each of the above-described locking elements can either be provided on a lying panel and can come into latching engagement in a latching recess in a panel which is moved vertically thereto, or can be provided on that panel which is moved vertically to a panel which is in a lying position, depending on which panel has the holding gap for anchoring the locking element. Panels can also be latched with two locking elements if both the edge of a panel in a lying position and also the edge of a panel which is moved vertically thereto have a holding gap, in which a respective locking element is anchored.

A further embodiment of a locking element is in the form of a resilient locking clasp. For use, that locking clasp is fitted into a holding gap in a panel edge. The locking clasp can spring back into that holding gap when the locking clasp is pressed flat due to an external action thereon. A concept of that kind is known from WO 2005/054599. Preferably the locking clasp according to the invention however is in the form of an extruded plastic member. If the extrusion process produces an elongate straight profile, the profile, preferably when it has issued from the extruder and is still in a warm-deformable condition, is shaped with an additional device to form a curved clasp which cools and sets in that form. The extruded profile can be cut up into separate locking clasps prior to or after the operation for shaping the clasp.

As mentioned in the opening part of this specification the invention relates predominantly to a panel which can be joined to similar panels by a substantially vertical movement of a new panel, more specifically perpendicularly to the plane thereof, with similar panels.

Panels can be made up from wood or wood materials such as chipboard, MDF (medium density fibreboard), HDF (high density fibreboard) or other standard wood panel materials and at the top side and underside can have coatings which have decorative functions and which in addition, at least on the top side, form a resistant duty surface. The panels are produced by means of usual production installations. The production installations effect in particular profiling of the panel edges because the panel edges generally have complementary edge profiles so that similar panels can be joined together. Usual thicknesses for the panels are in the range of 3 mm to 20 mm.

A panel of the general kind set forth of quadrangular shape, with a top side, underside, peripherally extending edges and with holding profiles at the edges is known from DE 299 24 454 U1. This involves a panel whose holding profiles of two edges adjacent to a corner form an upper hook which has an opening directed towards the top side and whose holding profiles of the other edges adjacent a corner are respectively in the form of a counterpart portion in relation to the oppositely disposed upper hook, as a corresponding lower hook which has an opening directed towards the underside, wherein, as mentioned above, a new panel can be connected to similar panels by a vertical movement, namely perpendicularly to its plane, and wherein an additional automatically latching locking element is provided or mounted on the panel for arresting the connection to prevent it from coming loose.

The structure of a locking element as known from DE 299 24 454 U1 is inexpedient. It requires a great deal of structural space. In addition the structural shape of the sole embodiment of the additional locking element, which is disclosed in DE 299 24 454 U1, is considered to be disadvantageous. It is disadvantageous for example when the situation involves fitting the locking element to a panel edge by machine and automatically during operation of a panel production installation.

As discussed in the opening part of this specification the invention aims to provide a panel which is simple to install, with an additional locking element which can be inexpensively produced by machine.

In accordance with the invention that object is attained in that the edge of the panel is provided with a holding gap, also referred to as a locking groove, that the locking element has at least one anchoring tongue, also referred to as an insertion portion/insertion tongue, and that the anchoring tongue has a pressing surface which is pressed by a pressing-in tool and by way of which a force was applied for pressing the anchoring tongue of the locking element into the holding gap of the panel.

Another important development of the solution to the technical problem involved provides that at least one edge of the panel has at least one locking element strip which is brought into connection with the edge of the panel by way of a zip fastener movement.

It appears to be an important innovation for a panel to be developed in such a way that automatic fitment of a locking element, as synchronously as possible, becomes a possibility. Synchronous means that the feed and attachment of the locking element takes place synchronously with the conveyor movement of the panels in a production installation.

That is achieved because the components involved can be processed, on the basis of the zip fastener principle. In accordance with the invention that means that a locking element strip is moved to the edge of a panel in such a way as occurs in principle with a zip fastener edge which is moved towards a second zip fastener edge and deflected and connected by a slider of the zip fastener. The locking element is of such a configuration that it can be moved in a similar manner towards the edge of a panel and deflected with suitable means. In that case however anchorage of the locking element to the edge of the panel is effected easily without being based on the principle of zip fastener hooks which are meshingly dovetailed together.

As the panel is intended preferably to be connected to other panels by a pure vertical movement, resilient locking elements are arranged at least at two edges. It is desirable if required to provide different resilient locking elements depending on the respective loading at the edges.

It is also desirable if at least one locking element is in the form of a clip with clip portions arranged in a V-shape or U-shape, wherein the anchoring tongue is arranged transversely at one of the clip portions.

At least one other locking element is in the form of an extruded curved locking clasp, the locking clasp is accommodated resiliently movably in the holding gap, wherein provided over the length of the locking clasp is at least one region which forms the anchoring tongue.

The invention concerns a method of installing a floor comprising panels having locking elements. Methods are separately set forth, which relate exclusively to locking a first row of panels because, for laying a first row of panels, depending on the respective installation situation involved, it is possible to apply different laying steps which are not possible in a following row.

The basic starting point adopted is that of locking quadrangular panels which have a top side, an underside and peripherally extending edges with holding profiles arranged thereat, with the proviso that at least two oppositely disposed holding profiles of each panel are in the form of complementary hook profiles so that hook profiles of adjacent panels can be fitted one into the other in a vertical direction, wherein at least one of the hook profiles is provided with an additional locking element with a resilient latching tongue which can be latchingly engaged into a latching recess in an adjacent panel.

In that situation the first row of panels can be locked without involving a vertical movement for coupling purposes and without latching engagement, more specifically as an alternative by inserting the complementary hook profiles into each other in mutually aligned relationship.

It is possible to dispense with a vertical movement for coupling purposes and for latching engagement purposes, only for locking the first row of panels. The hook profile with locking element is laid in aligned relationship behind the complementary hook profile of an adjacent panel and the hook profiles are then pushed one into each other. For the beginning of the pushing movement, the locking element can be somewhat deformed resiliently so that it fits into the latching recess in the adjacent panel.

Alternatively the first row of panels is locked by a procedure whereby the hook profiles to be coupled are firstly laid loosely one upon the other and then the edges of the panels are pushed towards each other until the latching tongue of the resilient locking element is pushed resiliently inwardly by contact with the adjacent panel and the panel with the locking element is thereafter moved vertically, namely perpendicularly to the plane of the panel, into the hook profile of the adjacent panel until the resiliently inwardly moved latching tongue of the locking element automatically moves resiliently out into the latching recess of the adjacent panel and arrests the hook connection in a vertical direction.

The hook profiles to be locked are desirably in the form of an upper hook and a lower hook, with the upper hook being laid loosely on the lower hook. The locking element can be arranged either on the upper hook or the lower hook. As soon as the edges of the panel are pushed towards each other by a substantially horizontal movement and the latching tongue of the locking element is moved resiliently inwardly, the upper hook is hooked into the lower hook by a substantially vertical movement. In that situation the inwardly moved latching tongue of the locking element automatically moves resiliently outwardly in the latching recess of the adjacent panel and arrests the hook connection.

The way in which panels in following rows are laid depends on what kind of holding profiles is provided on those edges with which the panels of different rows of panels are connected together. A first general kind of holding profiles for connecting rows of panels is designed for a joining movement in a vertical direction, namely perpendicularly to the plane of the panel. That situation preferably involves using a hook profile provided with one of the resilient locking elements according to the invention. In a poorer design configuration, it is also possible to use one of the known locking elements. At any event a new panel is attached from above to panels which have already been installed. The new panel can be moved downwardly either in a parallel position in relation to the panels which have already been installed or it is first moved downwardly somewhat more deeply at one corner until the hook profiles partially engage into each other and it is then progressively brought into hooking engagement on the basis of the zip fastener process. Panels which are flexible and can be bent and twisted favour the zip fastener process. In that way panels which for hooking engagement require a substantially vertical motion component can be particularly easily connected.

Another general kind of holding profiles is of such a nature that a positively locking connection is made by inclinedly attaching a new panel to panels, which are in a lying condition, in a front row, and then pivoting the new panel downwardly into the plane of the panels which are in the lying position. Modified tongue-and-groove profiles are provided for that purpose at the edges for connection to a front row.

The invention concerns a method of automatically mounting a locking element to an edge of a panel. The panels are for example wall, floor or ceiling panels which are intended for fitting in rooms.

Panels which are suitable for locking with a locking element comprise for example wood or wood materials such as chipboard, MDF (medium density fibreboard), HDF (high density fibreboard) or other standard wood panel materials. The panels are produced by means of conventional production installations. The production installations implement in particular profiling of the panel edges because the panel edges generally have complementary edge profiles so that similar panels can be joined together.

An example for an automatic locking element is known from WO 00/016654 (EP 1 415 056 B1), the disclosure of which in respect of the configuration of the loose locking element is incorporated herein by the foregoing reference.

The known locking element serves for arresting two panels. It is of a V-shaped cross-section, wherein provided at one end of the V-shaped cross-section is a laterally projecting insertion tongue which can be fitted into a groove in an edge of a panel in order to join the locking element to the panel.

The object of the present invention is to propose a method and an apparatus for mounting the known locking element automatically to an edge of the panel, in which respect industrial mounting is to be a possibility.

According to the invention that object is attained in that the locking element in the form of an endless cable-like locking element line is taken from a storage means and passed into a guide passage and fed to a separating station which separates the locking element line into individual locking elements, and wherein each individual locking element is moved in synchronous movement in relation to a panel continuously transported by the panel production installation to an edge of said panel and pressed by a pressing device into a receiving region of the edge of the panel.

The new method can be integrated without any problem into conventional production installations for wall, floor and ceiling panels because it requires a small amount of space for it to be carried into effect. Because those production installations usually transport panels at high speed in a continuous movement, each locking element is respectively moved to the panel edge at the same speed as that at which the production installation is operated at that time.

Desirably, the locking element is formed from plastic material and for example extruded. In that case it is processed in the form of an endless line of locking elements.

As the locking element is so small that it fits within a connecting location of wall, floor and ceiling panels, it is of a relatively small cross-section. It is desirable if the heightwise dimension of the locking element is no greater than half the thickness of the panel. Embodiments with a larger locking element have a detrimental effect because the strength of the edge of the panel is worsened because of portions which are milled away to receive the locking element, and the panel edges become susceptible to breakage.

Because of the small cross-section of the locking element, special precautions must be taken for applying a transport movement to the locking element line. A tensile loading on the locking element line is possible without any problem. Applying pressing forces for the purposes of transmitting movement by a pushing action however is difficult because the locking element line is susceptible to kinking or buckling.

In order to prevent a buckling effect, there is provided a guide passage for the locking element line, which prevents lateral outward buckling of the locking element line. The guide passage is of a cross-sectional shape which also prevents unwanted rotation of the locking element line.

In order to obtain individual locking elements, the locking element line is guided to a separating station which separates the locking element line into individual locking elements.

The individual locking elements are advantageously moved to the edge in question of the panel at an acute angle of about 10° and are pressed into the receiving region of the edge of the panel by the above-mentioned pressing device. The receiving region of the panel edge has the receiving groove into which the insertion tongue of the locking element is pressed and preferably anchored in frictionally locking relationship.

A variant of the method provides a pushing advance device which pushes the locking elements or the locking element line through the guide passage in the direction of the pressing device.

In accordance with a development of the method the locking element line is separated into individual locking elements by a separating station which is arranged upstream of the advance device in the direction of through movement of the locking element line. The separated locking elements are then pushed in a row by the advance device successively through the guide passage to the pressing device. The advantage of this method is that transmission of a transport movement from the advance device to the row of locking elements occurs continuously.

A preferred method transposes the working steps in such a way that the locking element line is separated into individual locking elements by a separating station which in the through-travel direction is arranged downstream of the advance device. That involves a change in the transmission of movement. The locking element line is transported in a pushing mode by the advance device into the guide passage. As soon as the locking element is cut off however, it is transported out of the guide passage by a pulling force applied by the pressing device. The locking element is therefore cut off near the location at which the locking element is fed to the edge of the panel. The separating operation takes place at a time when the locking element is already in contact with the pressing device. For that reason the separating operation takes place so close to the panel edge that the front end of the locking element is already forced in between the pressing device and the panel edge because then the transport movement for the locking element can be transmitted from the pressing device into the locking element. That case involves a pulling force which is applied to the locking element by the pressing device.

Desirably, the transport movement of the locking element line is braked at the separating location, the braking action being produced by the engagement of the separating station, for example with a cutting blade, into the locking element line, because the cutting blade closes the guide passage. That ensures that the separating operation is not impeded by any transport movement and the cutting edge can precisely cut during the stoppage phase of the locking element line.

Furthermore, it is desirable in terms of a high production speed if the advance device conveys further locking element line during the braking of the transport movement without stopping. With the high production speed intended, constantly decelerating and accelerating the advance device in order thereby to implement a cyclic stopping action for the separating operation would be problematical.

The length of the locking element line which is conveyed during the separating operation must be put into intermediate storage. A buffer region is provided for that purpose. The arrangement dispenses with a rigid narrow guide passage in the buffer region. Instead, there is provided space in which the supplied length of the locking element line can move out of its regular travel path by a buckling movement.

In a simpler fashion a storage spring provided in the buffer region is actuated by the outward buckling movement of the locking element line. In that way a stress is imparted to the storage spring and spring energy is stored. That stored spring energy is automatically liberated after termination of the separating operation of the separating station, in which case the length of the locking element line which has been stored by virtue of the outward buckling thereof is advanced with a jerk.

Desirably the storage spring operates automatically in the buffer region so that there is no need for a particular control for buffer storage of the locking element line.

Another desirable development of the method provides that a given length of the locking element line is retained in a stock supply region between the storage means and the advance device.

The removal device, acting on the same principle as the advance device, can transmit a transport movement to the locking element line, in which case the locking element line is retained in the storage means in such a way that it is to be removed in as twist-free condition as possible. If removal is to be implemented from time to time at a reduced removal speed in order to keep the locking element line twist-free, the downward loop-forming part of the locking element line forms a supply zone in which a sufficient length of the locking element line is retained in order to process same at the required advance speed and to feed it to the separating station and the pressing device.

An apparatus is provided for carrying out the method. The apparatus serves for automatic mounting of a locking element to an edge of a panel, in particular a floor panel, wherein the locking element is in the form of an endless bucklable line which can be fed from a storage means, wherein there are provided a guide passage, an advance device, a separating station and a pressing device, and wherein the locking element line can be separated into individual locking elements by means of the separating station and pressed into a receiving region of the edge of the panel by means of the pressing device in synchronous movement with a panel continuously transported by the panel production installation.

In order to guarantee reliable guidance of the locking element line the guide passage is of a free cross-section which is almost coincident with the cross-section of the locking element line. Therefore the guide passage has a V-shaped cross-sectional region and a laterally projecting cross-sectional region, wherein the laterally projecting cross-sectional region adjoins an end of the V-shaped cross-sectional region.

Desirably the advance device has at least one advance roller with which a rotary movement can be transmitted to the locking element line by way of a frictional contact. In order to guarantee good transmission of movement, the advance roller is provided with a contour which forms a negative of that side of the locking element line, with which the advance roller is in frictional contact. The advance device is particularly reliable if there are provided two mutually opposite advance rollers which are driven in opposite directions and between which the locking element line is engaged.

The pressing device can have at least one pressing roller, by means of which a pressing force can be produced in perpendicularly relationship to the edge of a panel, and wherein with the pressing roller, if necessary, the rotary movement thereof can be converted by frictional contact into a transport movement of the locking element.

Preferably servomotors can be used for all driven rollers of the entire apparatus, servomotors being advantageous because of their positionally accurate controllability.

Desirably the separating station for the locking element line is arranged downstream of the advance device in the through-travel direction. That design configuration guarantees problem-free feed of the locking element line through the guide device and provides that the separating operation is effected only just before the position at which the locking element is fitted to the edge of the panel. In this embodiment the separating operation is effected only when the front portion of the locking element is already in frictional contact with the pressing device. That is because the transport movement for the locking element, after being cut away from the locking element, can only still be transmitted by the pressing device pulling the locking element. In this embodiment of the apparatus therefore there must be a change in the transport mode, namely from pushing transport by the advance device into pulling transport by the pressing device.

Desirably there is provided a buffer region for the locking element line, which is further conveyed thereto, while the separating station is in an engagement condition.

In a simpler fashion the buffer region has an elastically deformable storage element and spring energy can be stored in the elastically deformable storage element by virtue of outward buckling of the locking element line, in which case the spring energy can be delivered or liberated by the elastically deformable storage element. The spring energy is liberated as soon as the separating operation at the separating station is concluded and the conveyor cross-section of the guide passage which the separating station closed off during the separating operation is opened again. The spring energy then causes a jerk advance movement of that part of the locking element line which was fed to the buffer region during the separating operation and which brought about mechanical stressing of the storage element with spring energy.

A simple construction of a buffer region with a storage element has a conveyor passage which is elastically deformable and in particular variable in length. By virtue of its elastic deformability such a conveyor passage stores on the one hand spring energy and on the other hand stores a length of the locking element line, insofar as the conveyor passage is elastically increased in length by virtue of the outward buckling effect of the locking element line.

Desirably the conveyor passage is formed from a helical cylindrical spring. The helical cylindrical spring can be connected between the advance device and the pressing device.

Desirably the conveyor passage is arranged in a neutral position in an arc, whereby the locking element line is deflected. The deflection effect promotes the buckling action and also allows the entire apparatus to be of a construction which saves on space. In that way the apparatus can be integrated in a very small space into conventional production installations for wall, floor and ceiling panels.

A further helpful measure is found in the fact that there is provided at least one means for synchronisation of the transport movement of the locking elements with the transport movement of the panels in the production installation.

The means for synchronisation of the transport movement can have a movement pickup. The movement pickup detects the transport movement of the panels in the production installation, wherein the information for synchronisation can be transmitted from the movement pickup to a control means with which the transport movement of the locking elements is controllable.

If a panel is to be provided at one or more further edges with a locking element or a plurality of locking elements, by way of example an additional apparatus as described hereinbefore can be integrated into the production installation for each further edge. The panels are transported in the usual manner for processing in a longitudinal direction and the transport direction is altered for processing in a transverse direction, for example being deflected through 90°. The speeds can vary. They depend substantially on the ratio of the edge lengths. If the panel is a square panel the edges in the longitudinal and transverse directions are of the same length. The transport speeds are preferably the same. If in contrast a panel has oppositely disposed long and short edges, then the transport speed is appropriately adapted to the ratio of the different edge lengths. The transport speed in a direction parallel to the long edges is usually higher than in a direction parallel to the short edges of a panel.

Figure 5A:
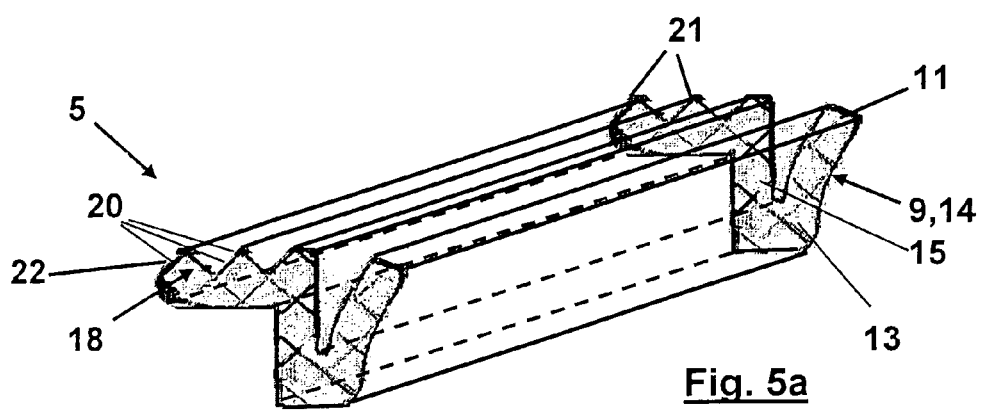
Figure 6:
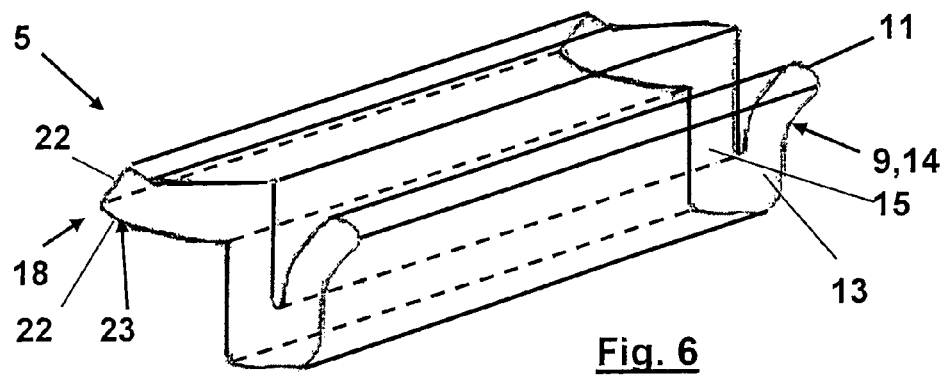
Figure 7A:
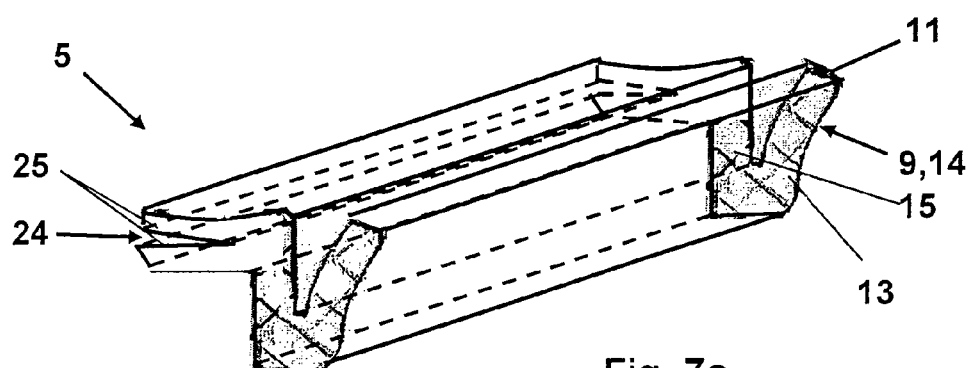
Figure 7B:
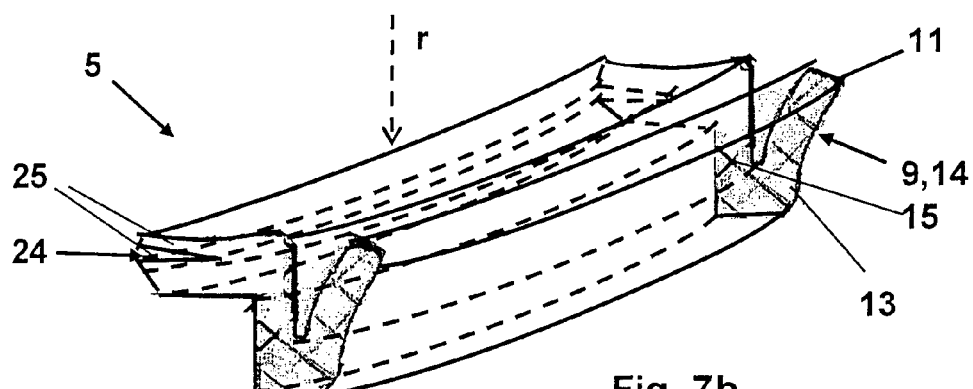
Figure 8A:
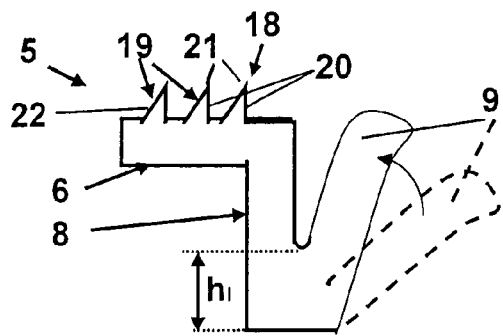
Figure 8B:
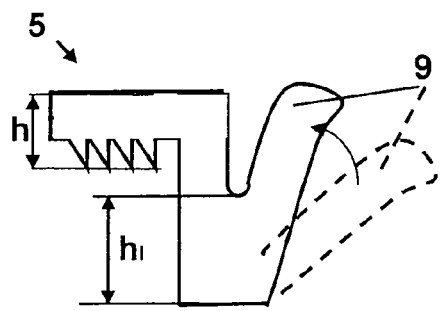
Figure 8C:
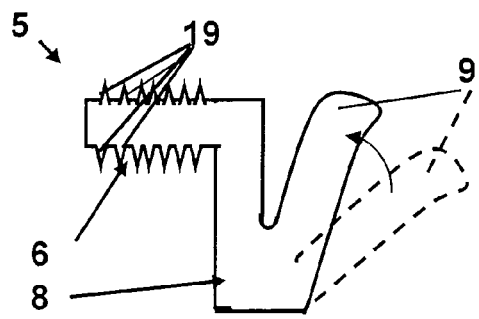
Figure 8D:
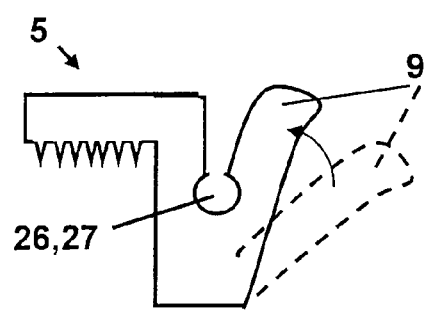
Figure 8E:
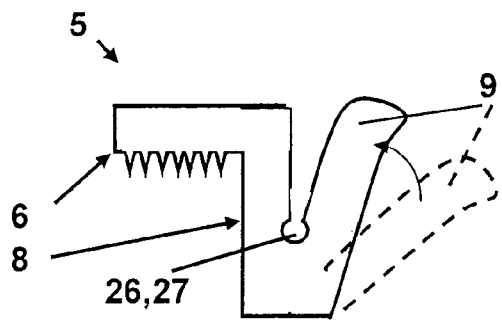
Figure 8F:
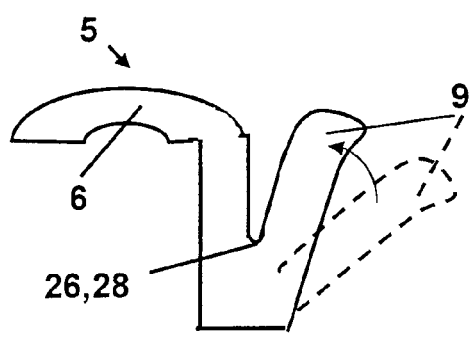
Figure 8G:
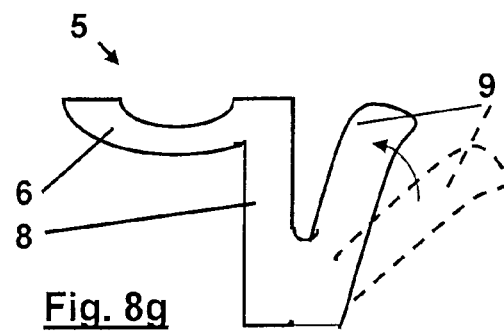
Figure 8H:
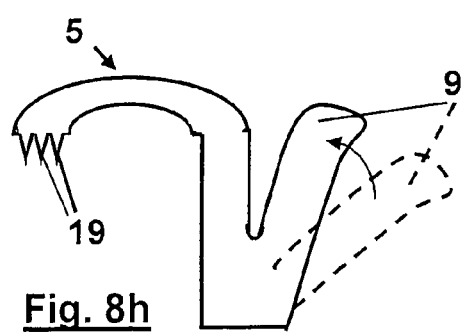
Figure 8I:
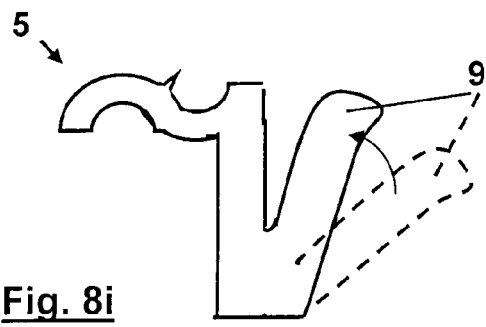
Figure 9A:
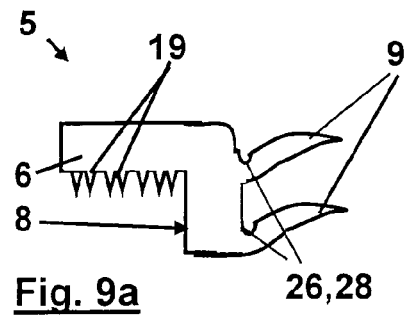
Figure 9B:
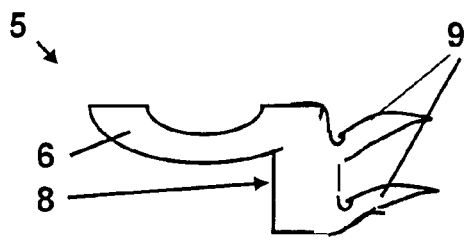
Figure 9C:
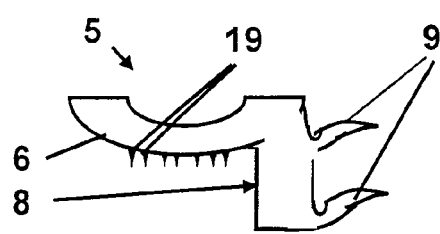
Figure 10A:
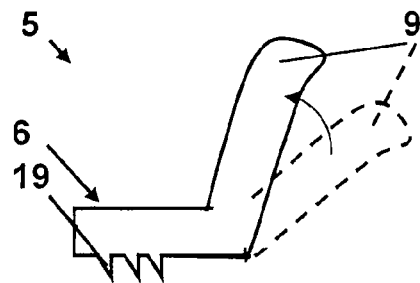
Figure 10B:
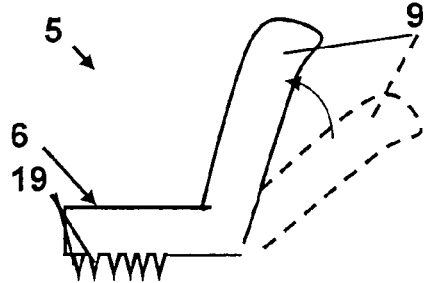
Figure 10C:
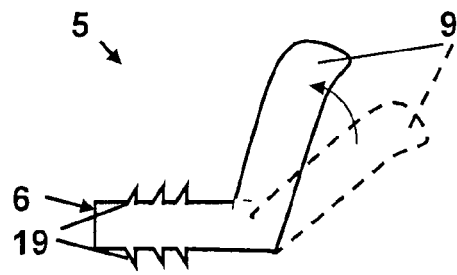
Figure 10D:
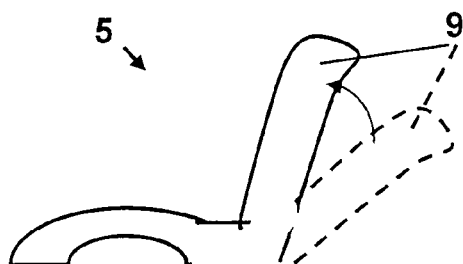
Figure 11:
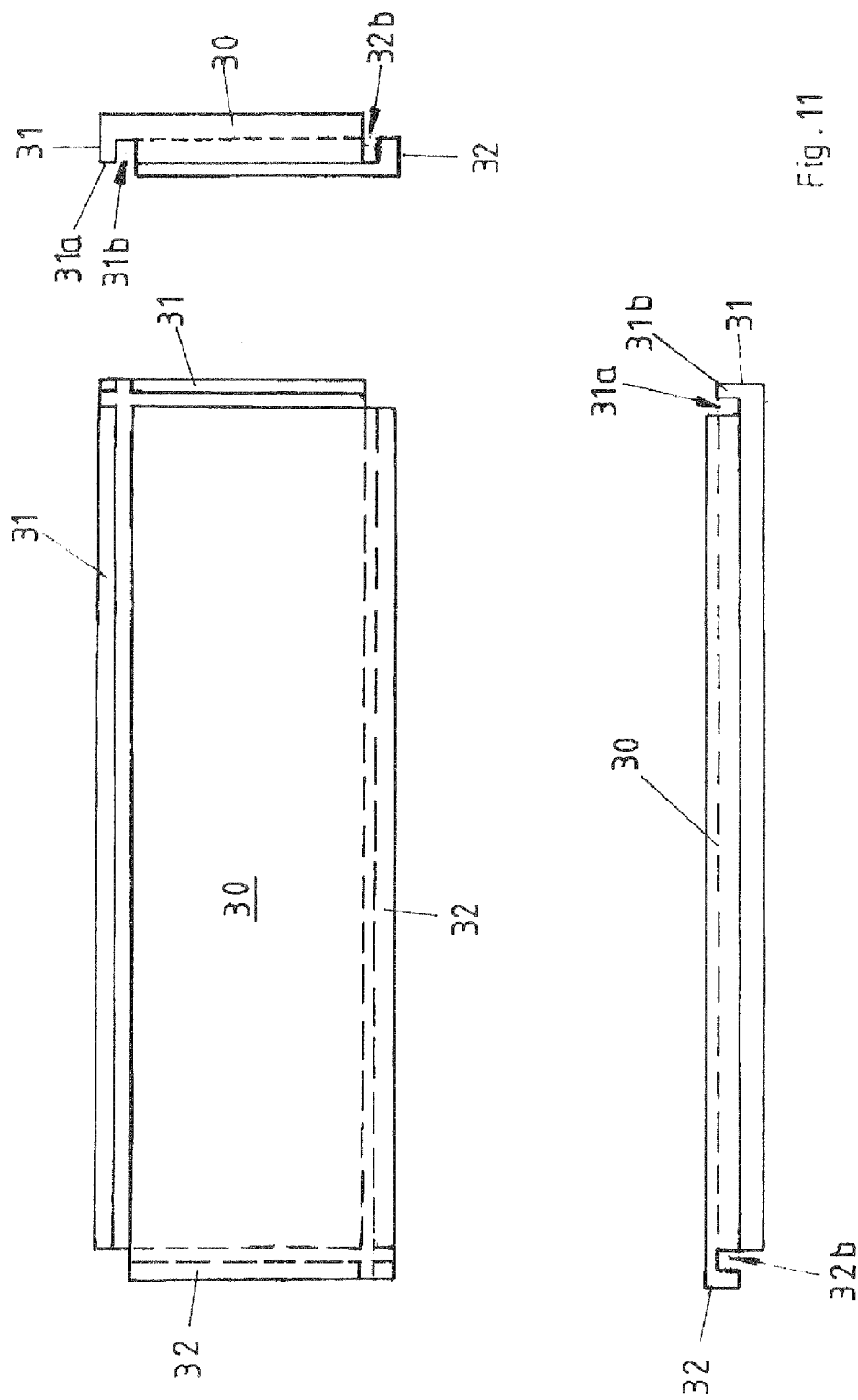
Figure 12:
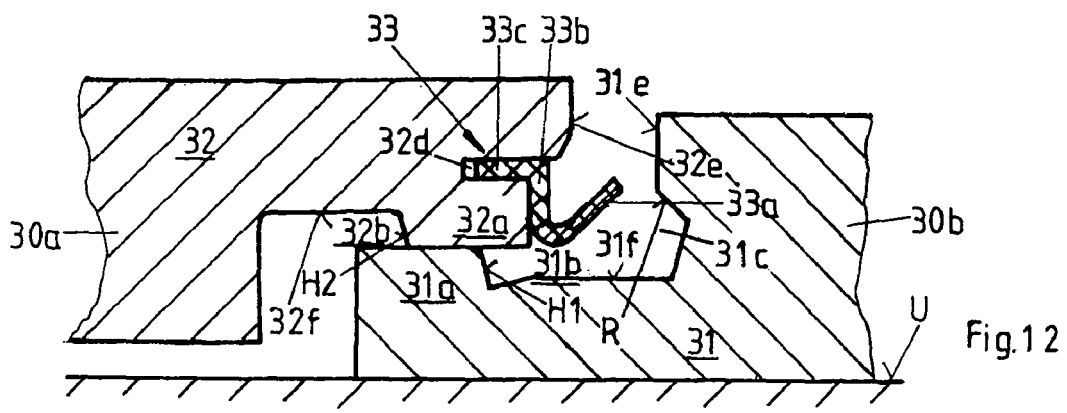
Figure 13:
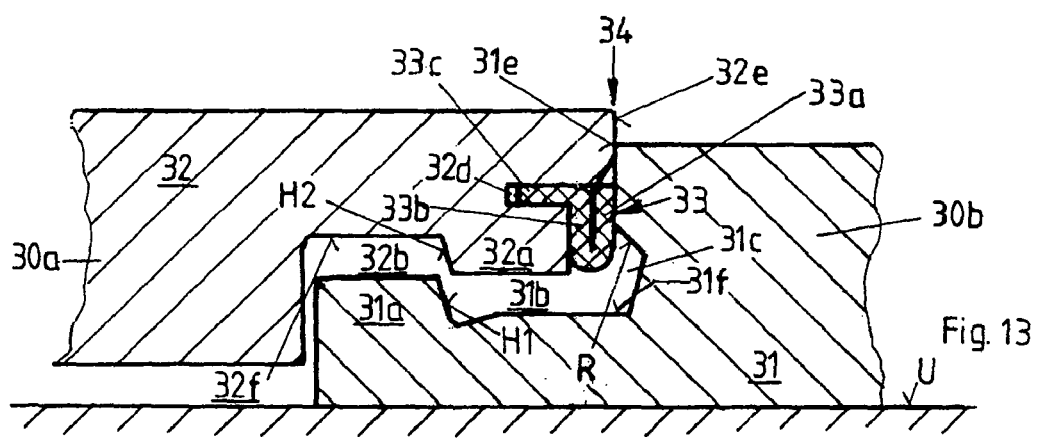
Figure 14:
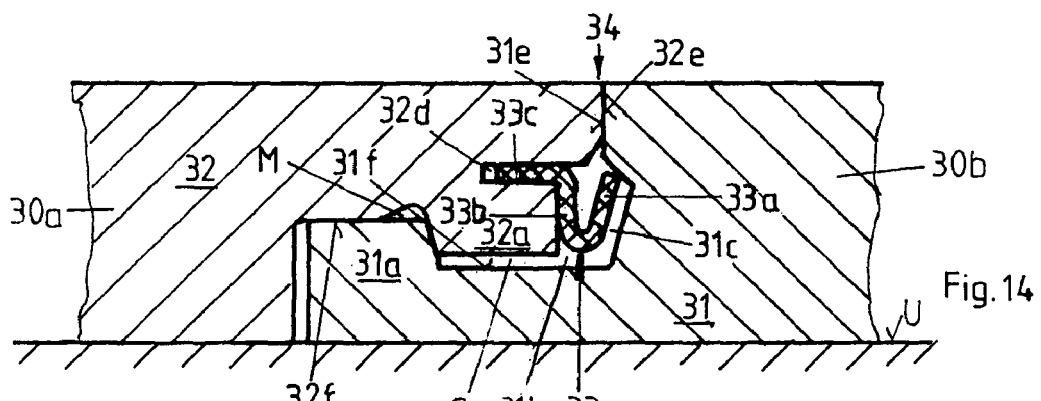
Figure 15:
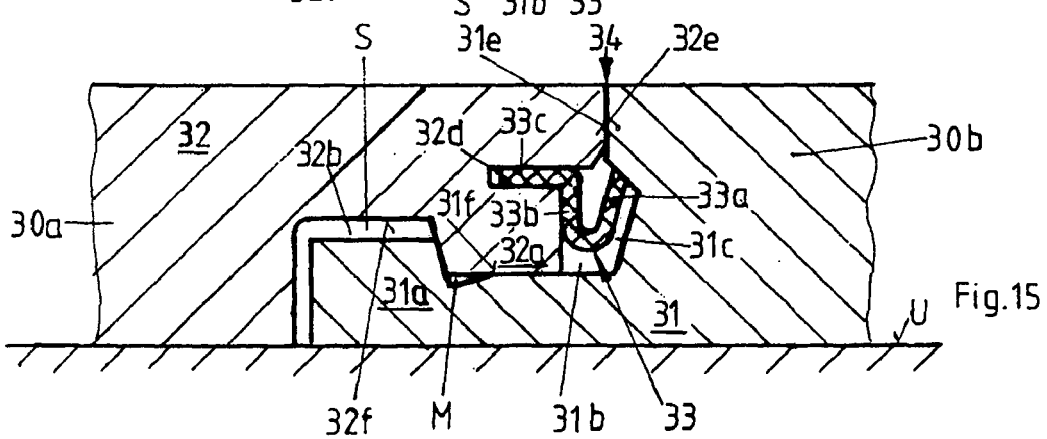
Figure 16:
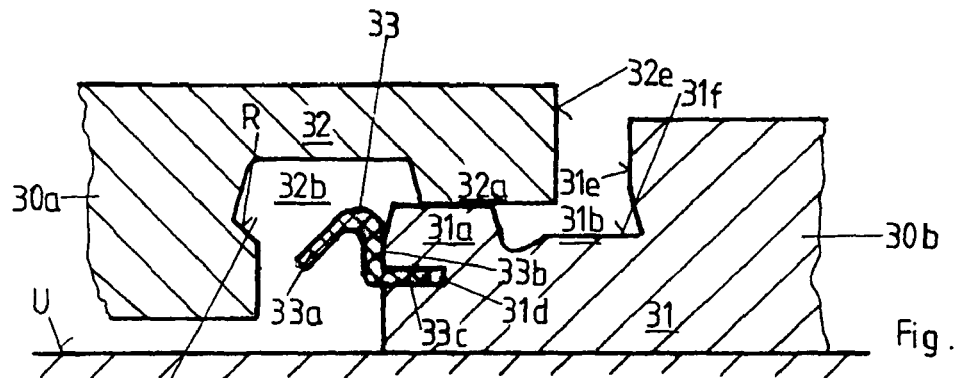
Figure 17:
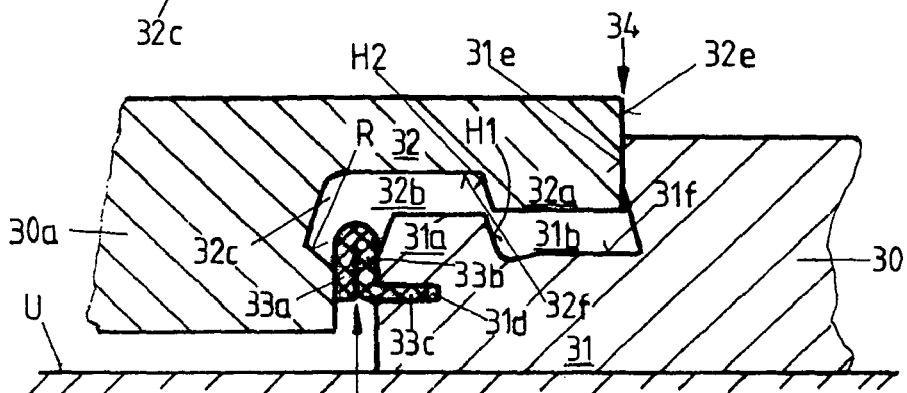
Figure 18:
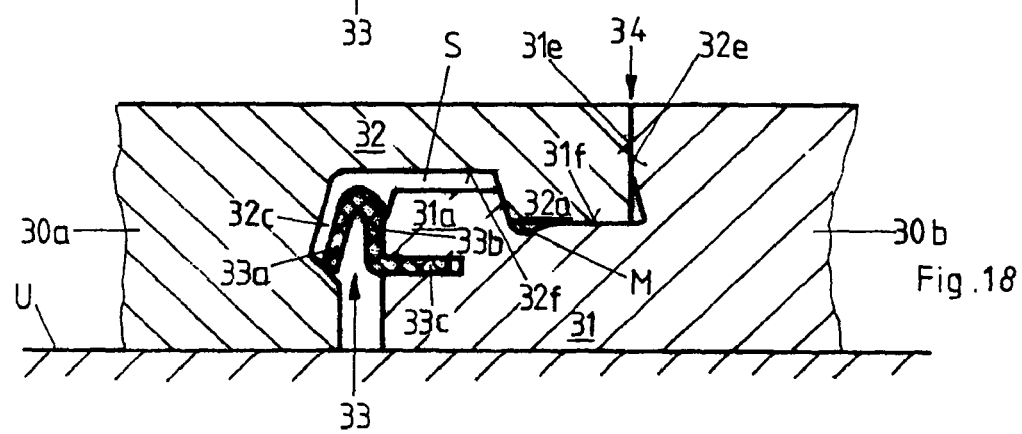
Figure 19:
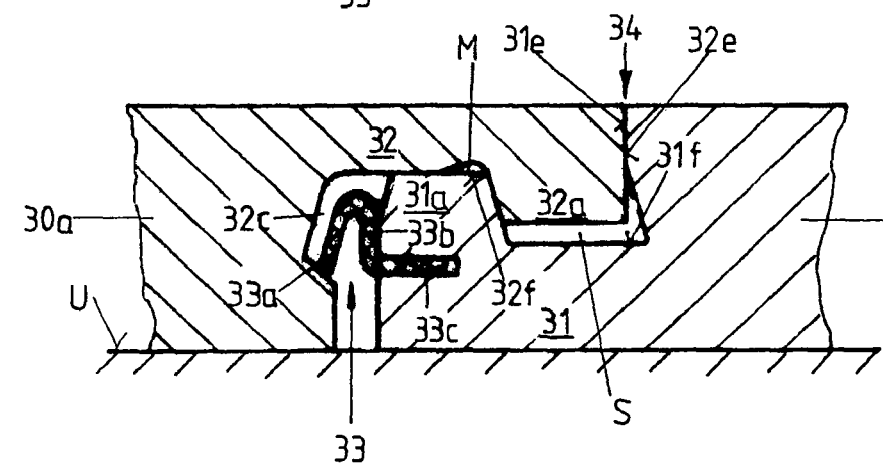
Figure 20:
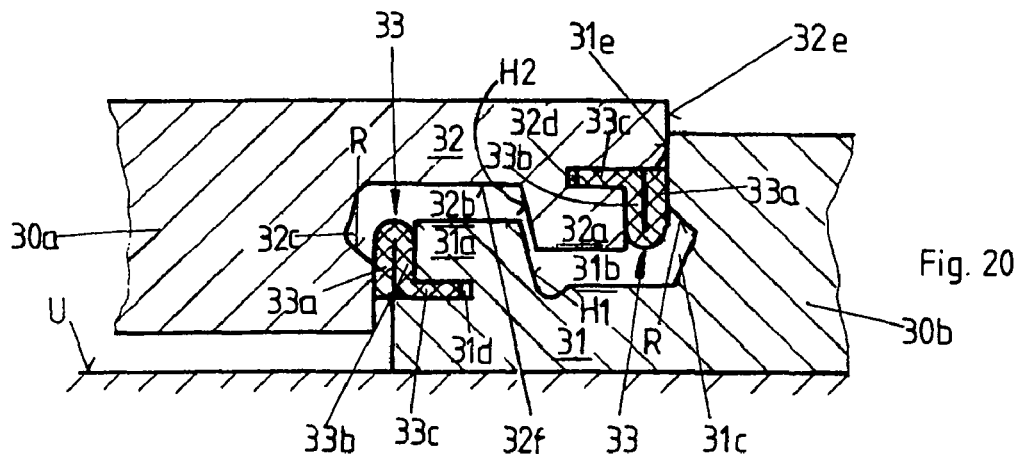
Figure 21:
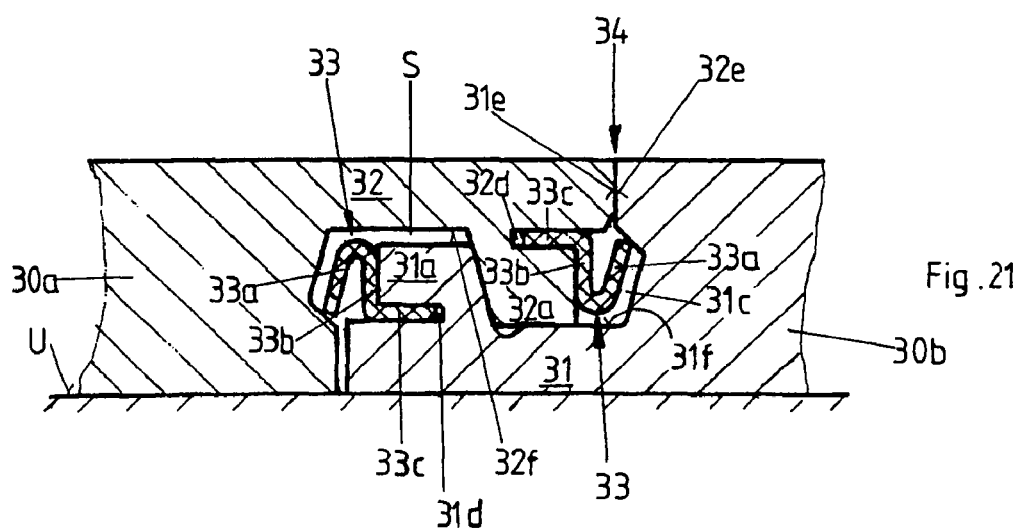
Figure 28:
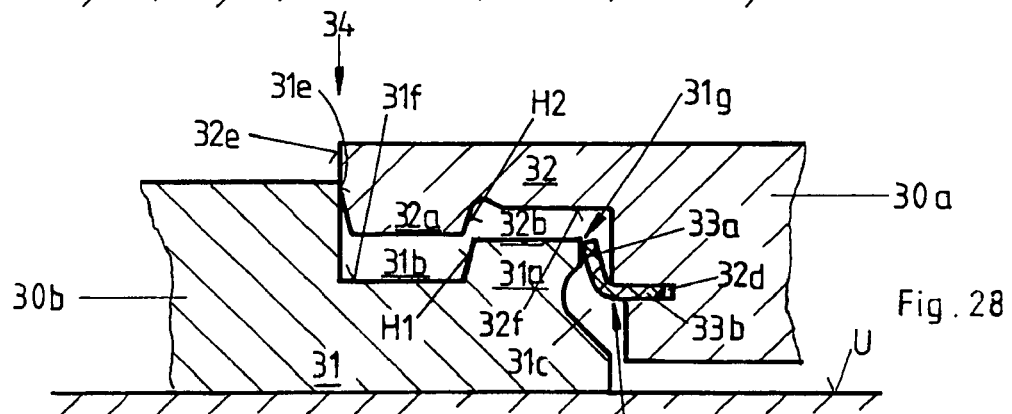
Figure 29:
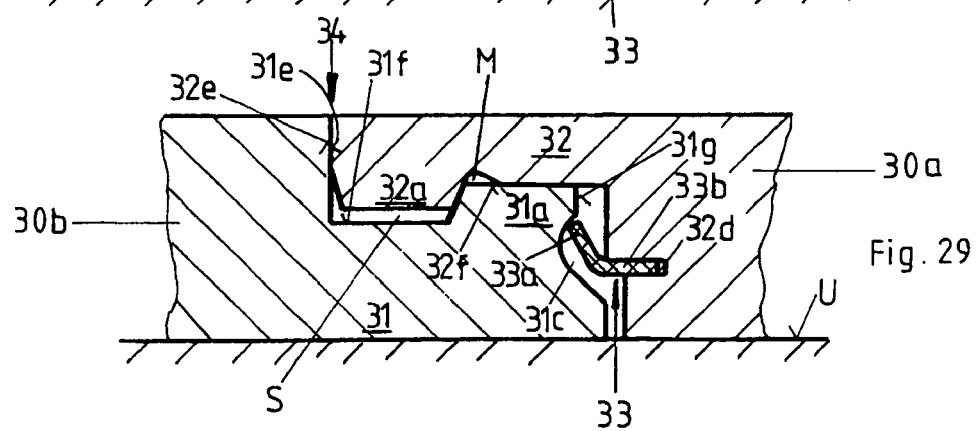
Figure 30:
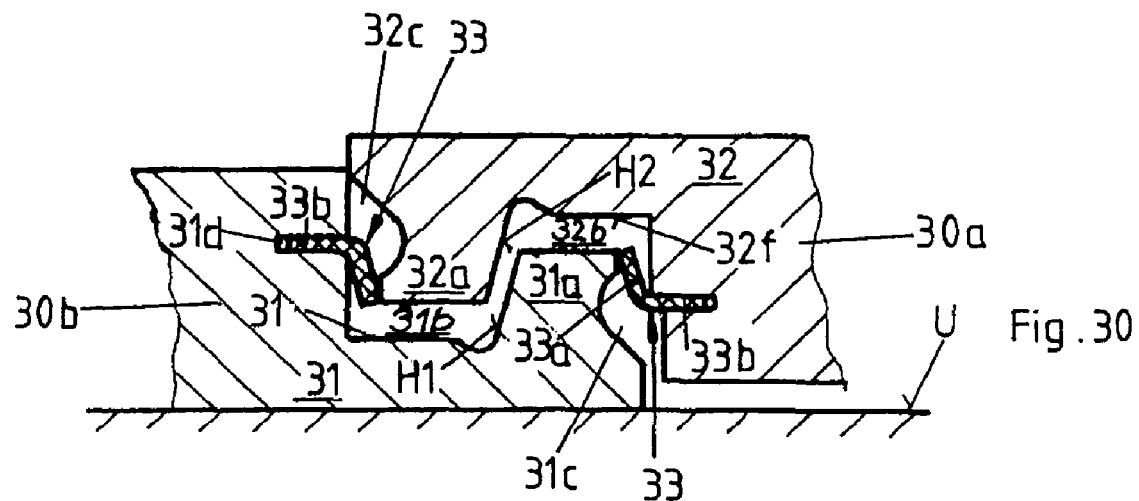
Figure 31:
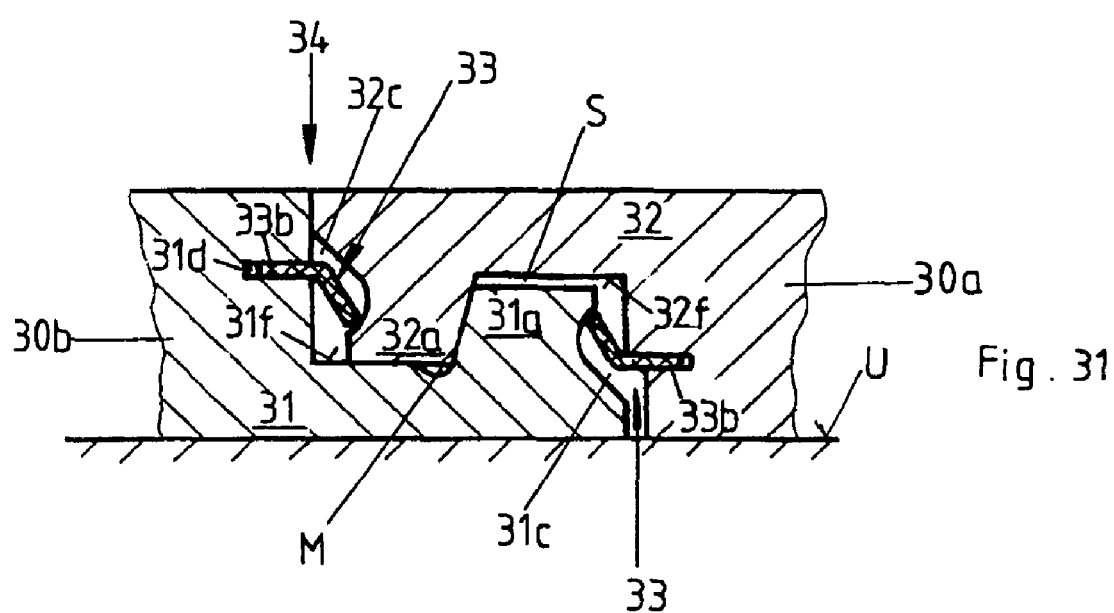
Figure 40:
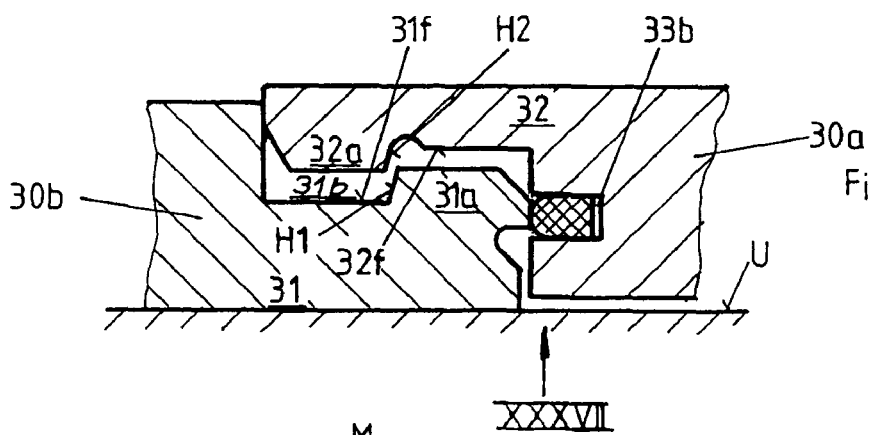
Figure 41:
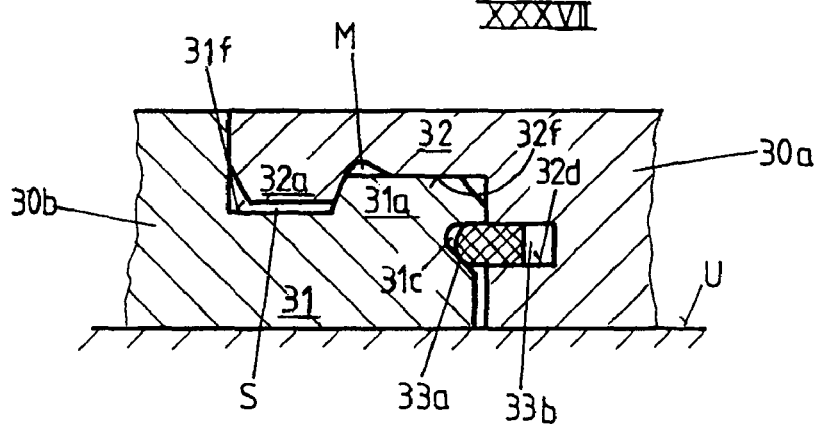
Figure 42:
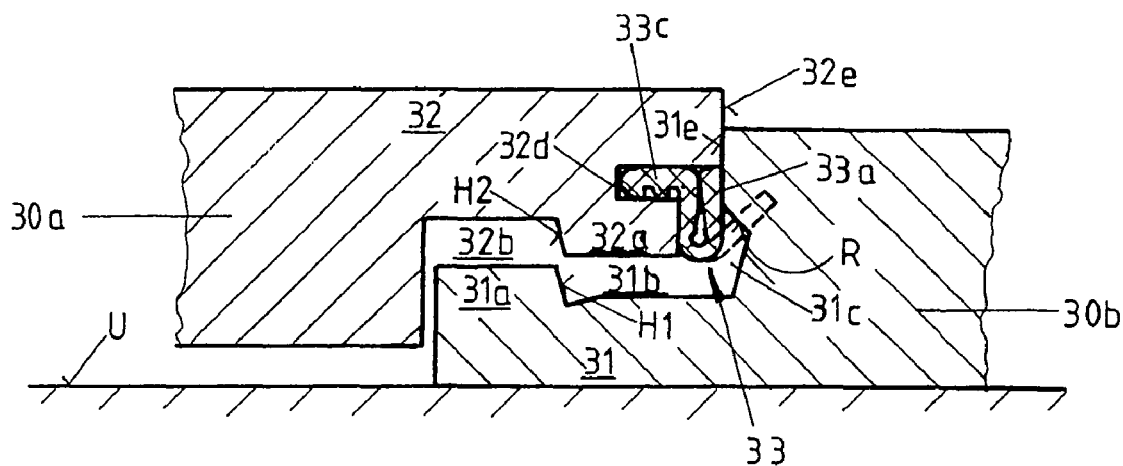
Figure 43:
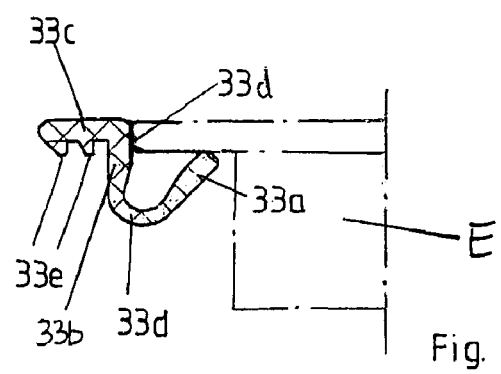
Figure 44:
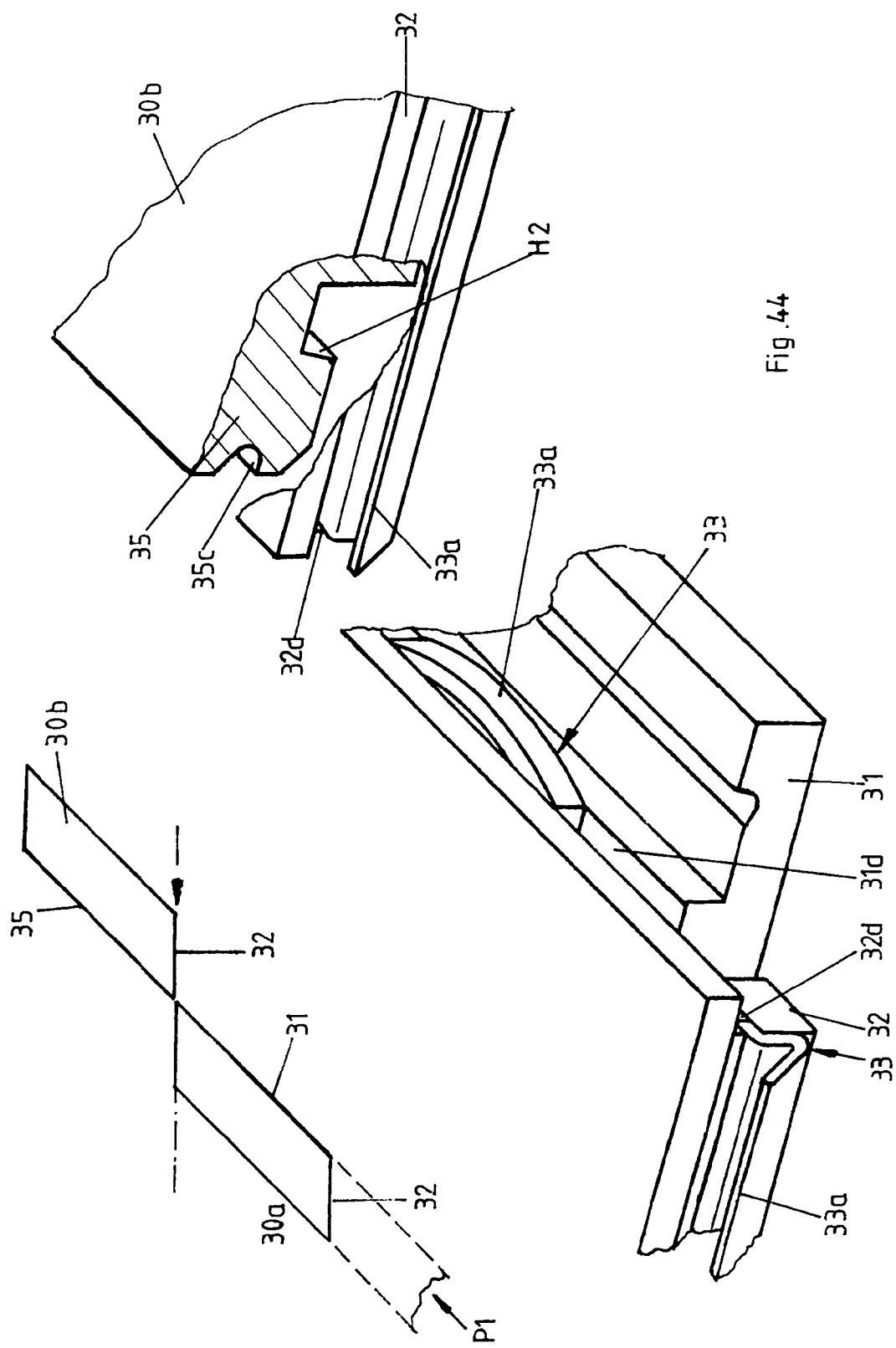
Figure 45:
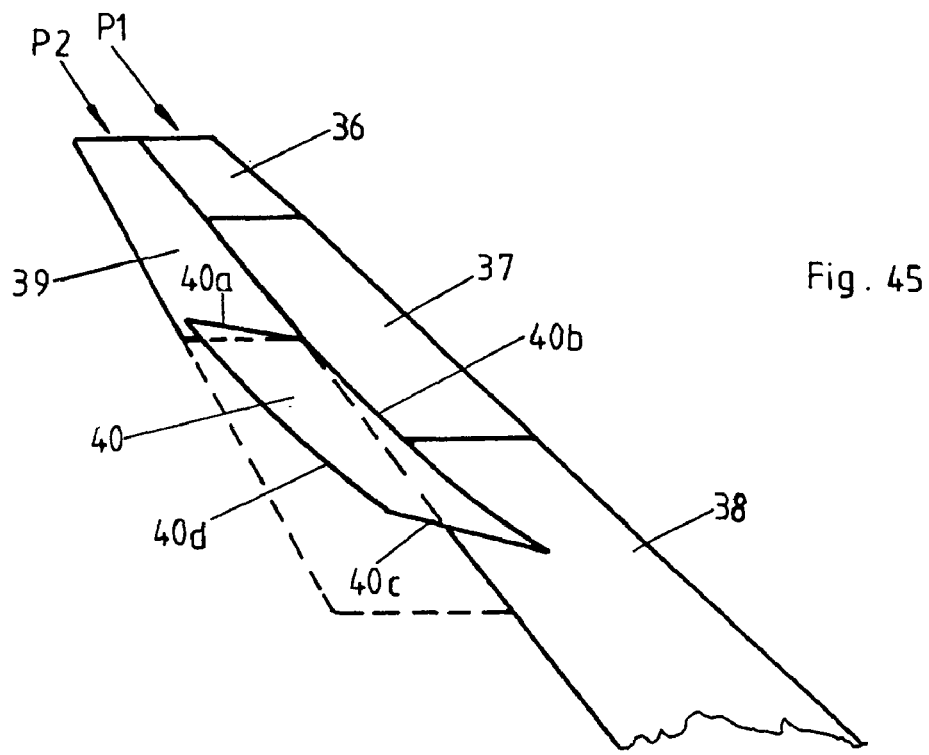
Figure 46:
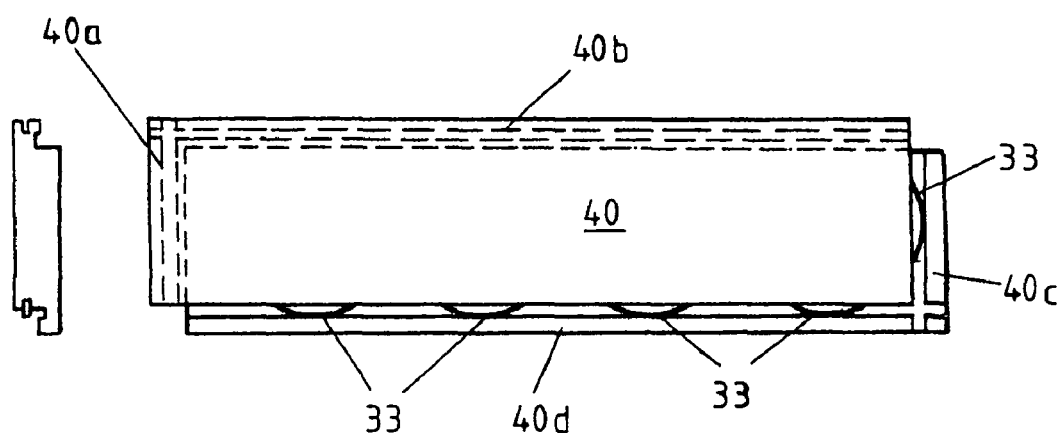
Figure 53:
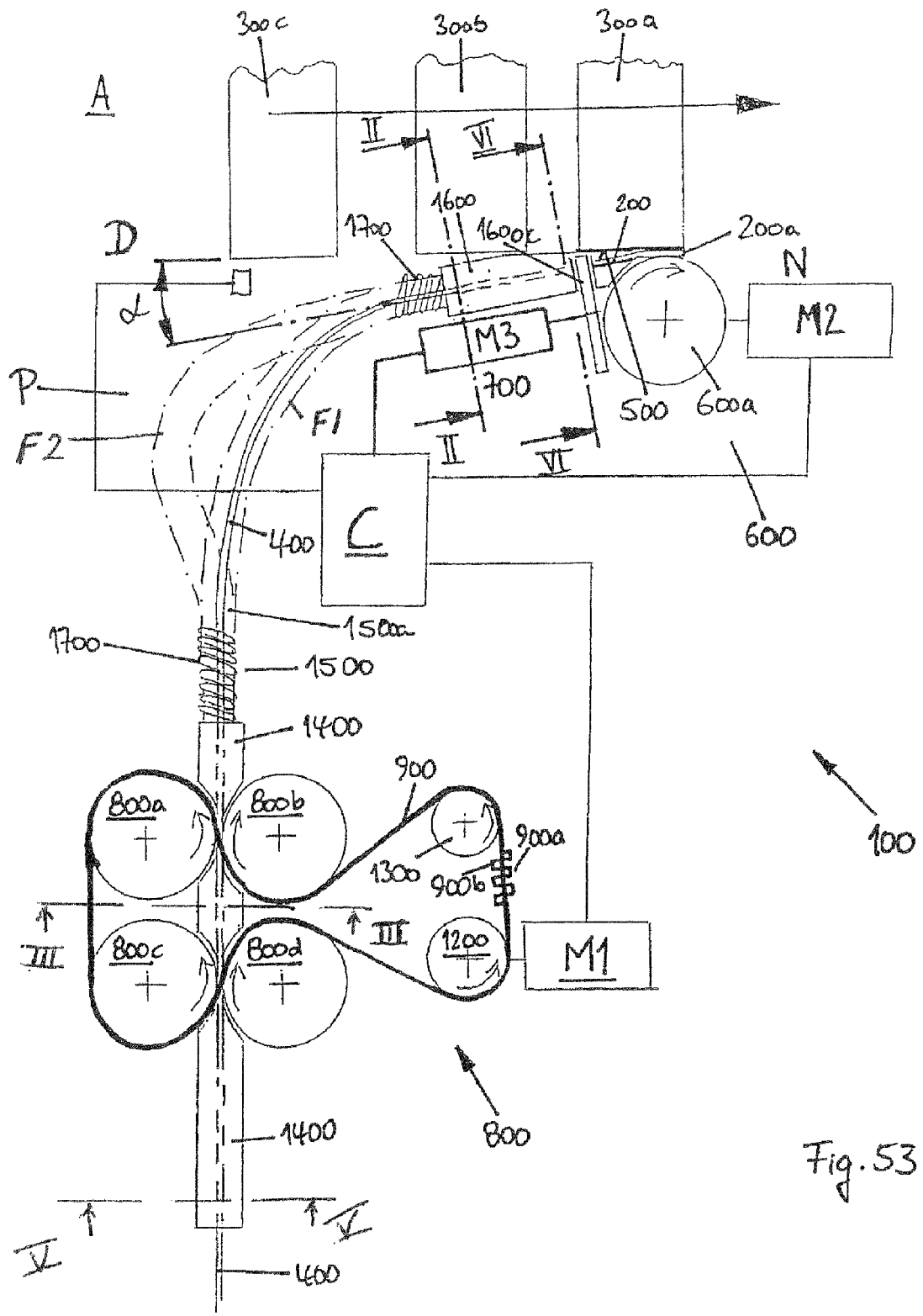
Figure 54:
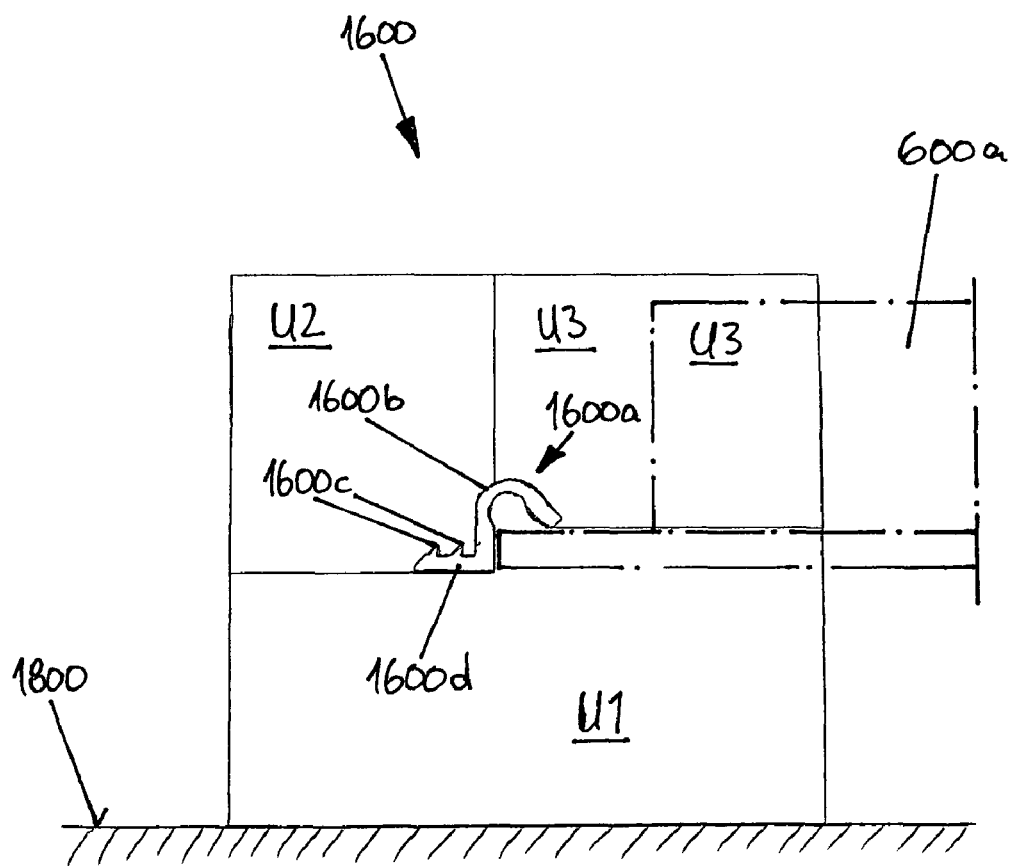
Figure 57:
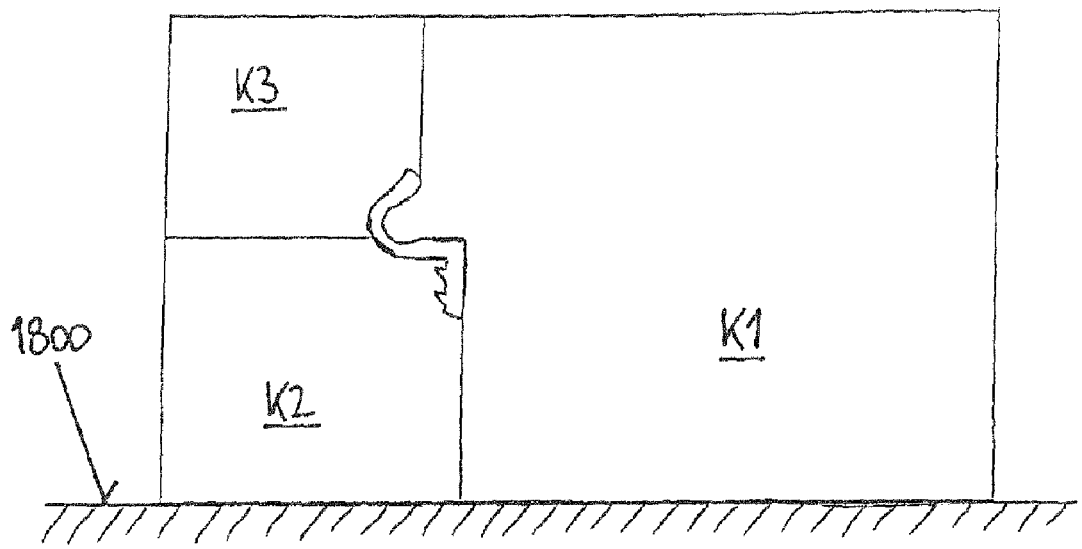
Figure 58:
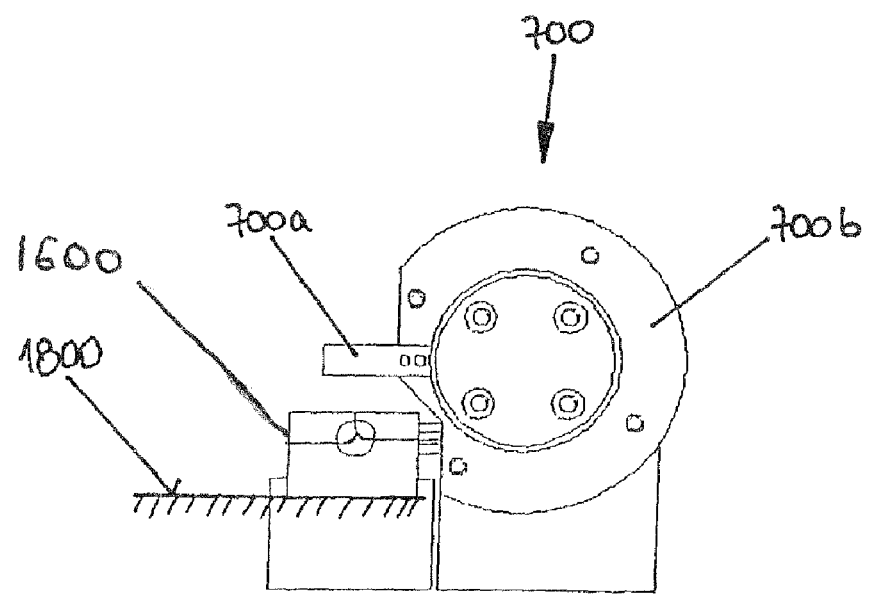
Figure 59:
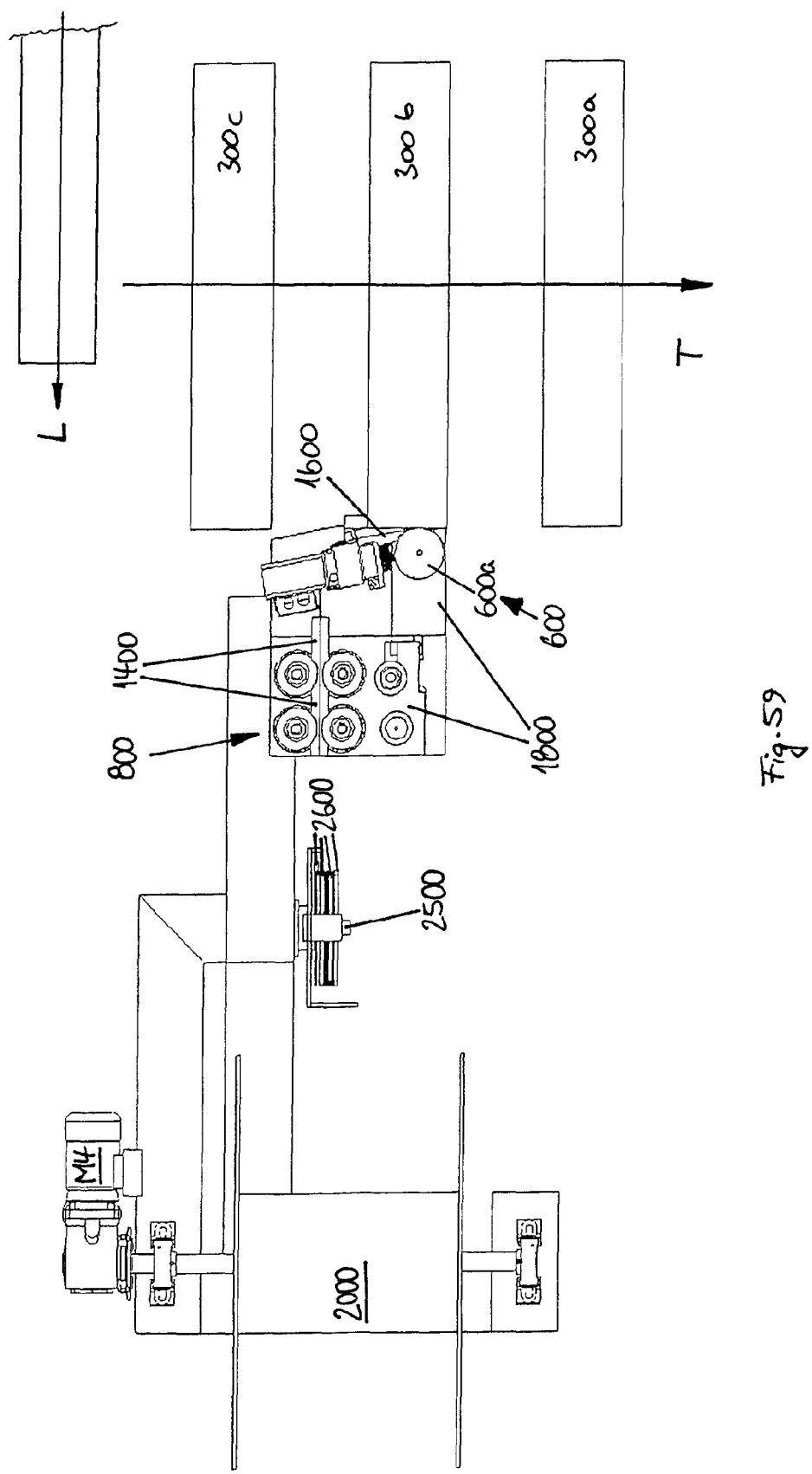
Figure 60:
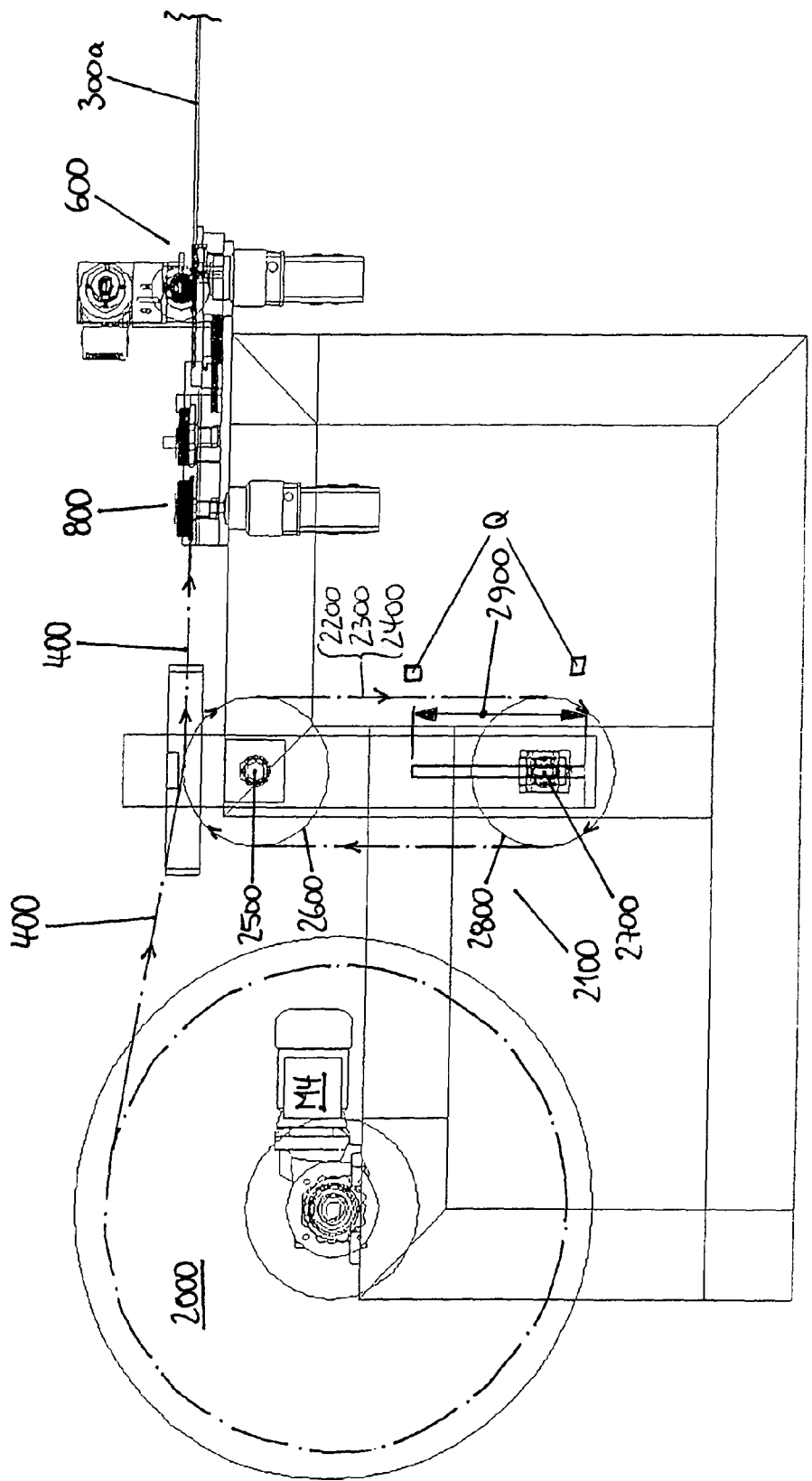
Figure 61:
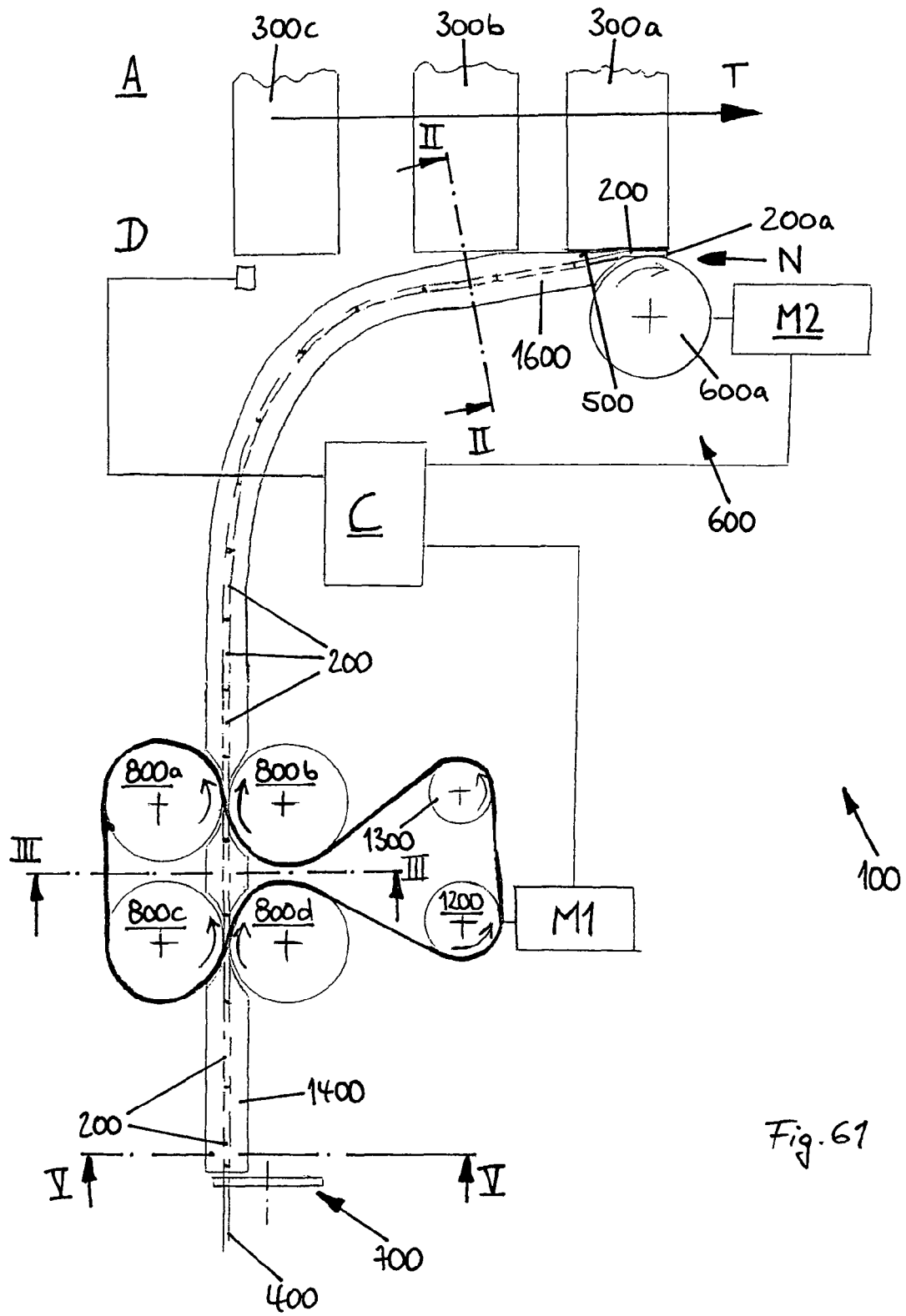

The present invention is described in greater detail hereinafter by means of a number of embodiments illustrated in a drawing. In the drawing:

FIG. 1 shows a part of a sectional view of two panels which are laid together, with a fixing system with a locking element, FIG. 2 shows a cross-sectional view of a locking operation for the two panels in a first step, FIG. 3 shows a cross-sectional view of the two panels in the locking operation in a second step, FIG. 4 shows a cross-sectional view of the locking element 5 in the relaxed position, FIGS. 5a+b show a perspective plan view of the locking element of FIG. 1, but prior to insertion thereof into the fixing system, FIG. 6 shows a perspective plan view of the locking element in a second embodiment, FIGS. 7a+b show a perspective plan view of the locking element in a third embodiment, FIGS. 8a-i show cross-sectional views of the locking element in a further embodiment, FIGS. 9a-c show cross-sectional views of the locking element in fundamentally different embodiments, FIGS. 10a-d show cross-sectional views of the locking element in further fundamentally different embodiments, FIG. 11 shows a diagrammatic view from three sides of a panel with hook profiles at all edges, FIGS. 12-14 show cross-sections through panels with a lower hook and an upper hook provided with a locking element, wherein the upper hook is shown in different joining positions in relation to the panel with the lower hook, FIG. 15 shows a cross-section through an alternative panel with locking element in the upper hook-arrested condition, FIGS. 16-18 show cross-sections through panels with an upper hook and a lower hook provided with a locking element, wherein the lower hook is shown in different joining positions in relation to the panel with the upper hook, FIG. 19 shows a cross-section through an alternative panel with locking element in the lower hook-arrested condition, FIG. 20 shows a cross-section through panels with two locking elements prior to the locking action, FIG. 21 shows a cross-section through panels as shown in FIG. 20, after the locking action, FIGS. 22-25 show cross-sections through panels with a simplified locking element at a lower hook, wherein an upper hook is shown in different joining positions relative to the panel with the lower hook, FIGS. 26-29 show cross-sections through panels with a simplified locking element on an upper hook, wherein the upper hook is shown in different joining positions relative to the panel with the lower hook, FIG. 30 shows a cross-section through panels with two locking elements, prior to the locking action, FIG. 31 shows a cross-section through panels as shown in FIG. 30, after the locking action, FIGS. 32-35 show cross-sections through panels with a locking element on a lower hook, wherein a panel with an upper hook is shown in different joining positions relative to the panel with the lower hook, FIG. 36 shows a plan view of a panel edge as indicated at XXXVI in FIG. 32, FIG. 37 shows a plan view of a panel edge as indicated at XXXVII in FIG. 34, FIGS. 38-41 show cross-sections through panels with a locking element at an upper hook, wherein the panel with the upper hook is shown in different joining positions relative to a panel with a lower hook, FIG. 42 shows a cross-section through panels with a lower hook and with an upper hook provided with a locking element, FIG. 43 shows a locking element, FIG. 44 shows a perspective view with hook profiles of a first row of panels which are pushed into each other in aligned relationship, FIG. 45 is a perspective view in relation to the method of installing panels with hook profiles which are hooked vertically with a locking element, FIG. 46 shows a panel for carrying out the method shown in FIG. 45, FIG. 53 is a diagrammatic view of an apparatus for automatically mounting a locking element to an edge of a panel, FIG. 54 is a view onto a transfer passage in accordance with II-II in FIG. 1, FIG. 55 is a view onto two advance rollers in accordance with III-III in FIG. 1, FIG. 56 is a plan view of the advance rollers of FIG. 3, FIG. 57 is a view of a guide passage in accordance with V-V in FIG. 1, FIG. 58 is a view of a separating station in accordance with VI-VI in FIG. 1, FIG. 59 is a view of the apparatus shown in FIG. 1 with a reel storage means for a locking element line, FIG. 60 is a side view of the apparatus of FIG. 7, and FIG. 61 is a diagrammatic view of an alternative embodiment of an apparatus for automatically mounting a locking element to an edge of a panel.

FIG. 1 shows a part of a cross-sectional view of two panels 1, 2 of a quadrangular, plate-shaped configuration, wherein the illustrated part reproduces a fixing system 3 having a locking element 5, by way of which the two panels 1, 2 are connected together and locked together at their edges or narrow sides by means of a hook connection 4 and a locking element 5 according to the invention. The hook connection 4 has two hooks 4.1, 4.2 which in the locking position are hooked into each other in such a way that the panels 1, 2 cannot be displaced horizontally relative to each other in the position which here is horizontal.

The locking element 5 is inserted with a portion in the form of an insertion portion 6 in a locking groove 7 which extends in the longitudinal direction of the edges of the panel 2, which edges extend in the plane of the drawing. The locking element 5 also has a portion in the form of a locking portion 8 with a resilient latching tongue 9 which is latched into a latching recess 10 and which with its end 11 bears against a contact surface 12 in the latching recess 10. As will be described in greater detail hereinafter, the latching tongue 9 is elastically pivotable about its attachment 13 to the rest of the locking portion 8 about an axis parallel to its longitudinal extent and in the position shown here bears under a spring bias against the contact surface 12. So that the latching tongue 9 finds its appropriate contact point against the contact surface 12 with its pivotal movement into the latching recess 10, the contact surface 12 is inclined out of the horizontal. That makes it possible for the latching tongue 9 to reliably bear against the contact surface 12, in spite of slight changes in the dimensions within given tolerance ranges. Even in the event of the two panels 1, 2 moving slightly away from each other within a given tolerance range, the latching tongue 9 can still remain against the contact surface 12, by virtue of the prestressing of the latching tongue 9, insofar as the latching tongue 9 is further pivoted by virtue of its end 11 sliding down against the inclined plane formed by the contact surface 12. That arrangement prevents the two panels from being able to come loose from each other, perpendicularly to the surface V on which they are laid. The inclination of the contact surface 12 is substantially determined by the pivot radius of the latching tongue 9 about its attachment 13 and the force against which the latching tongue 9 bears against the contact surface 12. The depth of the latching recess 10, which is shown here, is only to be viewed as being by way of example and, in order to satisfy larger tolerance fluctuations in the dimensions of the panels 1, 2, it can also be made deeper into the narrow side or edge of the panel 1. The contact surface 12 which in the embodiment illustrated here opens straight into the edge of the panel 1 can additionally have a projection which is provided at the mouth opening and which does not project laterally beyond the narrow side of the panel 1 and which can serve as an abutment for the latching tongue 9 to ensure that the latching tongue 9 cannot slip out of the latching recess 10 under particularly high forces in opposite relationship to the force P for locking the panels and in perpendicular relationship to the laying surface.

FIGS. 2 and 3 each show a cross-sectional view illustrating the assembly of the two panels 1, 2 in two steps, wherein here the hook 4.1 is of a somewhat different design configuration from FIG. 1, which however is not of crucial significance in terms of the mode of operation of the locking element 5 according to the invention. Assembly of the two panels 1, 2 is also described in greater detail in WO 03/016654 to which reference is explicitly directed here and the disclosure of which in regard to the assembly of the two panels 1, 2 is expressly also incorporated here.

In order to lock a panel 1 which is lying in a first row to a new panel 2 for a second row, then, as described in greater detail and illustrated in WO 03/016654, firstly the new panel 2 is attached to the lying panel 1 in an inclined position relative to the lying panel 1 and subsequently pivoted downwardly into the plane of the lying panel 1 in the direction of the force P. In that situation the locking element has already been inserted with its insertion portion 6 into the locking groove 7, prior to the locking procedure 5. When the new panel 2 is pivoted downwardly into the plane of the lying panel 1, the edges with the fixing system 3 slide past each other over their length and brace the locking element 5.

In the structure shown in FIGS. 1 to 3, the locking portion 8 is of an approximately V-shaped cross-section with a first limb 14 and a second limb 15, wherein the latching tongue 9 is formed by the first limb 14 and the second limb 15 is laterally connected to the insertion portion 6. When the new panel 2 is pivoted downwardly and the two edges of the panels 1, 2 slide down against each other, the latching tongue 9 is pressed out of the relaxed condition shown in FIG. 4, a cross-sectional view of the latching element 5 in the relaxed condition, against the second limb 15 and in that case is pre-stressed like a leaf spring with a specific spring energy. When the locking position of the two panels 1, 2 is reached, which is shown in FIGS. 1 and 3, the hooks 4.1 and 4.2 engage into each other to afford the hook connection 4. At the same time the latching tongue 9 is partially relaxed into the latching recess 10: in a latching position the latching tongue 9 comes to bear with its end 11 against the contact surface 12 and bears against it in a prestressed condition.

In that situation the surface regions of the panels 1, 2, which surface regions are away from the laying surface V, are of a convergent configuration at the edges in such a way that they completely close the gap 16 between the two panels 1, 2 upwardly. For that purpose the hook 4.1 engages over the locking portion 8 in the position shown in FIG. 2 in which the two limbs 14, 15 bear against each other, almost completely from above, so that the two edges can slide as tightly against each other as possible for locking the two panels 1, 2, upon pivotal movement of the new panel 2.

In the locking operation the hooks 4.1, 4.2 slide against each other at inclined surfaces 17 and thereby draw the edges of the two panels 1, 2 towards each other, as is also described in greater detail in WO 03/016654, to which reference is made. In that way the two panels 1, 2 which are connected together by way of the fixing system 3 cannot be unlocked in the plane of the drawing without destroying parts of the panels 1, 2 or the fixing system 3.

The locking element 5 additionally has anchoring means 18 by which it can be captively anchored with its insertion portion 6 in the locking groove 7. The anchoring means 18 thus hold the locking element 5 in the locking groove 7 so that the locking element 5 cannot be unintentionally and undesirably displaced in the locking groove 7 prior to and during the locking operation.

In terms of the production procedure the anchoring means 18 should satisfy the condition that the locking element 5 can be anchored in the locking groove 7 without any problem. For that purpose, as is not further shown here, the locking element 5 can be glued with its insertion portion 6 into the locking groove 7. Hereinafter however further different solutions in regard to the configuration of the anchoring means 18 will be described in greater detail with reference to FIGS. 5 to 10.

FIGS. 5 to 7 each show a perspective view of the locking element 5 in different embodiments. In this case the locking element 5 which is shown loose is still in the latching position shown in FIGS. 1 to 3, in which the locking element is not yet completely relaxed, as is shown in FIG. 4. For the sake of enhanced clarity the locking element 5 is shown as being transparent in FIGS. 5 to 7. That corresponds at the same time to a possible embodiment in which the locking element 5 is extruded from a transparent plastic material. The locking element 5 shown in FIG. 5a corresponds to the locking element 5 shown in FIG. 1.

To provide an oversize, three projections 19 are provided at a larger side surface of the insertion portion 6, being the side surface which in the insertion position of the locking element 5 faces towards the inner side surfaces of the locking groove 7, in other words, in the embodiments of the locking element 5 which are shown in FIGS. 5a+b, the three projections 19 are provided at the top side of the insertion portion 6. The projections 19 extend over the entire lengthwise extent of the locking element 5. The longitudinal side surfaces 20 of the projections 19 are arranged inclinedly relative to each other. As a result the projections 19 which are arranged towards the free end of the insertion portion 6 converge in a wedge configuration to provide a tip 21. In that respect it is provided in accordance with the invention that the height h of the insertion portion 6 is somewhat greater than the width by of the locking groove 7 (FIG. 1) so that the tips 21 are elastically or plastically-elastically deformed upon insertion of the locking element 5 into the locking groove 7 and by way thereof clamp the locking element 5 fixedly in the locking groove 7 and dig fixedly into the inner side surfaces of the locking groove 7.

Figure 5B:
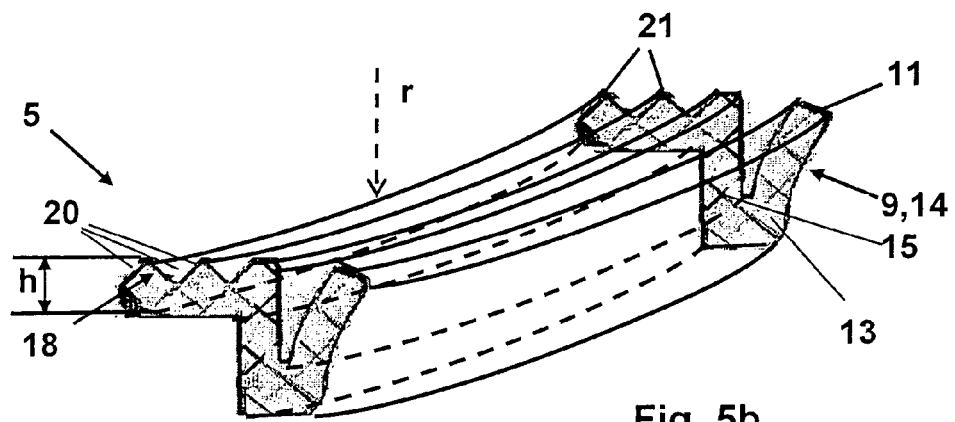

FIG. 5b shows a modification of the configuration of the locking element 5 shown in FIG. 5a, which is distinguished in that over its longitudinal extent the locking element 5 is of a curved shape, the radius of curvature r of which extends approximately in the direction of the section line formed by the cross-sectional plane and the longitudinal sectional plane, that is to say in the embodiment illustrated here, the locking element 5 is curved downwardly.

When now the curved locking element 5 is inserted into the locking groove 7 which is of a linear configuration, the locking element 5 is straightened in opposite relationship to its bend and bears in an elastically prestressed condition against the inner side surfaces of the locking groove 7, thereby providing for additional anchorage of the locking element 5 in the locking groove 7.

In a configuration which is not shown here, the insertion portion 6 can also be designed without an oversize in respect of its height h relative to the width by of the locking groove 7 so that the locking element 5 is anchored in the locking groove 7 solely by virtue of its elastic prestressing as a consequence of its previous curvature (as described above).

In both the embodiments illustrated in FIGS. 5a and 5b, there is provided an introduction aid 22 for easier introduction of the locking element 5 into the locking groove 7, which is here formed by the longitudinal side surface 20 of the projection 19, which is closest to the free end of the locking portion 8. In this case the longitudinal side surface 20 serves as an inclined plane, over which the insertion portion 6 can be easily pushed into the locking groove 7, in spite of its oversize. An introduction aid can be provided in the same manner on the other embodiments still to be described.

Referring to FIG. 6 an insertion portion 6 is of a curved configuration towards its free end so that a hook 23 is formed at the free end, the hook elastically bracing the insertion portion 6 upon the insertion thereof into the locking groove 7, thereby achieving an anchoring effect for the locking element 5 in the locking groove 7. It will be appreciated that in this case also the locking element 5 can be curved as described above.

The embodiment of the locking element 5 shown in FIGS. 7a and b has a slot 24 which extends from the end of the insertion portion and in the direction of the locking portion 8, the sides 25 delimiting the slot 24 being curved away from the slot 24. The end of the insertion portion 6 is bevelled towards the slot 24 to form the introduction aid 22 and thus, as in the embodiments of FIGS. 5 and 6, forms inclined planes for easier introduction of the insertion portion 6 into the locking groove 7. Upon introduction of the insertion portion 6 into the locking groove 7 the two slot sides 25 are moved towards each other whereby the insertion portion 6 is elastically braced in the locking groove.

Further possible embodiments of the locking element 5 are shown in following FIGS. 8 to 10, showing however only a cross-sectional view of the respective locking element 5. In this case, in FIGS. 8 and 10, the latching tongue 9 is shown in a completely relaxed position (broken lines) and in the latching position (solid lines) in a partially stressed condition.

In FIGS. 8*a* to *e* the locking portion 8 of the respective locking element 5 is still in the V-shaped form already described above. The individual embodiments differ however in various details which are now to be described.

In FIG. 8*a* the insertion portion 6 has three projections 19 each with a respective asymmetrical tip 21, in which the longitudinal side surface 20 of the projection 19, which is remote from the free end of the insertion portion 6, extends perpendicularly to the lengthwise extent of the locking portion 8, that is to say perpendicularly in the Figure here. As a consequence of that arrangement, the respective other longitudinal side surfaces 20 of the projections 19 form an inclined plane which is operative upon introduction of the insertion portion 6 so that the insertion portion 6 can be easily pushed into the locking groove 7. In an opposite movement in relation thereto however, that is to say in the event of a movement of the insertion portion 6 out of the locking groove 7, the tips 21 of the projections 19 dig into the inner side surfaces of the locking groove 7 by virtue of the oversize of the insertion portion 6 and the direction of the tips 21, and thereby hold the locking element 5 fast in the locking groove 7. In FIG. 8*b* the hooks are disposed at the underside of the insertion portion 6, whereby they are better protected prior to insertion into the locking groove 7, than those in FIG. 8*a*. In FIG. 8*c* the projections 19 are disposed on both sides of the insertion portion 6, in which case for example the projections 19 here have symmetrical tips 21.

The embodiments of the insertion portion 6, which are shown in FIGS. 8*f* to *i*, are of a curved shape, whereby the insertion portion 6 is elastically braced in the locking groove 7 when it is inserted thereinto. In addition, the embodiment of FIGS. 8*h* and 8*i* has projections 19 which impart an oversize to the insertion portion 6 and by way thereof, upon insertion of the insertion portion 6 into the locking groove 7, provide that the insertion portion 6 digs fast into the inner side surfaces of the locking groove 7. In this arrangement the projection shown in FIG. 8*i* is of a design such as to face in a direction away from the free end of the insertion portion 6, whereby the projection 19 acts like a barb which, when the insertion portion 6 is being pulled out of the locking groove 7, hooks into the inner side surface of the locking groove 7.

Crucial aspects in regard to the effectiveness of the locking element 5 are inter alia the spring energy which can be stored when the first limb 14 or the latching tongue 9 bears against the second limb 15 and the possible spring travel which is available due to complete relaxation of the locking element 5. Both parameters can be generally adjusted by way of the configuration of the profile of the locking portion 8 and the locking element 5 respectively, so that, depending on its purpose of use, the locking element 5 can be designed with a suitable potential spring energy. More specifically, for example in FIGS. 8*a* and *b*, the two limbs 14, 15 converge at different heights $h_1$ of the locking portion 8 so that the latching tongue 9 in FIG. 8*a* can be more easily caused to bear against the second limb, than the latching tongue 9 in FIG. 8*b*.

In FIGS. 8*d* and *e*, a respective additional enlargement 26 is provided in the form of a round bore 27 which, in comparison with an acute-angled V-shaped profile, in the pivotal movement of the two limbs 14, 15 towards each other, prevents an accumulation of material at that location, so that here the latching tongues can be more easily caused to bear against the second limb 15, in comparison with the acute-angle V-shaped profile. A similar but attenuated effect is achieved by the profiles shown in the other embodiments of FIG. 8, by means of a rounded configuration 28.

In FIGS. 9*a* to *c*, the embodiments of the locking element 5 have an additional latching tongue 9 which is also intended to bear against a contact surface provided for same in the latching recess, in the latching position of the locking element 5.

FIGS. 10*a* to *d* show four further fundamentally different embodiments of the locking element 5 which differ from the other embodiments of the locking element 5 which have been described by way of example, in particular in regard to the configuration of their locking portion 8. In this case the latching tongue 9 is connected directly to the insertion portion 6. For locking the two panels 1, 2 together, the latching tongue is pressed against the edge of the panel 2 carrying it and thus prestressed and, as in the other embodiments of the locking element 5, when the latching recess 10 is reached, it can relax into the intended latching position into the latching recess 10, in which respect it is also provided here that in the latching position the latching tongue 9 bears in a prestressed condition against the contact surface 12 associated therewith.

All embodiments of the locking element 5 which are described herein are integrally produced from plastic material by extrusion.

FIG. 11 shows a diagrammatic view of a panel 30 of rectangular shape. The panel 30 has hook profiles 31 and 32 at all four edges. The panel 30 can be connected to similar panels by means of the hook profiles 31 and 32. Two of the hook profiles which come together in an L-shape at a first corner have a lower hook 31 while the other two hook profiles which are also arranged in an L-shape relative to each other each have a respective upper hook 32. That hook profile which, when a panel 30 is lying flat on a surface, has an upwardly directed hook end 31*a* and a hook opening 31*b* is identified as the lower hook 31. The upper hook 32 forms a co-operating portion for the lower hook 31 and has a hook opening 32*b* which, when the panel 30 is in the lying condition, is directed downwardly, more specifically faces towards a laying surface. At least one of the hook profiles is provided with an additional locking element which has been omitted in the diagrammatic view in FIG. 11 for the sake of simplicity.

In order to fit two edges together in a vertical direction or with a motion component in perpendicular relationship to the plane of the panels and to secure them against movement in the reverse direction by means of an additional locking element 33, a number of embodiments of panels with locking elements 33 are set forth with reference to FIGS. 12 to 42. In this respect different locking elements 33 are provided, as well as special hook profiles which co-operate with the locking elements 33. In addition embodiments of locking elements as shown in FIGS. 1 to 10*d* can be used.

The Figures generally show a connecting location between two panels 30*a* and 30*b* so that the complementary hook profiles and the function thereof can be clearly seen. The rest of the panels is not illustrated. Provided at the respectively omitted end of each panel 30*a* and 30*b* respectively there is always a complementary hook profile. One of the oppositely disposed edges of a panel is in the form of an upper hook and the other is in the form of a lower hook. The two panel portions 30*a* and 30*b* when fitted together give a complete panel 30.

An embodiment of a panel with a locking element 33 on the upper hook 32 will now be described with reference to FIGS. 12 to 14.

That panel 30b with the lower hook 31, as shown in FIG. 12, is disposed on a support surface U. The lower hook 31 has an upwardly facing hook end 31a and an upwardly directed opening 31b, that is to say which is facing away from the surface U. The upper hook 32 provided with the locking element 33 has a downwardly facing hook end 32a and a downwardly directed opening 32b. The hook ends 31a/32a and openings 31b/32b are of such a configuration that a hook end 32a of the upper hook 32 of the one panel 30a can always be inserted into the opening 31b of the lower hook 31 of the other panel 30b. The lower hook 31 has a latching recess 31c for the locking element 33. The cross-section of the locking element 33 is of a V-shaped configuration in the manner of a clip. It has two clip portions 33a and 33b. The clip portion 33a forms a resilient latching tongue 33a. The other clip portion 33b is provided with an anchoring tongue 33c which has anchoring means and which is inserted into a holding gap 32d provided for same in the upper hook 32. The latching tongue 33a of the locking element 33 projects from the edge of the panel 30a in the neutral condition, without spring stressing.

The two panels 30a and 30b are arranged in mutually superposed relationship or overlap each other in FIG. 12. The panel 30a with the upper hook 32 is arranged higher than the panel 30b prior to the locking involvement.

The two hook ends 31a and 32a of the panels 30a and 30b have inclinedly arranged undercut surfaces H1 and H2 which, in the locked condition of the panels 30a and 30b, prevent the panels 30a and 30b from moving away from each other in the plane thereof and perpendicularly to the edges.

FIG. 13 shows an intermediate position during the connection of the hook profiles. The upper hook 32 is arranged over the lower hook 31 in such a way that edge surfaces 31e and 32e which form a join at the top side of the panels are in contact in a vertical plane. The downward movement of the upper hook 32 causes the resilient latching tongue 33a of the locking element 33 to be automatically folded together. The latching tongue 33a is resiliently stressed by virtue of the contact of the latching tongue 33a with the edge surface 31e of the lower hook 31. The edge surface 31e of the lower hook 31 thus acts as a clamping surface 31e for the latching tongue 33a.

Upon a continuation of the joining movement the latching tongue 33a slides completely past the clamping surface 31e until the end of the latching tongue 33a becomes free and automatically moves resiliently outwardly into the latching recess 31c of the lower hook 31. The latching recess 31c has a latching surface R along which the latching tongue 33a slides. The latching surface R is arranged inclinedly to such a degree as to limit the spring travel of the latching tongue 33a before the latching tongue 33a is completely displaced resiliently outwardly. Latching engagement of the latching tongue 33a can already start before the end position of the hook profiles 31 and 32 as shown in FIG. 14 is reached.

In the end position the latching tongue 33a preferably still has a residual portion of the spring stressing and as a result provides for resilient contact with the latching recess 31c. The clip portions 33a and 33b of the locking element 33 are therefore closer together in FIG. 15 than in the neutral position shown in FIG. 12.

The undercut surface H1 of the lower hook 31 is in contact with the undercut surface H2 of the upper hook 32. The inclined positioning of the undercut surfaces H1/H2 provides, during the joining process, a motion component in a horizontal direction, namely, parallel to the plane of the panels 30a and 30b. In that way the edge surface 31e of the panel 30a is moved against the edge surface 32e of the panel 30b. Depending on the respective nature of the production tolerances for the individual dimensions of the hook ends 31a/32a, the edge surface 31e/32e can either be caused to bear exactly snugly against each other, have a gap, or be pressed against each other with a certain pressure under elastic biasing by the hook profiles 31/32.

As shown in FIG. 14 the hook end 31a of the lower hook 31 is in contact with a bottom 32f of the opening 32b of the upper hook 32. In that way a loading on the surface of the panel 30a can be absorbed in the thinnest region of the upper hook 32 and is stably supported by surface contact with the hook end 31a of the lower hook 31.

The hook end 32a of the upper hook 32 in contrast does not extend as far as a bottom 31f of the opening 31b of the lower hook 31. Instead, there is a gap S here. That assists with manufacture as only the opening 32b and the associated hook end 31a have to be produced with a high level of dimensional accuracy. The high level of dimensional accuracy ensures a smooth surface for connected panels 30a and 30b without a heightwise displacement at the join 34. In addition any dust which may be present or other particles can be received in the gap S so that precise positioning of the hook profiles is not adversely affected by foreign bodies which are clamped therein.

In addition a dust chamber M is formed in FIG. 14. It is disposed between the bottom 32f of the opening 32b of the upper hook 32 and the hook end 31a of the lower hook 31. Any dust which may be present is displaced thereinto and in that way does not prevent contact between the hook end 31a and the bottom 31f of the opening 32b of the upper hook 31.

FIG. 15 shows an alternative structure which has only one modification in relation to FIG. 14. The modification is that the contact location between the opening and the hook end is interchanged. In FIG. 15 it is not the hook end 31a of the lower hook 31 but the hook end 32a of the upper hook 32 which is in contact, namely against the bottom 31f of an opening 31b of the lower hook 31. The hook end 31a of the lower hook 31 does not involve any contact with the bottom 32f of the opening 32b of the upper hook 32. In that way a loading on the upper hook 32 near the join 34 of two panels 30a and 30b is particularly well supported because the hook end 32a of the upper hook 32 is supported in flat surface contact in the opening 31b of the lower hook 31.

In addition a dust chamber M is formed in FIG. 15. It is disposed between the bottom 31f of the opening 31b of the lower hook 31 and the hook end 32a of the upper hook 32. Any dust which may be present trickles thereinto and in that way does not impede contact between the hook end 32a and the bottom 31f of the opening 31b of the lower hook 31. In contrast the opening 32b of the upper hook 32 does not involve any contact at its bottom 32f with the hook end 31a of the lower hook 31. Instead a gap S is provided here. The depth of the opening 31b of the lower hook 31 and the corresponding dimension of the hook end 32a are also the sole important functional dimensions which are important for ensuring a common floor surface and for avoiding a heightwise displacement at a join 34.

Another panel, namely with a locking element 33 at a lower hook 31, is described with reference to FIG. 16 which shows two panels 30a and 30b laid one upon the other with some heightwise displacement, as in FIG. 12. A panel 30b is disposed on a support surface U. That panel 30b has a hook profile with a lower hook 31. The lower hook 31 has an upwardly directed opening 31b, that is to say which faces away from the support surface U. The hook profile of the second panel 30*a* has an upper hook 32 provided with a downwardly directed opening 32*b*. Both hook profiles have hook ends 31*a* and 32*a* which respectively fit into the opening 31*b* and 32*b* respectively of the associated hook profile co-operating portion.

At its free end the lower hook 31 is provided with an additional locking element 33 which has a resilient latching tongue 33*a*. The latching tongue 33*a* projects from the edge of the panel 30*b*. The upper hook 32 of the adjacent panel 30*a* is provided with a latching recess 32*c* with a latching surface R co-operating with the latching tongue 33*a* of the locking element 33.

The locking element 33 is the same as in FIG. 12. Its cross-section is of a V-shaped configuration in the manner of a clip. It has two clip portions 33*a* and 33*b* which are visible at the outside edge of the hook profile 31 and which are resilient in the bend of the V-shape. Provided at one of the clip portions 33*b* is an anchoring tongue 33*c* with anchoring means which is fitted into a holding gap 31*d* of the lower hook 31. The locking element 33 is captively connected to the lower hook 31.

FIG. 17 shows an intermediate position during the connection of the hook profiles. The upper hook 32 is arranged over the lower hook 31 in such a way that edge surfaces 31*e* and 32*e* which form a join 34 at the top side of the panels 30*a*/30*b* are in contact in a vertical plane. The resilient latching tongue 33*a* is automatically folded together by the movement of the upper hook 32 towards the locking element 33. In that case the latching tongue 33*a* is in contact with a surface of the upper hook 32, which acts as a clamping surface 32*g* for the latching tongue 33*a*.

As soon as the clamping surface 32*g* has slid completely past the latching tongue 33*a* upon a continuation of the joining movement and the end of the latching tongue 33*a* becomes free, it automatically springs into the latching recess 32*c* of the upper hook 32. That process can already take place before the definitive position of the hook profiles as shown in FIG. 18 is reached.

In the end position the latching tongue 33*a* is preferably still in a spring-stressed condition and as a result causes secure contact and latching in the latching recess 32*c*. The clip portions 33*a* and 33*b* of the locking element 33 are therefore closer together in FIG. 18 than in the neutral position shown in FIG. 16.

The two hook ends 31*a* and 32*a* of the panels 30*a* and 30*b* have inclinedly arranged undercut surfaces H1 and H2 which, in the locked condition of the panels 30*a* and 30*b*, prevent the panels 30*a* and 30*b* from moving away from each other in their plane and perpendicularly to the edges, as in the embodiment in FIG. 14.

As shown in FIG. 18 the hook end 32*a* of the upper hook 32 is in contact with a bottom 31*f* of the opening 31*b* of the lower hook 31. In that way a loading on the surface of the panel 30*a* in the region of the hook end 32*a* of the upper hook 32 can be absorbed by surface contact in the opening 31*b* of the lower hook 31. The opening 32*b* of the upper hook 32 in contrast does not involve any contact at its bottom 32*f* with the hook end 31*a* of the lower hook 31. Instead there is a gap S here. The depth of the opening 31*b* of the lower hook 31 and the corresponding dimension of the hook end 32*a* are in addition the sole important functional dimensions which are important for ensuring a common floor surface and for avoiding a heightwise displacement at the join 34.

A dust chamber M is also formed in FIG. 18. It is between the bottom 32*f* of the opening 32*b* of the upper hook 32 and the hook end 31*a* of the lower hook 31. Any dust which may be present is displaced thereinto and accordingly does not impede contact between the hook end 32*a* and the bottom 31*f* of the opening 31*b* of the lower hook 31.

FIG. 19 shows an alternative structure of a panel which has only one modification in relation to FIG. 18. The modification is that the contact location between the opening and the hook end is interchanged. In FIG. 19 the hook end 31*a* of the lower hook 31 bears against a bottom 32*f* of the opening 32*b* of the upper hook 32 whereas the hook end 32*a* of the upper hook 32 does not involve any contact with the bottom 31*f* of the opening 31*b* of the lower hook 31. Instead there is a gap S there. Providing contact precisely at that location affords the advantage that that region of the upper hook 32, which is of the thinnest cross-section, is always supported by the hook end 31*a* of the lower hook 31 when a loading occurs on the floor surface at that location. In addition any dust which may be present or other particles can be received in the gap S so that precise positioning of the hook profiles is not adversely influenced by foreign bodies which are jammed therein.

A dust chamber is also formed in FIG. 19. It is disposed between the bottom 32*f* of the opening 32*b* of the upper hook 32 and the hook end 31*a* of the lower hook 31. Any dust which may be present is displaced thereinto and accordingly does not interfere with contact between the hook end 31*a* and the bottom 32*f* of the opening 32*b* of the upper hook 31.

A particular embodiment of a panel is described with reference to FIGS. 20 and 21. FIG. 20 shows the connecting location of two panels 30*a* and 30*b*. The panels 30*a* and 30*b* have hook profiles. Each complete panel has the complementary hook profiles which are shown in FIG. 20, at opposite edges. Furthermore each of the opposite hook profiles is provided with a locking element 33. In that way two panels 30*a* and 30*b* are always arrested at a join 34 by means of two locking elements 33. The locking elements 33 used are of a cross-section which has clip portions 33*a* and 33*b* which are of a V-shaped configuration in the manner of a clip and of which one is provided with an anchoring tongue 33*c* with anchoring means. A first one of the locking elements 33 is anchored to a lower hook 31 of a panel 30*b*. The second locking element is arranged at an upper hook 32 of the adjacent panel 30*a*. Automatic latching of the locking elements 33 takes place automatically. Latching engagement of the locking element 33 on the upper hook 32 substantially corresponds to the process described with reference to FIGS. 12 to 14. Latching of the locking element 33 on the lower hook 31 corresponds to the process described with reference to FIGS. 16 to 18.

Figure 22:
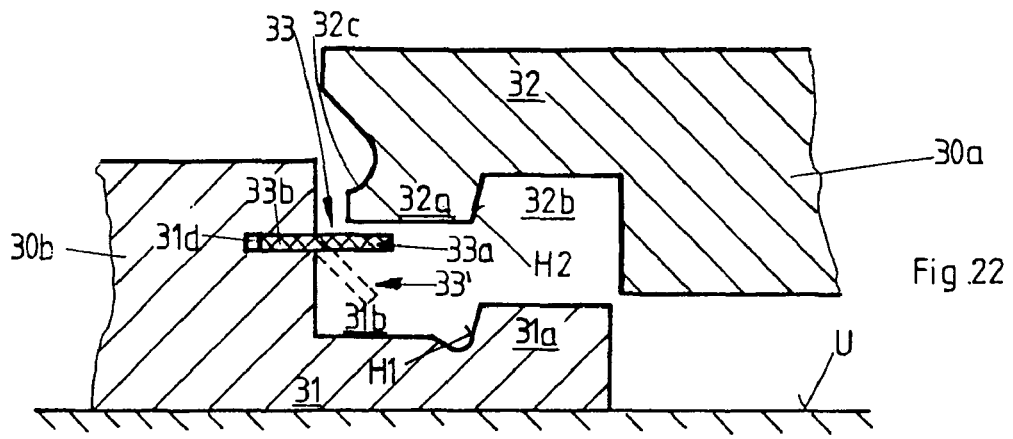

An alternative embodiment of a panel with another locking element 33 is described with reference to FIGS. 22 to 25. FIG. 22 shows panels 30*a* and 30*b* with hook profiles, namely a lower hook 31 and an upper hook 32, wherein the lower hook 31 is provided with the locking element 33 which can be resiliently bent. As FIG. 22 shows the locking element 33 is of a narrow rectangular cross-section. It is anchored with an end 33*b* in a holding gap 31*d* of the lower hook 31. The other end of the locking element 33 projects freely and forms a resilient latching tongue 33*a*. For latching engagement the latching tongue 33*a* is automatically bent over by a joining movement of the upper hook 32. The panel 30*b* with the lower hook 31 lies on a support surface U. The lower hook 31 is provided with an upwardly facing hook end 31*a* and with an upwardly directed opening 31*b*, that is to say which faces away from the support surface.

As shown in FIG. 22 the upper hook 32 has a latching recess 32*c* co-operating with the latching tongue 33*a* of the locking element 33 when the panels 30*a* and 30*b* are locked.

Furthermore FIG. 22 indicates an alternative configuration of a locking element 33' in broken line. The broken-line locking element 33', in the neutral condition, is already of a bent or curved shape. That facilitates the assembly procedure and can improve stability and durability of the locking element 33' in relation to the locking element 33 because the locking element 33' has to be bent less than the straight locking element 33.

Figure 23:
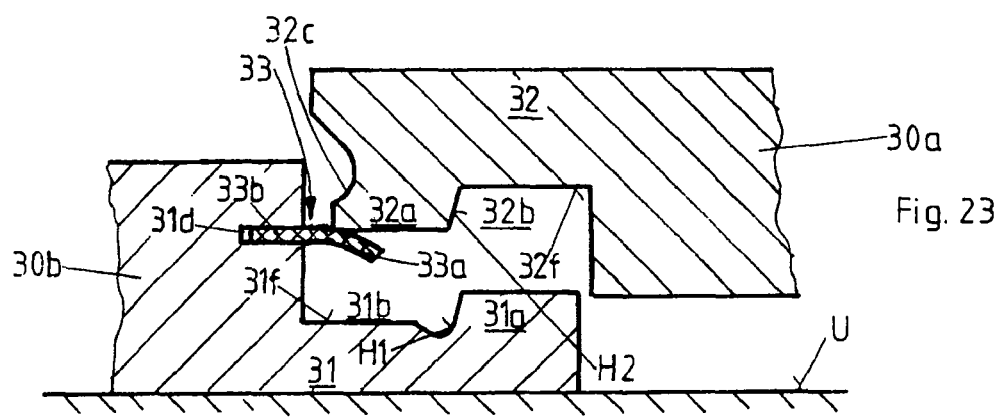

FIG. 23 shows the embodiment of FIG. 22 in a first intermediate position in which the upper hook 32 is in contact with the latching tongue 33a of the locking element 33 and urges it in the direction of the opening 31b of the lower hook 31. In that situation the locking element 33 stores elastic spring energy.

Figure 24:
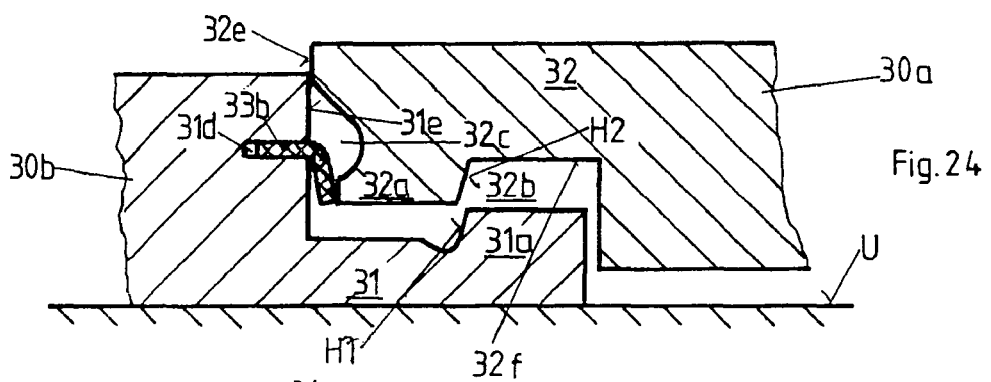

A further intermediate step in the joining movement is shown in FIG. 24. In that position edge surfaces 31e and 32e have come into contact, more specifically in the region of a join 34 which occurs at the surface of the panels 30a and 30b. In addition the latching tongue 33a of the locking element 33 bears against a clamping surface 32g of the upper hook 32. The latching tongue 33a of the locking element 33 involves its maximum spring stressing in that position. After the clamping surface 32g of the upper hook 32 has slid completely past the latching tongue 33a the latching tongue 33a of the locking element 33 automatically snaps into the latching recess 32c of the upper hook 32 by virtue of the effect of the spring stressing of the latching tongue. The structure is preferably so designed that, in the latched end position, there still remains a residual portion of the spring stressing in the locking element 33 so that, in the FIG. 25 position, contact is always ensured between the latching tongue 33a of the locking element 33 and the latching recess 32c.

The two hook ends 31a and 32a of the panels 30a and 30b have inclinedly arranged undercut surfaces H1 and H2 which, in the locked condition of the panels 30a and 30b, prevent the panels 30a and 30b from moving away from each other in their plane and perpendicularly to the edges, as in the embodiment of FIG. 14.

Figure 25:
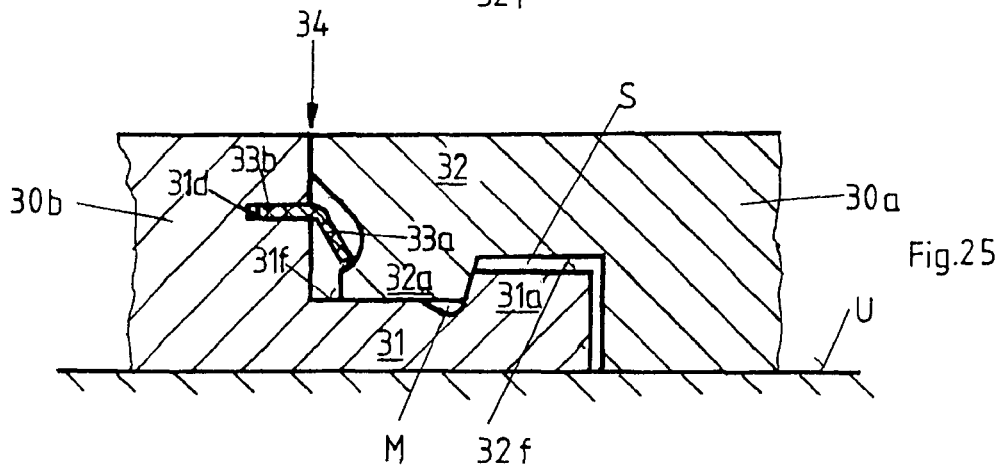

It can further be seen from FIG. 25 that the hook end 32a of the upper hook 32 is in contact with a bottom 31f of the opening 31b of the lower hook 31. That guarantees load transmission from the hook end 32a of the upper hook 32 into the lower hook 31. The hook end 31a of the lower hook 31 in contrast does not involve any contact with a bottom 32f of the opening 32b of the upper hook 32. At this juncture attention is to be directed to an alternative which is not shown and in which the contact location in respect of the opening/hook end between the upper hook 32 and the lower hook 31 can be interchanged so that the hook end 31a of the lower hook 31 bears against the bottom of the opening of the upper hook 32 and conversely the hook end 32a of the upper hook is not in contact against the bottom 31f of the opening 31b of the lower hook 31. Instead, there is a gap S. The advantages and disadvantages of such a configuration are as described hereinbefore with reference to FIG. 19.

A further embodiment of a panel with hook profiles at opposite edges is described with reference to FIGS. 26 to 29. This again involves a panel with lower hook 31 at one edge and upper hook 32 at the opposite edges. In this case the upper hook 32 is that which is provided with an additional locking element 33.

The locking element 33 corresponds to the locking element 33 of FIG. 22. It is of a narrow rectangular cross-section. The rectangular cross-section has a part which serves as an anchoring tongue 33b and which is anchored in a holding gap 32d. The other part 33a of the locking element projects out of the holding gap, in the form of a resilient bendable latching tongue 33a.

A dust chamber M is also formed in FIG. 25. It is between the bottom 31f of the opening 31b of the lower hook 31 and the hook end 32a of the upper hook 32. Any dust which may be present is displaced thereinto and accordingly does not impede contact between the hook end 32a and the bottom 31f of the opening 31b of the lower hook 32.

Figure 26:
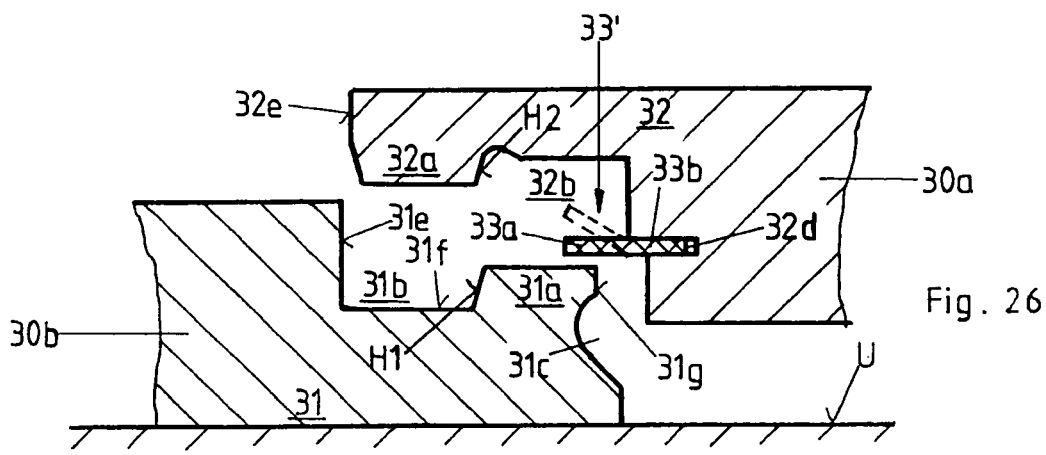

FIG. 26 also indicates an alternative embodiment of a locking element 33', shown more specifically in broken line. This involves a locking element 33' which, in its neutral position, is of a curved or bent form. The curve/bend points in the direction in which the locking element 33' has to be bent for latching engagement.

In FIG. 26 the panel 30b illustrated with the lower hook 31 rests on a support surface U. The upper hook 32 of an adjacent panel 30a is disposed above the support surface U. There is not yet any contact between the panels 30a and 30b.

Figure 27:
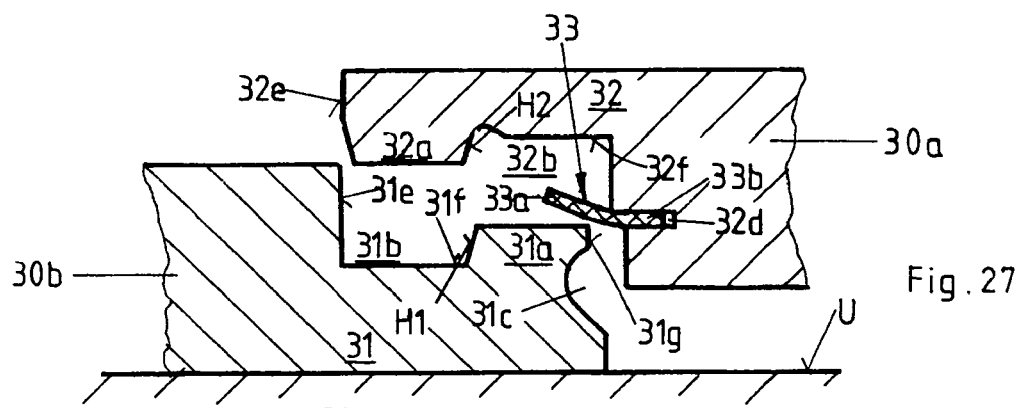

In FIG. 27 the upper hook 32 has been moved downwardly by a distance so that the locking element 33 has come into contact with the hook end 31a of the lower hook 31 and the latching tongue 33a is bent. Upon further downward movement of the upper hook 32 the bending of the latching tongue 33a of the locking element 33 increases until it slides along a clamping surface 31g of the lower hook 31. The bending of the latching tongue 33a of the locking element 33 is at its greatest when its free end is in contact with the clamping surface 31g of the lower hook 31. Insofar as the clamping surface 31g is arranged in parallel relationship with the direction of movement, the prestressing of the locking element 33 remains constant during the joining movement, and that applies moreover in regard to all embodiments. It will be appreciated that the prestressing can also be of a variable nature insofar as a suitable shape and arrangement is imparted to the clamping surface 31g, which afford a change in the spring travel of the latching tongue 33a while the joining movement is taking place.

In the present case the prestressing effect changes when the latching tongue 33a of the locking element 33 has slid down as far as the end of the clamping surface 31g automatically. That is because the latching tongue 33a then springs out into a latching recess 31c in the lower hook 31. In that situation the level of spring energy decreases. Desirably however the structure is so designed that a residual portion of the spring energy always remains stored in the locking element. That thus ensures that the latching tongue 33a of the locking element 33 always exerts a certain spring pressure against the latching recess 31c and ensures a secure latching effect.

It can be further be seen from FIG. 28 that the two panels 30a and 30b come into contact in the region of a join 34 which is at the surface of the panels. Upon a further downward movement of the upper hook 32 edge surfaces 31e and 32e slide past each other in the region of the join 34.

The two hook ends 31a and 32a of the panels 30a and 30b have inclinedly arranged undercut surfaces H1 and H2 which, in the locked condition of the panels 30a and 30b, prevent the panels 30a and 30b from moving away from each other in their plane and perpendicularly to the edges, as in the FIG. 14 embodiment.

The end position of the hook profiles is shown in FIG. 29 in which the locking element 33 is in latching engagement. The hook end 31a of the lower hook 31 is in contact with a bottom 32f of the opening 32b of the upper hook 32 whereas the hook end 32a of the upper hook 32 does not involve any contact with a bottom 31f of the opening 31b of the lower hook 31. Here there is a gap S. As is already the case with the above-described embodiments however that can be interchanged. The possibility of the two hook ends and bottoms of the openings being so-to-speak brought into contact with each other is also proposed because this involves a particularly stable configuration if there is no gap at all. This configuration (not shown) presupposes a high level of manufacturing quality.

A dust chamber M is also formed in FIG. 29. It is between the bottom 32*f* of the opening 32*b* of the upper hook 32 and the hook end 31*a* of the lower hook 31. Any dust which may be present is displaced thereinto and accordingly does not prevent contact between the hook end 31*a* and the bottom 32*f* of the opening 32*b* of the upper hook 31.

A further embodiment of a panel is described with reference to FIGS. 30 and 31. FIG. 30 shows two panels 30*a* and 30*b* which have hook profiles at opposite sides. The panel 30*b* is provided with a lower hook 31 to which an additional locking element 33 is anchored. The panel 30*a* is provided with an upper hook 32 to which an additional locking element 33 is also anchored. At the edges which are not shown, the panels 30*a* and 30*b* are each provided with the respective complementary hook profile. As a panel is provided with a locking element at each of the opposite edges, two locking elements 33 are always involved at a connecting location between two panels 30*a* and 30*b*.

The two hook ends 31*a* and 32*a* of the panels 30*a* and 30*b* have inclinedly arranged undercut surfaces H1 and H2 which, in the locked condition of the panels 30*a* and 30*b*, prevent the panels 30*a* and 30*b* from moving away from each other in their plane and perpendicularly to the edges, as in the embodiment of FIG. 14.

Latching engagement of the locking element 33 provided on the lower hook 31 corresponds to the process which is described with reference to FIGS. 22 to 25. Latching engagement of the locking element 33 provided on the upper hook 32 substantially corresponds to the process described with reference to FIGS. 26 to 29.

In the intermediate position shown in FIG. 30 the locking elements 33 involve maximum spring stressing. Latching engagement of the two locking elements occurs automatically and, with the symmetrical structure by way of example in respect of the hook profiles, almost simultaneously.

A further embodiment of a panel is shown in FIGS. 32 to 37. This is a panel with hook profiles at opposite edges. As shown in FIG. 32 a panel 30*b* is provided with a lower hook 31 and a panel 30*a* is provided with an upper hook 32. The lower hook 31 has an additional locking element 33 in the form of a locking clasp 33.

The locking clasp 33 has anchoring tongues 33*c* with which it is anchored in a holding gap 31*d* of the lower hook 31. In order to clearly show the configuration of the locking clasp 33, attention is directed to FIGS. 36 and 37. FIG. 36 shows a plan view on to the edge of the panel 30*b*. The curved shape of the locking clasp 33 is shown in broken line. It is possible to see the anchoring tongues 33*c* which are inserted deeply into the holding gap 31*d* to the bottom thereof. As shown in FIG. 36 the locking clasp 33 is in a neutral condition without spring stressing. The locking clasp 33 has a latching tongue 33*a* which projects out of the holding gap 31*d* as shown in FIG. 36. The neutral initial position of the locking clasp 33 shown in FIG. 36 is the same as the position shown in FIG. 32.

In FIG. 33 the upper hook 32 has been moved downwardly by a distance and as a result has pressed against the latching tongue 33*a* of the locking clasp 33. As a result the latching tongue is deflected back a distance into the holding gap 31*d*. Upon a continuation of the joining movement of the upper hook 32 the latching tongue 33*a* is further pressed into the holding gap 31*d* and clears the way for the upper hook 32.

The two hook ends 31*a* and 32*a* of the panels 30*a* and 30*b* have inclinedly arranged undercut surfaces H1 and H2 which, in the locked condition of the panels 30*a* and 30*b*, prevent the panels 30*a* and 30*b* from moving away from each other in their plane and perpendicularly to the edges, as in the FIG. 14 embodiment.

When the locking clasp 33 assumes the position shown in FIG. 34, the maximum level of spring stressing is reached, which can be imparted to the locking clasp 33 in the present structure. A plan view of that position of the locking clasp 33 is shown in FIG. 37. The latching tongue 33*a* of the locking clasp 33 is pushed back into the holding gap 31*d* as far as the edge thereof.

In a further joining movement the latching tongue 33*a* moves automatically out of the holding gap 31*d* again by virtue of the spring energy stored in the locking clasp 33 and engages into a latching recess 32*c* in the upper hook 32.

The definitive position of the hook profiles 31/32 is shown in FIG. 35 in which the latching tongue 33*a* of the locking clasp 33 presses with a residual portion of the spring stressing against the latching recess 32*c* in the upper hook 32 and securely arrests the hook profiles.

A dust chamber M is also formed in FIG. 35. It is between a bottom 31*f* of an opening 31*b* of the lower hook 31 and a hook end 32*a* of the upper hook 32. Any dust which may be present or other particles trickle thereinto and accordingly do not impede contact between the hook end 32*a* and the bottom 31*f* of the opening 31*b* of the lower hook 31.

In contrast an opening 32*b* of the upper hook 32 does not have any contact at a bottom 32*f* with a hook end 31*a* of the lower hook 31. Instead, there is a gap S here. The depth of the opening 31*b* of the lower hook 31 and the corresponding dimension of the lower hook 32*a* are also the sole important functional dimensions which are important for ensuring a common floor surface and for avoiding a heightwise displacement at a join 34.

Figure 38:
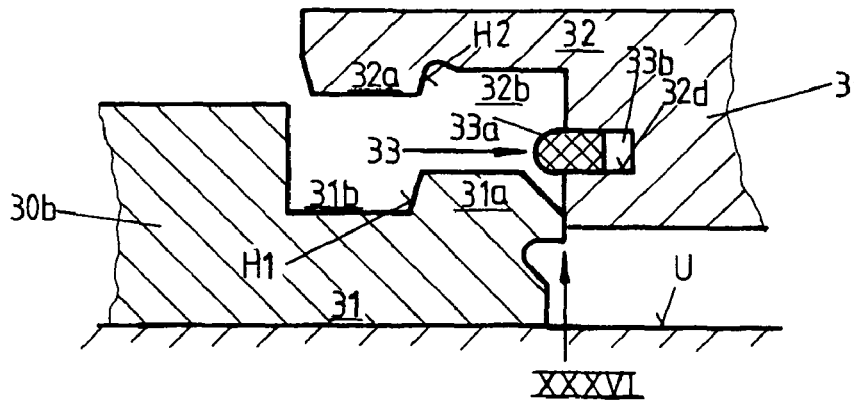

A further embodiment of a panel is shown in FIGS. 38 to 41. This involves a panel with hook profiles at opposite edges. As shown in FIG. 38 a panel 30*b* is provided with a lower hook 31 and a panel 30*a* is provided with an upper hook 32. The upper hook 32 has an additional locking element 33 in the form of a locking clasp 33.

The locking clasp 33 has anchoring tongues 33*c* with which it is anchored in a holding gap 32*d* of the upper hook 32. In order to clearly show the configuration of the locking clasp 33 attention is directed to FIGS. 36 and 37. FIG. 36 shows the principle of the locking clasp 33 based on the viewing direction XXXVI as shown in FIG. 38, namely a view from below on to the edge of the panel 30*a*. FIG. 37 shows the principle of the locking clasp 33 based on the viewing direction XXXVII as shown in FIG. 40, namely also a view from below on to the edge of the panel 30*a*. The locking clasp 33 has anchoring tongues 33*c* which are inserted into a holding gap 32 deeply as far as the bottom thereof. The locking clasp 33 again has a latching tongue 33*a* which, as shown in FIG. 38, projects out of the holding gap 32.

Figure 39:
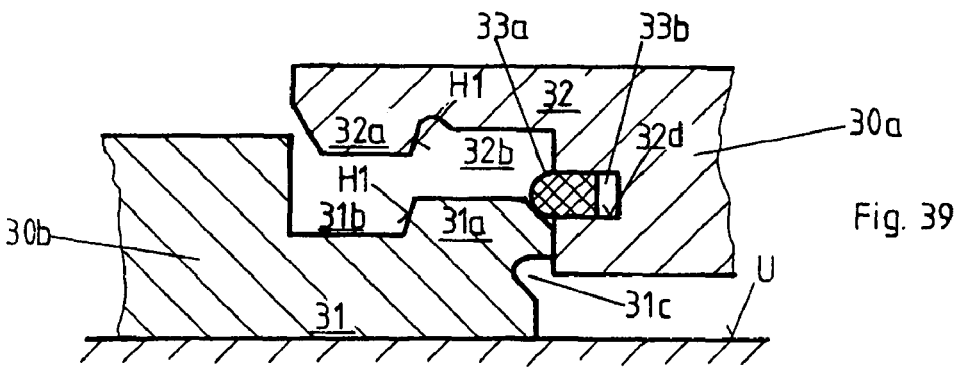

The upper hook 32 has been moved downwardly by a distance in FIG. 39. The latching tongue 33*a* of the locking clasp 33 has been pressed against a hook end 31*a* of the lower hook 31 and deflected back into the holding gap 32*d* by a distance. Upon a continuation of the joining movement of the upper hook 32 the latching tongue 33*a* is further pressed into the holding gap 32*d* and clears the way for the upper hook 32 to be introduced completely into the lower hook 31.

When the locking clasp 33 assumes the position shown in FIG. 40 the maximum level of spring stressing is reached, which can be imparted to the locking clasp 33 in the present construction. A view of that position of the locking clasp 33 from below corresponds to the view in FIG. 37. The latching tongue 33a of the locking clasp 33 is pushed back into the holding gap 32d as far as the edge thereof.

The two hook ends 31a and 32a of the panels 30a and 30b have inclinedly arranged undercut surfaces H1 and H2 which, in the locked condition of the panels 30a and 30b, prevent the panels 30a and 30b from moving away from each other in their plane and perpendicularly to the edges, as in the embodiment of FIG. 14.

In a further joining movement the latching tongue 33a automatically moves out of the holding gap 32d again by virtue of the spring energy stored in the locking clasp 33 and engages into a latching recess 31c provided on the lower hook 31.

The definitive position of the hook profiles 31/32 is shown in FIG. 41, in which the latching tongue 33a of the locking clasp 33 presses with a residual portion of the spring stressing against the latching recess 31c of the lower hook 31 and securely arrests the hook profiles.

A dust chamber M is also formed in FIG. 41. It is between the bottom 32f of an opening 32b of the upper hook 31 and a hook end 31a of the lower hook 31. Any dust which may be present or other particles trickles thereinto and accordingly does not impede contact between the hook end 31a and the bottom 32f of the opening 32b of the lower hook 32.

In contrast an opening 31b of the lower hook 31 does not involve contact at a bottom 31f with a hook end 32a of the upper hook 32. Instead, there is a gap S here. The depth of the opening 32b of the upper hook 32 and the corresponding dimension of the hook end 31a of the lower hook 31 are also the sole important functional dimensions which are important for ensuring a common floor surface and for avoiding a heightwise displacement at a join 34.

FIG. 42 shows an intermediate position during the operation of connecting two panels 30a and 30b having hook profiles. An upper hook 32 is arranged over a lower hook 31 in such a way that edge surfaces 31e and 32e which form a join at the top side of the panels are in contact in a vertical plane. A resilient latching tongue 33a of a locking element 33 has been automatically folded together by a relative movement of the hook 32 towards the panel 30b. The latching tongue 33a is resiliently stressed by virtue of the contact of the latching tongue 33a with the edge surface 31e of the lower hook 31. The edge surface 31e of the lower hook 31 thus acts as a clamping surface 31e for the latching tongue 33a.

Upon a continuation of the joining movement the latching tongue 33a slides completely past the clamping surface 31e until the end of the latching tongue 33a becomes free and automatically springs out into a latching recess 31c in the lower hook 31. The latching recess 31c has a latching surface R along which the latching tongue 33a slides. The latching surface R is arranged inclinedly at an extent which limits the spring travel of the latching tongue 33a before the latching tongue 33a has moved completely outwardly resiliently. The neutral relaxed position of the latching tongue 33a of the locking element 33 is shown in broken line.

The locking element in FIG. 42 is shown in cross-section in FIG. 43. The locking element is in a neutral relaxed condition. Its cross-section is of a V-shaped or U-shaped configuration in the manner of a clip. It has two clip portions 33a and 33b. The clip portion 33a forms a resilient latching tongue 33a. The other clip portion 33b is provided with an anchoring tongue 33c. A curved clip portion 33d is provided between the clip portions 33a and 33b. The curved clip portion 33d is thinner than the clip portions 33a and 33b in order to assist with spring mobility. The anchoring tongue 33c is shaped in the manner of a harpoon leg. It has two prongs 33e as anchoring means. The prongs 33e provide a good anchoring effect on the part of the locking element when it is fitted into a holding gap 32d provided for same in the upper hook 32, as in FIG. 42. The anchoring tongue 33c has a pressing surface which is pressed by a pressing-in tool and by way of which a force is applied for pressing the anchoring tongue of the locking element into a holding gap of a panel. The pressing surface is intended and designed to receive a pressing force from the pressing-in tool E and to transmit it into the anchoring tongue 33c. The pressing-in surface is provided on the clip portion 33b in the embodiment of the locking element shown in FIG. 42. The clip portion 33b has the property of being able to carry a pressing force without being bent by that pressing force. For that purpose, the material and the material thickness of the clip portion 33b are so selected that the desired function of transmitting the force is performed without the clip portion 33b being put at risk of breaking off or thus bending.

In general terms locking elements 5 or 200 which are of a different shape can also have a pressing surface. The pressing surface has to be provided at a region of the locking element 5 or 200, whose quality and thickness of material are adapted to permit transmission of a force which is applied to the locking element by a pressing-in tool E.

A pressure roller is diagrammatically illustrated in FIG. 43 as the pressing-in tool E. That corresponds in principle to the pressing roller 600a shown in FIGS. 53 and 61.

The pressing surface can be provided with means which promote force transmission in frictionally locking relationship, for example a structured surface. For example that can prevent slip between a pressing roller E which transmits a pressing-in force to the locking element 33 by means of a rotary movement.

All locking elements 33 shown in FIGS. 12 to 42 are preferably provided only for locking the panels 30a and 30b in a direction substantially perpendicular to the plane of the panels.

Other means are provided for affording a locking action to prevent connected panels 30a and 30b from moving away from each other in a direction parallel to the plane of the panels 30a and 30b, namely substantially horizontally. Preferably the undercut surfaces H1/H2 which are common to all hook profiles themselves form the means for horizontal locking, which in the locked condition prevent the panels from moving away from each other.

The hook profiles can be produced in such a way that contact surfaces of an undercut configuration which are effective to provide for horizontal locking are either forced against each other with elastic deformation of the panel material or a gap is present between the contact surfaces of the undercut configuration. A gap affords a connection which involves play in a horizontal direction. Otherwise, if undercut surfaces of the hook profiles can be assembled with pressure and with elastic deformation thereof, the result achieved is a connection in which there is no play at the join between two panels, but there is an elastic prestressing action between the connected panels.

Alternatively it is possible to provide between undercut surfaces an additional element which for example in turn forces the edges of the panels 30a and 30b against each other by an elastic action, so that a join 34 at the surface of a panel covering is closed as much as possible.

FIG. 44 shows perspective views of parts of two panels 30a and 30b with different locking elements. There is also a diagrammatic view which shows the arrangement of the panels 30a and 30b as a whole within a row of panels P1. The foremost panel of the row P1 is shown in broken line. Besides the top side and the underside, the panels 30a and 30b have peripherally extending edges on which holding profiles are disposed. The oppositely disposed holding profiles of each panel are formed as complementary hook profiles in paired relationship, for the purposes of a vertical component in the joining movement.

FIG. 45 diagrammatically shows a plurality of panels 35, 36, 37, 38 and 39 arranged in two rows P1 and P2 of panels. The panels 35, 36, 37, 38, 39 are already locked with locking elements which are not shown in the simplified diagrammatic view. A new panel 40 has to be locked as shown in FIG. 45 at two edges which are arranged at an angle relative to each other, namely both with the edge 40a to panels 37 and 38 of the row P1 and also with the edge 40b to a panel 39 in the same row P2.

As shown in FIG. 44, a new panel 30b is connected to a panel 30a of the first row P1. There is no row of panels disposed in front of the row P1 of panels. The new panel 40 is locked with one of its edges only to a panel 30a in the same row P1. For that purpose the panel 30b is moved in aligned relationship as indicated by F with the panel edges. The panels 30a and 30b lie in that case on a support surface.

The panel 30a has hook profiles which are arranged at an angle to each other, namely an upper hook 32 and a lower hook 31. The upper hook 32 has a holding gap 32d. A locking element 33 with a resilient latching tongue 33a is anchored in the holding gap 32d. The lower hook has a holding gap 31d. A locking clip 33 is anchored in the holding gap 31d. A resilient latching tongue 33a of the locking clip 33 projects out of the holding gap 31d. Respective complementary hook profiles are provided at the opposite edges (not shown) of the lower hook 31 and the upper hook 32.

The panel 30b also has hook profiles arranged at an angle to each other. Of those, the two upper hooks 32 and 35 are to be seen in the part shown in FIG. 44. The upper hook 32 of the panel 30b corresponds to the upper hook 32 of the panel 30a. The panel 30b thus also has a holding gap 32d in which a locking element 33 is anchored. A resilient latching tongue 33a of the locking element 33 projects from the edge of the panel 30b. The shape of the upper hook 35 of the panel 30b is the complementary counterpart of the lower hook 31 and vice-versa. The respective complementary hook profiles as referred to above are provided at the opposite edges (not shown) of the upper hook 32 and the lower hook 35.

For the purpose of locking the panels 30a and 30b of the first row of panels, the panel 30b is pushed in a flat movement with its upper hook 32 from the side into the complementary lower hook of the panel 30a. At the beginning of that movement the upper hook 32 of the panel 30b should be moved towards the edge of the panel 30a in such a way that the latching tongue 33a of the locking element 33 is moved resiliently inwardly by the contact with the panel 30a. The inward resilient movement of the latching tongue 33a provides that the cross-section of the locking element 33 assumes a position which fits into the internal cross-section of the latching recess of the complementary lower hook of the panel 30a. As soon as the panel 30b has been fitted in that way the panels 30a and 30b are connected by a simple pushing movement until the upper hook of the panel 30b is connected over the entire length of the corresponding edge to the lower hook of the panel 30a. In that situation the latching tongue 33a is progressively automatically resiliently displaced into the latching recess at the location of entry.

The process for locking the first row of panels is obviously not limited to those locking elements which are shown in FIG. 44. Alternatively it is possible to use at least each locking element as shown in FIGS. 12 to 42 as well as the hook profile configuration specified therein.

A process which uses the steps of FIGS. 12 to 14 and FIGS. 16 to 18 respectively is equally simple. In that case firstly a substantially horizontal component of movement is used to feed the resilient latching tongue of a locking element not from above but from the side, to bring it into contact with the adjacent panel. That can be easily performed because the upper hook 32 of the panel 30a, as shown in FIGS. 12 and 16, can be laid loosely on the lower hook 31 of the panel 30b and thereafter the panel 30a can be pushed against the edge surface 31e of the panel 30b, whereby the latching tongue 33a moves resiliently inwardly and bears tightly against the hook profile.

It is only when the latching tongue 33a has been displaced resiliently inwardly that the panel 30a with its upper hook 32 is moved vertically downwardly, namely hookingly engaged into the lower hook of the adjacent panel 30b perpendicularly to the plane of the panel, until the inwardly displaced latching tongue 33a of the locking element 33 automatically springs out against a latching surface R of a latching recess of the respective adjacent panel and arrests the hook connection.

A process for locking a panel having hook profiles at opposite edges and a locking element with a resilient latching tongue, wherein a fresh panel 40 has to be connected both to panels of a first row P1 and also to a panel 39 of the same row P2, is shown with reference to diagrammatic FIG. 45. FIG. 46 shows a plan view and a side view of the panel 40 shown in FIG. 45. The edges 40a and 40b are in the form of upper hooks while the two edges 40c and 40d are in the form of lower hooks. Basically it is possible to use any hook profile configuration as shown in FIGS. 12 to 42 for the hook profiles in FIG. 46. In the present case the lower hooks 40c and 40d correspond to the embodiment of FIGS. 32 to 35.

As shown in FIG. 45 a new panel is locked by a procedure whereby it is laid with a corner, here the corner of the upper hooks 40a/40b, on lower hooks of the row P1 of panels and a lower hook of the panel 39 of the same row P2 respectively. The upper hook 40b is then inserted on the basis of the zip fastener principle, over the entire length thereof. The insertion operation can be simplified if the panel 40 is flexed somewhat. As can be seen from FIG. 45 a curvature has been imparted to the edge 40b. In that way it is possible for the upper hook 40b to be connected to the lower hooks of the panels 37 and 38 of the row P1 in the manner of a zip fastener, because a progressing point of the upper hook always engages into a lower hook. If the panel 40 were not actively flexed, a pivotal movement of the straight edge 40b would provide that the upper hook comes simultaneously into contact over the entire length with the lower hook of the row P1. In that case a slight lateral displacement can easily make it difficult to fit the components one into the other in a scissor-like configuration because the upper hook and the lower hook at the end of the scissor movement still have to be adjusted and brought into exact overlap with each other. That adjustment problem is countered with the zip fastener process applied to the laying procedure, with active flexing of the panel 40.

The same applies to the edge with the upper hook 40a, in which case the zip fastener process is of greater significance for a long edge than for a short edge.

It will be appreciated that the zip fastener process can also be applied for the edge 40b in the opposite direction, namely beginning at the edge 40c in the direction of the edge 40a, in which case however there is no installation assistance for correct positioning of the panel 40 and it is therefore more difficult for the zip fastener process to be caused to end exactly at the panel 39. It can happen that a gap remains in relation to the panel 39 or that the panel 39 is overlapped by the panel 40.

During insertion of the upper hooks 40*a* and 40*b* into the lower hooks of the panels 37, 38 and 39 latching engagement of the locking clasps 33 takes place automatically, as in FIGS. 32 to 35.

Figure 47:
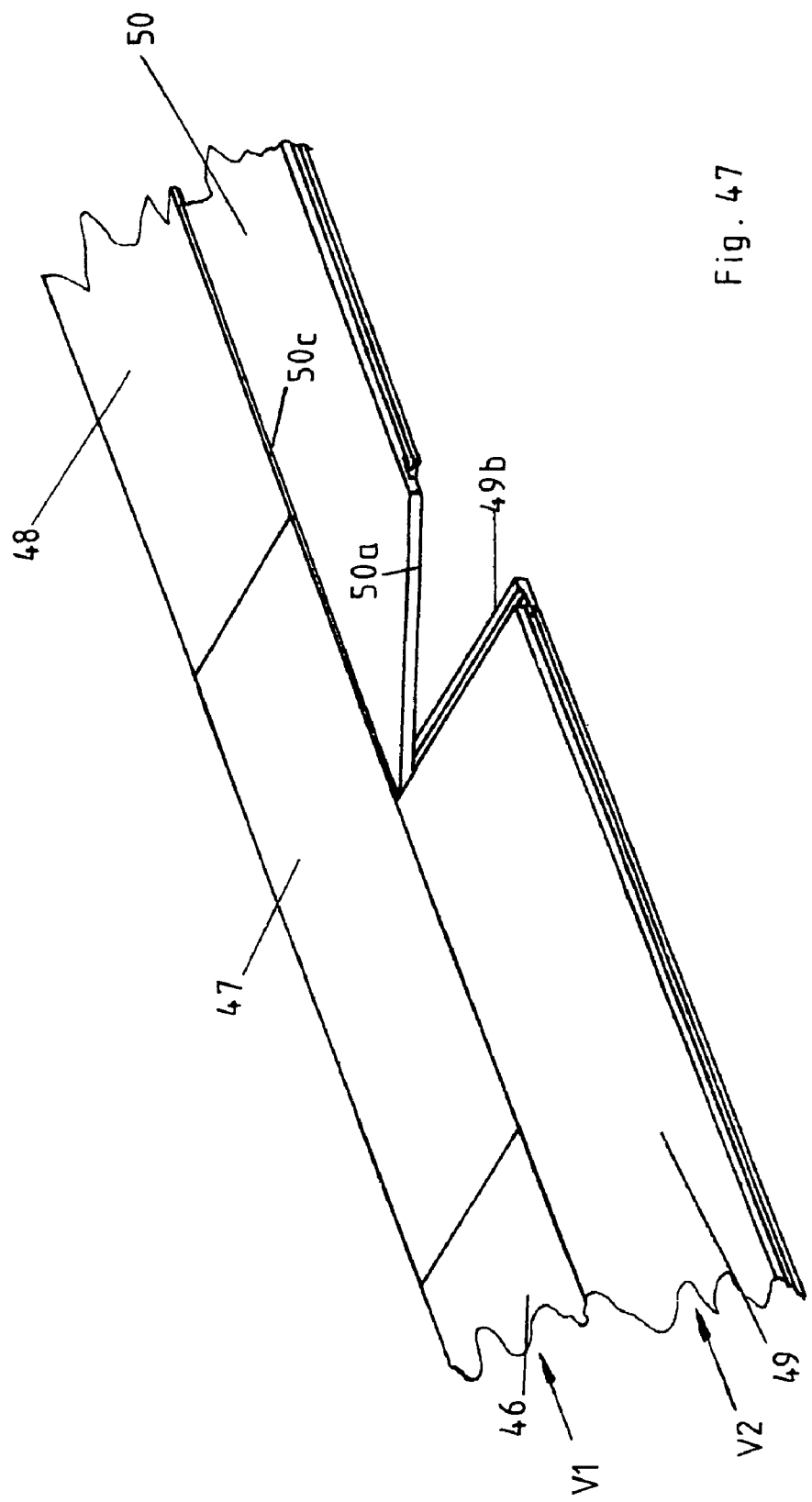
Figure 48:
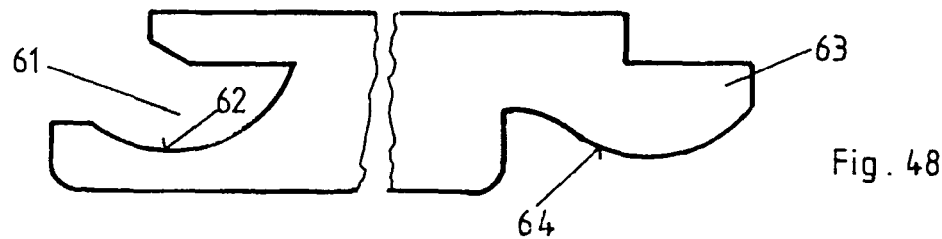
Figure 49:
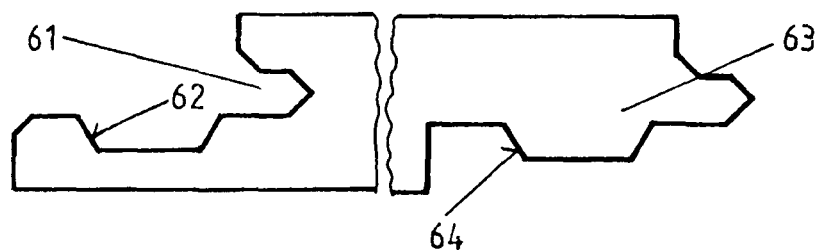
Figure 50:
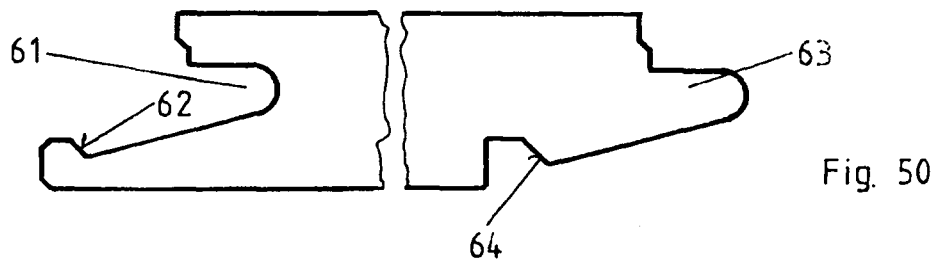
Figure 51:
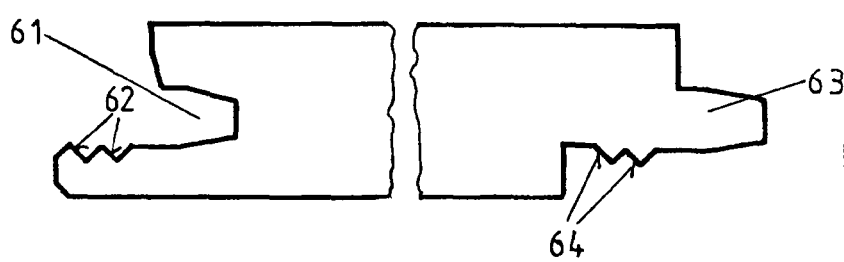
Figure 52:
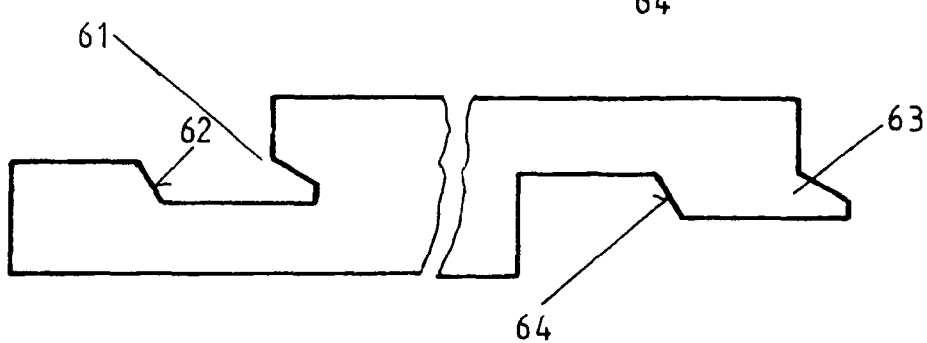

FIG. 47 shows alternative panels 46, 47, 48, 49 and 50 as well as a laying process intended for same. The panels form a part of a panel covering. They have two kinds of holding profiles. The interlocked panels 46, 47 and 48 are shown in a front row V1 of the panel covering. Shown in a following row V2 is a panel 49 which is preferably positively lockingly connected to the panels 46 and 47 of the front row. A new panel 50 is inclinedly attached with an edge 50*c* to the panels 47 and 48 of the front row V1. The new panel 50 still has to be pivoted downwardly into the plane of the lying panels 46, 47, 48 and 49.

Those edges of the panels 46, 47, 48, 49 and 50 which are provided for connecting the rows V1 and V2 of panels to each other must have a holding profile which is suitable for inclined attachment and subsequent locking by downward pivotal movement into the plane of the lying panels. Such a holding profile is known from WO 00/63510 A1. The disclosure thereof in respect of those panel edges which serve for connecting different rows of panels is hereby incorporated as an embodiment. WO 00/63510 A1 discloses in that respect a special hook profile which connects a new panel to panels of a front row, by a pivotal movement. In other respects hook profiles are also provided for locking the panels of the same row. More specifically those hook profiles are fitted into each other by a scissor-like pivotal movement and thus automatically come into hooking engagement in one movement.

In addition FIGS. 48 to 52 show suitable holding profiles which are suitable for locking by inclined attachment and subsequent downward pivotal movement into the plane of lying panels. These examples involve modified tongue-and-groove profiles. The groove 61 has at least one undercut surface 62. The same applies for the tongue 63 which is provided with an undercut surface 64. In regard to FIG. 49 attention is directed to WO 97/47834. In regard to FIG. 52 attention is directed to DE 79 28 703 U1. The holding profiles with a tongue-and-groove profile desirably provide for a positively locking connection which locks the panels both perpendicularly to their plane and also within their plane and also perpendicularly to a groove edge or tongue edge respectively.

During the downward pivotal movement of the panel 50 from the inclined position shown in FIG. 47 the edge 50*a* of the panel 50 is moved scissor-like towards the edge 49*b* of the panel 49. The edges 50*a* and 49*b* involve complementary hook profiles which are secured with at least one locking element according to the invention, namely to prevent them from moving away from each other perpendicularly to the plane of the panels. The edge 49*b* has a lower hook and the edge 50*a* has an upper hook as a counterpart portion.

The hook profiles 50*a*/49*b* are secured against coming loose perpendicularly to the plane of the panels by means of a locking element with a resilient latching tongue. Structural configurations which are known from the state of the art can be used. Structural configurations which have been found to be expedient are those which provide for resilient locking only in regard to the panels moving away from each other perpendicularly to the plane of the panels but which do not have a resilient action in relation to the panels moving away from each other parallel to their plane. It will be appreciated that any locking element according to the invention can be used, which has been mentioned in the present description, as well as the respective hook profile configuration suited thereto.

Locking of the edges 49*b* and 50*a* takes place simultaneously with the scissor-like pivotal movement of the panel 50. Prior to or during the pivotal movement, a translatory motion component can take place, with which exact overlap of the upper hook of the edge 50*a* of the panel 50 with the lower hook of the edge 49*b* of the panel 49 is achieved. That translatory movement takes place along the edge of the front row of panels, in which the edge 50*b* of the panel 50 is inclinedly inserted. The translatory movement can be influenced for example by the hook profiles of the edges 49*b* and 50*a*. That can be when surfaces slide against each other, which for example are arranged inclinedly and thereby produce a component of motion parallel to the edge 50*b*, while they come into contact in a scissor-like manner.

The upper hook of the edge 50*a* is moved with a substantially vertical component of motion, on to the complementary lower hook of the edge 49*b* of the panel 49. An integral component part of the resulting hook connection is a locking element with a resilient latching tongue in accordance with one of the described embodiments. The locking element will not be set forth at this juncture.

FIG. 53 shows a substantial part of an apparatus 1 for mounting a locking element 200 to panels, on the basis of which the method according to the invention is also described.

The apparatus 100 is intended for retro-fitment to a conventional production installation A for wall, floor or ceiling panels. FIG. 53 shows portions of three panels 300*a*, 300*b* and 300*c*. The through-travel direction T of the panels 300*a*, 300*b* and 300*c* in the production installation A is indicated by an arrow.

A locking element is firstly supplied in the form of an endless locking element line 400. FIG. 53 does not show a storage means from which the locking element line 400 is removed. An example of a storage means is described hereinafter with regard to FIGS. 59 and 60.

FIG. 53 shows a locking element line 400 which is firstly moved in perpendicular relationship to the through-travel direction T of the panels 300*a*, 300*b* and 300*c* to the panels 300*a*, 300*b* and 300*c* and, shortly before reaching the panels 300*a*, 300*b* and 300*c*, is deflected in an arcuate configuration so that the locking element line 400 is brought up to an edge 500 of a panel 300*a*, at a preferably acute angle α.

There is provided a pressing device 600 having a pressing roller 600*a* which presses the front end of the locking element line 4 against the panel edge 500 of the panel 300*a*. The panel edge 500 is provided with a receiving region N co-operating with a locking element 200, as is known from the disclosure of WO 00/016654 (EP 1 415 056 B1), incorporated herein by reference. In the phase in which the pressing device 600 presses the locking element 200 against the panel edge 500, a front part of the locking element line 400 is cut off and affords the separated locking element 200. The diagrammatically illustrated separating station 700 is provided for that purpose. From the moment in time at which the locking element 200 is cut off the locking element line 400, further transport of the locking element 200 is effected by frictional contact with the pressing roller 600*a*. The pressing roller 600*a* is driven in such a way that its peripheral speed is synchronised with the transport speed of the panel 300*a* in the production installation A.

In order to transport the locking element line 400 to the panel 300*a*, the apparatus has an advance device 800 with advance rollers 800*a*, 800*b*, 800*c* and 800*d*, which by way of frictional contact convert a rotational movement into a rectilinear transport movement of the locking element line 400. The illustrated embodiment has two pairs of advance rollers, namely the advance roller pair 800a/800b and the advance roller pair 800c/800d. All advance rollers 800a, 800b, 800c and 800d are driven by way of a pulling means 900. The pulling means 900 is passed around the advance rollers 800a, 800b, 800c and 800d in such a way that the advance roller pair 800a/800b rotate in mutually opposite relationship. The same applies to the advance roller pair 800c/800d. Each of the advance rollers 800a, 800b, 800c and 800d has substantially two regions, namely a region with a running surface 1000 for the pulling means 900 and a region with a friction surface 1100 for the transmission of movement to the locking element line 400. The other two rollers of the advance device 800 involve a drive roller 1200 which is driven by a motor M1 and a tensioning roller 1300 with which the desired tensile stress can be produced in the pulling means 900.

Provided in the region of the advance device 800 is a guide passage 1400 with which the locking element line 400 is held in a straight transport path. Particularly downstream of the advance device 800 in the direction of transport of the locking element line, it is necessary for the locking element line 400 to be stabilised with a guide because the locking element line 400 already buckles at low levels of pressure forces, because of its small cross-section. The locking element line 400 which is preferably made from plastic material, because of its small cross-section, can admittedly carry high tensile forces but, in comparison therewith, only low pressure forces, without a change in its shape. The locking element line 400 behaves mechanically like a tensile bar because it can carry high levels of tensile forces. It is unsuited as a compression bar because just low pressure forces already result in buckling or kinking thereof.

Downstream of the advance device 800 in the transport direction, the locking element line 400 is guided in a conveyor passage 1500 arranged in an arcuate configuration. The conveyor passage 1500 opens into a further portion of conveyor passage which is to be referred as the transfer passage 1600. The transfer passage 1600 has a gap 1600c. The separating station 700 extends into that gap 1600c. The separating station 700 cuts off a respective advanced front portion of the locking element line 400 as soon as the front portion is in contact with the pressing roller 600a. That ensures that, after the separating operation, the transport movement is transmitted from the pressing roller 600a to the locking element 200 which has been cut off.

When the separating station 700 carries out the separating operation and is in engagement with the locking element line 400, the front portion of the locking element line 400 is braked by the engagement of the separating station 700 and can come to a complete halt. The separating station 700 is provided in the present embodiment with a cutting blade 700a which is arranged on a rotatable blade carrier 700b. The engagement of the cutting blade 700a into the locking element line 400 provides that the transport movement of the locking element line 400 is braked in the region of the transfer passage 1600. An exact separating cut is performed in that way.

Subsequent separating operations thus take place cyclically.

Although the separating station 700 operates cyclically the present embodiment does not provide that the advance device 800 is controlled in such a way that it produces a cyclic transport movement of the locking element line 400. In terms of designing the apparatus 100, it was assumed that the through-travel speed of the panels 300a, 300b and 300c in the production installation A is so high that, with the drive technology which is usual nowadays and which could be used for the advance device, it is not possible, or it is possible only at a high level of complication and expenditure, to implement a cyclic transport movement of the locking element line 400 at a suitably high cycle frequency. For that reason the advance device 800 of the present embodiment continuously drives the locking element line 400. That is even during the period of time in which the separating station 700 is carrying out the separating operation and is braking the transport movement of the locking element line 400 in the transfer passage 1600.

The length of the locking element line 400 which is delivered by the advance device 800 during the separating operation passes into the conveyor passage 1500 which is disposed between the advance device 800 and the transfer passage 1600. The conveyor passage 1500 is in the form of a buffer region P in which the delivered length of the locking element line 400 is put into intermediate storage during the separating operation. The buffer region P is provided with a storage spring 1700. The storage spring 1700 is actuated by an outward buckling movement of the locking element line 400 in the buffer region P. In that way spring energy is stored in the storage spring 1700. The spring energy progressively rises with increasing buckling and increasing length of the locking element line 400 which is in intermediate storage. The absorption of spring energy ends as soon as the separating operation is concluded and the separating station 700 opens the transfer passage 1600 again. At that moment the storage spring 1700 abruptly unleashes its spring energy and moves back into its arcuate initial position F1. In that situation the length of the conveyor passage is reduced because the outwardly buckled position F2 of the conveyor passage 1500 is longer than the neutral arcuate initial position F1 of the conveyor passage 1500. The difference between the outwardly buckled length and the initial length of the conveyor passage corresponds to the length in intermediate storage, of the locking element line 400, that length being transported with a jerk into the transfer passage 1600 by virtue of the unleashing of the spring energy of the storage spring 1700.

As shown in FIG. 53 the storage spring 1700 is a cylindrical coil spring which is so arranged that the cylindrical interior of the coil spring forms a free conveyor cross-section 1500a of the conveyor passage. The storage spring 1700 is shown both in its initial position F1 and also in an outwardly buckled position F2, in FIG. 53.

FIG. 53 also shows a movement pickup D with which the travel speed of the panels 300a, 300b and 300c in the production installation A is detected. The movement pickup D detects any change in the travel speed and transmits that information to a control C. The control C is in turn connected to a drive motor M1 for the advance device 800, a drive motor M2 for the pressing device 600 and the drive motor M3 for the separating station. All those drives M1 to M3 are in that way automatically synchronised with the panel production installation. That provides that the apparatus can advantageously be operated without intervention in the installation control of the production installation A. In spite of the fact of being independent of the production installation the apparatus implants any change which occurs in the travel speed of the production installation A. The motors are servomotors which are desirable because of their positionally accurate controllability. It will be appreciated that alternatively other precise drives can be used.

FIG. 54 shows the cross-section of the transfer passage 1600 in accordance with II-II in FIG. 53. The transfer passage 1600 is formed from three passage elements U1, U2 and U3 which are releasably connected together. It has a free cross-section which is almost coincident with the cross-section of the locking element line 400. More specifically the transfer passage 1600 has a V-shaped cross-sectional region 1600a, wherein an apex point 1600b of the V-shape is provided with a rounding. The transfer passage 1600 is arranged on a table 1800. The rounding of the V-shaped cross-sectional region is on the side of the transfer passage 1600, which is remote from the table 1800. Provided at an end of the V-shaped cross-sectional region 1600a is a laterally projecting cross-sectional region 1600d into which an insertion tongue 400a of the locking element line 400 projects. In the present embodiment the insertion tongue 400a has two claw prongs 400b, for which reason the projecting cross-sectional region 1600d of the transfer passage 1600 is provided with pointed spaces 1600c for the claw prongs 400b of the locking element line 400.

The position of the locking element line 400 shown in FIG. 54 corresponds to that position in which the locking element 200 is pressed by the pressing device 600 against the edge 500 of the panel 300a. In the present embodiment it is assumed that the panel production installation A transports the panels 300a, 300b and 300c with their rear side upwardly. In other words, the surface of the panels 300a, 300b and 300c which is shown in FIG. 53 is the rear side of each of the panels. An oppositely disposed front side of the panels is usually provided with a decoration and is directed downwardly, that is to say towards the table 1800, in the views in FIGS. 53 and 54.

In order to clearly show how the pressing roller 600a of the pressing device 600 operates, FIG. 54 diagrammatically indicates by a dash-dotted line the position in which the pressing roller 600a reaches the locking element 200 at the end of the transfer passage 1600 and causes a transport movement of the locking element 200 in frictionally locking relationship.

FIG. 55 is a view in accordance with III-III in FIG. 53, namely showing a pair of advance rollers 800a/800b. Each advance roller 800a and 800b has two regions, namely a running surface 1000 for a pulling means 900 and a friction surface 1100 for transmitting the transport movement to a locking element line 400. The cross-section of the locking element line 400 is shown on an enlarged scale beneath the advance rollers 800a and 800b in order to clearly show the position in which the locking element line 400 is forced in between the two advance rollers 800a and 800b. The insertion tongue 400a of the locking element line 400 is arranged in that position in parallel relationship with the axes of rotation a and b of the advance rollers 800a and 800b respectively. The overall width r of the locking element line 400, which is to be measured between the two advance rollers 800a and 800b, is less in the illustrated enlarged position than the overall height h of the locking element line 400, which is to be measured in parallel relationship with the axis of the advance rollers 800a and 800b. That position is desirable because the friction surfaces 1100 of the advance rollers 800a and 800b have regions which are of radii of different sizes from the respective axis of rotation a and b respectively of the advance rollers. The differing radii result in different peripheral speeds at different regions of a friction surface 1100. That leads to a slippage between the friction surface 1100 and the locking element line 400 and thus wear of the advance rollers 800a and 800b. In order to minimise the slippage, the locking element line 400 is arranged in that position between the advance rollers 800a and 800b, in which the locking element line 400 is of the smallest dimension (r1<h1) in order thereby to minimise differences in the peripheral speed of the friction surface 1100 of a respective advance roller 800a and 800b respectively.

In order to improve the frictionally locking transmission of the movement from the advance roller 800a, 800b, 800c, 800d to the locking element line 400, it can be provided that at least one of the advance rollers of a pair thereof is provided with a roughened or microprofiled surface.

FIG. 56 shows a plan view of the advance rollers 800a and 800b shown in FIG. 55. It will be seen that the running surfaces 1000 for the pulling means 900 are provided with a toothed configuration 1900. The pulling means 900 of the present embodiment is therefore a toothed belt. The toothed belt is provided with teeth 900a and 900b on both sides, so that drive in opposite relationship of the advance rollers of a pair 800a/800b and 800c/800d respectively is possible by the belt passing around the advance rollers 800a, 800b, 800c and 800d in the manner shown in FIG. 53.

FIG. 57 shows the cross-section through a guide passage 1400 in accordance with V-V in FIG. 53. The guide passage is formed from three passage elements K1, K2 and K3 which are releasably connected together. It will be clear that the locking element line 400 is enclosed in the guide passage 1400 in a position which is rotated through 90° with respect to the position of the locking element line 400 within the transfer passage 1600. The FIG. 57 position corresponds to the position in which the locking element line 400 passes through the advance device. As soon as the locking element line 400 has passed the guide passage 1400 and moves into the resilient conveyor passage 1500 shown in FIG. 53, the locking element line 400 is gradually twisted through an angle of 90° and passed into the transfer passage 1600.

The transfer passage 1600 is shown in FIG. 58 in the same position on a table 1800, as in FIG. 54. In addition FIG. 58 shows a side view of the separating station 700. The separating station 700 has a blade carrier 700b, to which a single cutting blade 700a is mounted. In the present embodiment this involves a rotatable blade with which severing cuts are implemented to cut the locking element 200 off the locking element line 400.

A further part of the apparatus is shown in FIGS. 59 and 60. FIG. 59 shows a plan view of the entire apparatus 100. The Figure also indicates a transport path of the production installation A, by reference to the panels 300a, 300b and 300c which are transported in the through-passage direction T. A panel 300a has reached the pressing device 600 and is just being fitted with a locking element 200. In addition the Figure indicates the advance device 800 and the guide passage 1400. FIG. 59 also shows a storage means 2000 for the locking element line 400. In the preferred embodiment this involves a reel storage means 2000 in which a very long locking element line 400 is wound up.

In the full state of the reel storage means 2000 it is of a high mass. It would therefore be inappropriate to use the advance device 800 to remove the locking element line 400 from the heavy reel storage means 2000 because in that situation the locking element line 400 could easily tear away. For that reason it is provided that the reel storage means 2000 itself is driven. A drive motor M4 is provided for that purpose. The motor M4 is desirably an exactly controllable servomotor. As can best be seen from FIG. 60, the locking element line 400 is not fed directly to the advance device 800 but is firstly guided into a loop-forming supply region 2100 in which the locking element line 400 forms at least one loop in the manner of a block-and-tackle arrangement. The illustrated embodiment involves three mutually juxtaposed loops 2200, 2300 and 2400. In order to lay the locking element line 400 in three loops 2200, 2300 and 2400, arranged on an upper fixed spindle 2500 are four storage rollers 2600 while arranged on a lower loose spindle 2700 are three storage rollers 2800. The loose spindle can be moved up and down in a defined adjustment region 2900, whereby the length of the loops 2200, 2300 and 2400 of the locking element line 400 is changed. A minimum value and a maximum value are predetermined for the loop length. Detectors Q are provided which detect the minimum and the maximum loop length and control the drive for the reel storage means 2000 in dependence on the loop length. When the minimum loop length is reached, the stored length of the locking element line 400 is excessively short and the reel storage means 2000 is set in operation in order to provide a make-up supply of locking element line. As soon as the maximum loop length is reached the drive of the reel storage means 2000 is automatically stopped.

From the supply region 2100 the locking element line 400 is fed to the advance device 800. As a result, in operation of the apparatus, the advance device 800 can always pull locking element line 400 out of the supply region 2100 and transport it to the pressing device 600.

Reference will also be made to FIG. 59 to explain how panels are firstly conveyed through the production installation in their longitudinal direction L and are then transported displaced through an angle of 90° in a transverse direction to the pressing device 600, namely in the passage direction T. The preceding conveying movement in the longitudinal direction L is effected at a given speed G1. If the production installation were operated in the passage direction T at a speed G2=G1, there would be large intermediate spaces between the panels 300*a*, 300*b* and 300*c*. The speed G2 in the passage direction T is therefore reduced so that the panels 300*a*, 300*b* and 300*c* are transported with a smaller spacing therebetween. The reduced speed G2 is favourable in terms of applying the locking element 200 by machine. It will be appreciated that the problem arises only when the situation involves rectangular panels of different edge lengths in the longitudinal and transverse directions. The speeds and intermediate spacings in contrast do not differ if the panels are of a square shape.

An alternative embodiment of an apparatus for mounting a locking element 200 to panels is shown in FIG. 61. It is first to be noted that the apparatus shown in FIG. 61 is preferably provided with the reel storage means 2000 described with reference to FIGS. 59 and 60.

The difference between the apparatus of FIG. 53 and the apparatus of FIG. 61 is that the separating station 700 which separates the locking element line 400 into individual locking elements 200 is arranged upstream of the advance device 800 in the transport direction of the locking element line 400. The advance device in other respects does not differ from the advance device 800 shown in FIG. 53, the design configuration of which is thus incorporated into the embodiment shown in FIG. 61. There is provided a guide passage 1400 which guides the locking element line in the region of the advance device 800. The guide passage 800 has a curve and merges into a transfer passage 1600 which leads to a pressing device 600. It is provided that the position of the locking element in the region of the transfer passage 1600 corresponds to the position shown in FIG. 54. In the region of the advance device 800 the position of the locking element is rotated through 90° and corresponds to the position shown in FIG. 57. Provided between the guide passage 1400 and the transfer passage 1600 is a region in which the locking element line 400 experiences a twist.

As shown in FIG. 61 the guide passage 1400 or the transfer passage 1600 is filled with a row of locking elements 200 which have already been cut up. The transport movement of the locking elements 200 is guaranteed because a locking element 200 pushes forward the respective next locking element 200 within the narrow guide passage 1400.

It is advantageous in this embodiment that a separate transport operating in cyclic fashion can be provided for the separating station 700 and therefore it is possible to dispense with a buffer region between the advance device 800 and the pressing device 600, with which intermediate storage of additional locking element line 400 has to be implemented, as in the embodiment shown in FIG. 53.

LIST OF REFERENCES

1 panel
2 panels
3 fixing system
4 hook connection
4.1 hook
4.2 hook
5 locking element
6 insertion portion
7 locking groove
8 locking portion
9 latching tongue
10 latching recess
11 end
12 contact surface
13 attachment
14 first limb
15 second limb
16 gap
17 inclined surface
18 anchoring means
19 projection
20 longitudinal side surface
21 tip
22 introduction aid
23 hook
24 slot
25 slot side
26 enlargement
27 bore
28 rounded portion
V/U laying surface
P force
h height
$h_1$ height
b width
r radius of curvature
30 panel
30*a* panel
30*b* panel
31 lower hook
31*a* hook end
31*b* opening
31*c* latching recess
31*d* holding gap
31*e* edge surface
31*f* bottom
31*g* clamping surface
32 upper hook
32*a* hook end
32*b* opening
32*c* latching recess
32*d* holding gap
32*e* edge surface
32*f* bottom
32*g* clamping surface
33 locking element
33*a* resilient latching tongue 33b clip portion
33c clamp portion/anchoring tongue
34 join
35 upper hook
36 panel
37 panel
38 panel
39 panel
40 panel
40a edge
40b edge
46 panel
47 panel
48 panel
49 panel
49b edge
50 panel
50a edge
50b edge
50c edge
E pressing-in tool
H1 undercut surface
H2 undercut surface
M dust chamber
P1 first row of panels
P2 second row of panels
R latching surface
S gap
U/V support surface
V1 front row
V2 following row
100 apparatus
200 locking element
200a front part
300a panel
300b panel
300c panel
400 locking element line
400a insertion tongue
400b claw prong
500 edge
600 pressing device
600a pressing roller
700 separating station
700a cutting blade
700b blade carrier
800 advance device
800a advance roller
800b advance roller
800c advance roller
800d advance roller
900 pulling means/toothed belt
900a tooth
900b tooth
1000 running surface
1100 friction surface
1200 drive roller
1300 tensioning roller
1400 guide passage
1500 conveyor passage
1500a conveyor cross-section
1600 transfer passage
1600a V-shaped cross-sectional region
1600b apex point
1600c gap
1600d projecting cross-sectional region
1700 storage spring
1800 table
1900 tooth configuration
2000 reel storage means
2100 supply region
2200 loop
2300 loop
2400 loop
2500 fixed spindle
2600 storage roller
2700 loose spindle
2800 storage roller
2900 adjustment region
α angle
A production installation
a axis of rotation
b axis of rotation
T through-travel direction
P buffer region
D movement pickup
C control
G1 speed
G2 speed
L longitudinal direction
M1 drive motor
M2 drive motor
M3 drive motor
M4 drive motor
N receiving region
r1 overall width
h1 overall height
Q detector
K1 passage element
K2 passage element
K3 passage element
U1 passage element
U2 passage element
U3 passage element

The invention claimed is:

1. An apparatus for automatic mounting of a locking element to an edge of a panel, comprising:
a storage means for storing a continuous, bendable locking element line;
an advance device for advancing the locking element line from the storage means;
a separating station for separating locking elements from the locking element line, the separating station receiving the locking element line from the advance device;
a buffer device between the advance device and the separating station, the buffer device having an elastically, deformable storage element for storing energy from the locking element line when the locking element line bends when the separating station separates the locking elements from the locking element line, and delivering the energy back to the locking element line; and
a pressing device for pressing the locking elements into a receiving region of the edge of the panel, the pressing device in synchronous movement with a continuously transported panel.

2. The apparatus of claim 1 wherein the advance device has at least one advance roller with which a rotary movement can be transmitted to the locking element line by way of a frictional contact.

3. The apparatus of claim 1 wherein the pressing device has at least one pressing roller, that a pressing force can be produced by means of the pressing roller in perpendicular relationship to the edge of the panel and that with the pressing roller the rotary movement thereof can be converted into a transport movement of the locking element by frictional contact with the locking elements.

4. The apparatus of claim 1 further comprising: there is provided at least one means for synchronisation of the transport movement of the locking elements with the transport movement of the panels in a panel production installation.

5. The apparatus of claim 4 wherein the means for synchronisation of the transport movement has a movement pickup, and the movement pickup detects the transport movement of the panels in the production installation, and that the information for synchronisation can be transmitted from the movement pickup to a control with which the transport movement of the locking elements is controllable.

6. The apparatus of claim 1, wherein the elastically, deformable storage element is a conveyor passage with a spring.

7. The apparatus of claim 6, wherein the spring is a cylindrical coil spring.

8. The apparatus of claim 1, further comprising:
a guide passage position at the advance device to guide the locking element line through the advance device.

9. The apparatus of claim 8 wherein the guide passage has a free cross-section with a V-shaped cross-sectional region and a laterally projecting cross-sectional region, wherein the laterally projecting cross-sectional region joins an end of the V-shaped cross-sectional region.

10. The apparatus of claim 1, further comprising:
a transfer passage between the buffer device and the separating station for passage of the locking element line to the separating station.

11. The apparatus of claim 10 wherein the transfer passage has a free cross-section with a V-shaped cross-sectional region and a laterally projecting cross-sectional region, wherein the laterally projecting cross-sectional region joins an end of the V-shaped cross-sectional region.

\* \* \* \* \*